(12) United States Patent
Williamson

(10) Patent No.: US 11,624,118 B2
(45) Date of Patent: Apr. 11, 2023

(54) SYSTEMS AND METHODS FOR CONTROLLING ELECTROCHEMICAL PROCESSES

(71) Applicant: Floyd L. Williamson, Athens, AL (US)

(72) Inventor: Floyd L. Williamson, Athens, AL (US)

(*) Notice: Subject to any disclaimer, the term of this patent is extended or adjusted under 35 U.S.C. 154(b) by 564 days.

(21) Appl. No.: 16/159,996

(22) Filed: Oct. 15, 2018

(65) Prior Publication Data

US 2019/0186030 A1    Jun. 20, 2019

Related U.S. Application Data

(63) Continuation of application No. 14/139,538, filed on Dec. 23, 2013, now abandoned.

(60) Provisional application No. 61/912,097, filed on Dec. 5, 2013.

(51) Int. Cl.

| | |
|---|---|
| C25B 15/02 | (2021.01) |
| C25C 7/06 | (2006.01) |
| C25D 21/12 | (2006.01) |
| C23F 13/04 | (2006.01) |
| H01M 10/42 | (2006.01) |
| C25B 1/26 | (2006.01) |
| C25B 1/34 | (2006.01) |
| H01M 4/92 | (2006.01) |
| H01M 10/34 | (2006.01) |
| H01M 8/10 | (2016.01) |

(52) U.S. Cl.
CPC .............. *C25B 15/02* (2013.01); *C23F 13/04* (2013.01); *C25B 1/26* (2013.01); *C25C 7/06* (2013.01); *C25D 21/12* (2013.01); *H01M 10/42* (2013.01); *C25B 1/34* (2013.01); *H01M 4/926* (2013.01); *H01M 10/345* (2013.01); *H01M 2008/1095* (2013.01)

(58) Field of Classification Search
CPC ........... C25B 15/02; C23F 13/04; C23C 7/06; C25D 21/12; H01M 10/42
See application file for complete search history.

(56) References Cited

U.S. PATENT DOCUMENTS

| | | | | |
|---|---|---|---|---|
| 5,605,615 | A * | 2/1997 | Goolsby | ................ C25D 21/12 205/83 |
| 5,872,443 | A * | 2/1999 | Williamson | .......... H01M 10/44 320/160 |
| 2014/0197035 | A1* | 7/2014 | Van Den Bossche | ....................... C25D 17/007 205/84 |

OTHER PUBLICATIONS

Diffusion Layer (https://www.substech.com/dokuwiki/doku.php?id=diffusion_layer; 2013) (Year: 2013).*

(Continued)

*Primary Examiner* — Nicholas A Smith
(74) *Attorney, Agent, or Firm* — Patent Grove AB; Thomas Friend

(57) ABSTRACT

A system is disclosed for controlling an electrochemical process. The system has a power source that is coupled to a power amplifier. The power amplifier is configured to provide an electromotive force (emf) signal, and a plurality of electrodes apply the emf signal to an electrochemical solution. A control element is configured to control the power amplifier such that the emf signal exhibits a predetermined frequency, amplitude, and duty cycle for reducing a thickness of the Nernst diffusion layer such that an operational parameter is set to a predetermined value.

9 Claims, 37 Drawing Sheets

(56) References Cited

OTHER PUBLICATIONS

Polarization (https://www.substech.com/dokuwiki/doku.php?id=polarization#concentration_polarization; 2012). (Year: 2012).*
Goldbook (PAC, 1981, 53, 1827 (Nomenclature for transport phenomena in electrolytic systems) on p. 1837; https://goldbook.iupac.org/terms/view/D01725 ) (Year: 1981).*

* cited by examiner

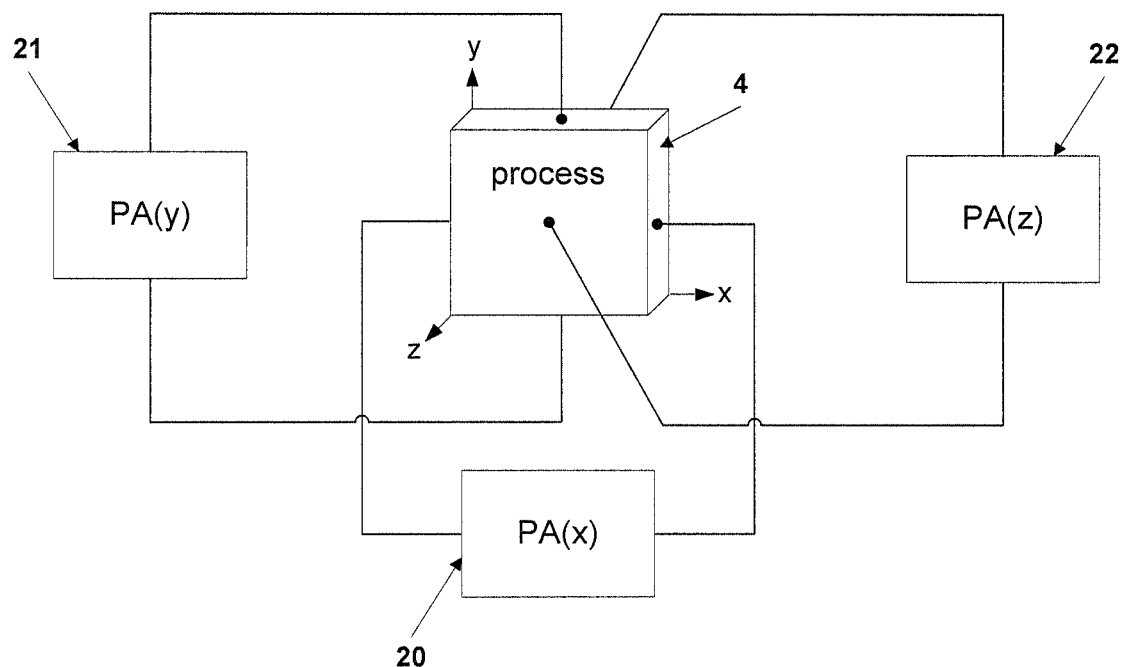
Fig. 1
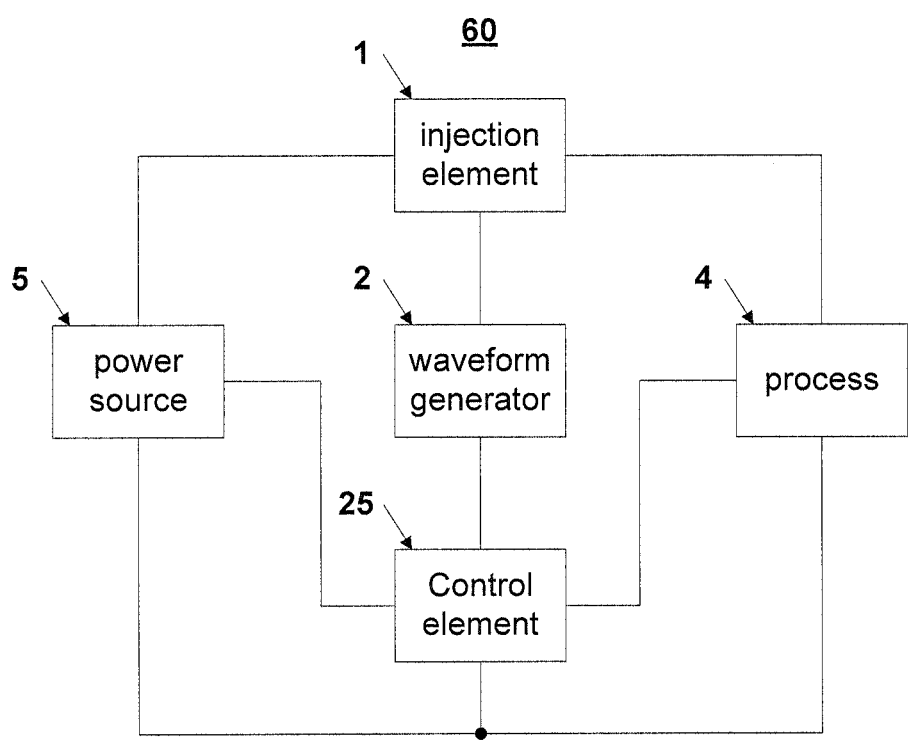
FIG. 2 – Prior art

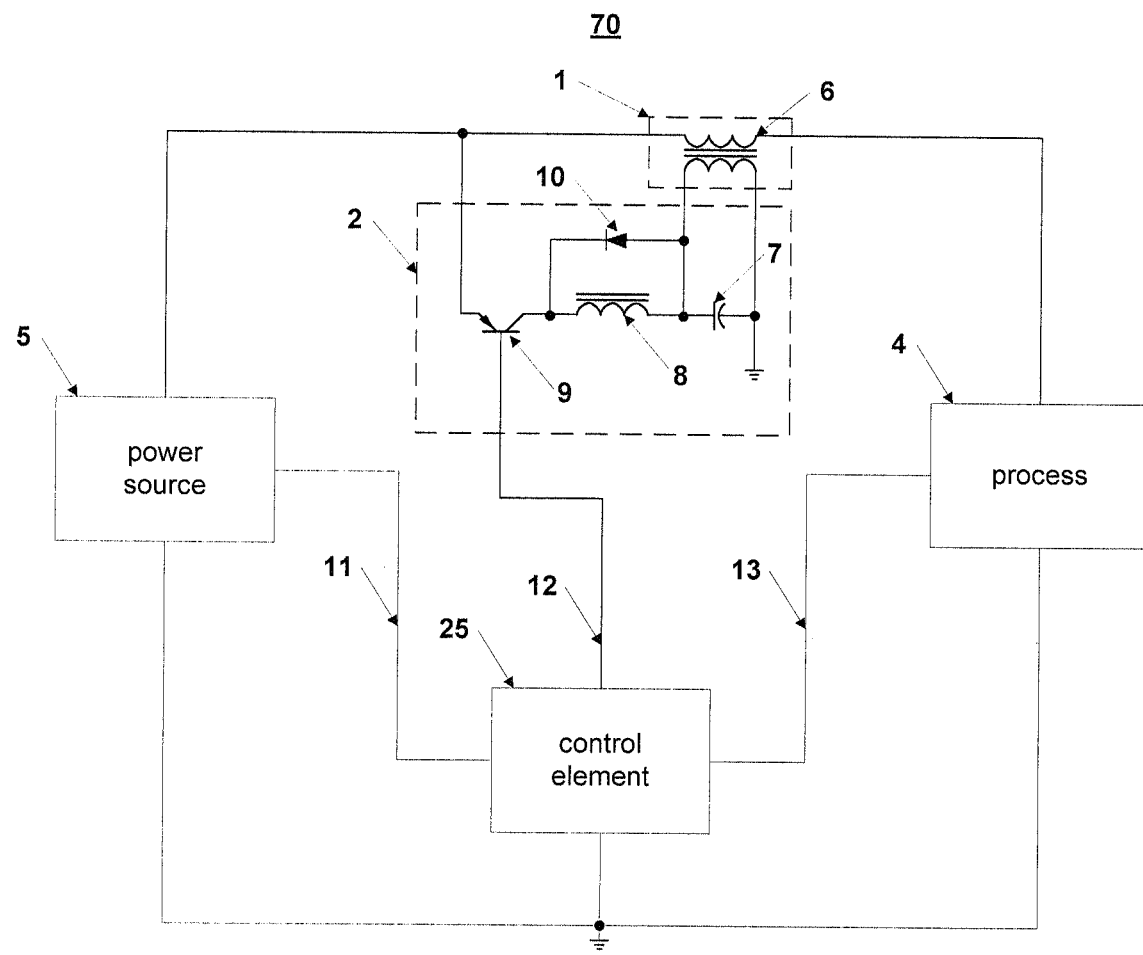
FIG. 5 – Prior art
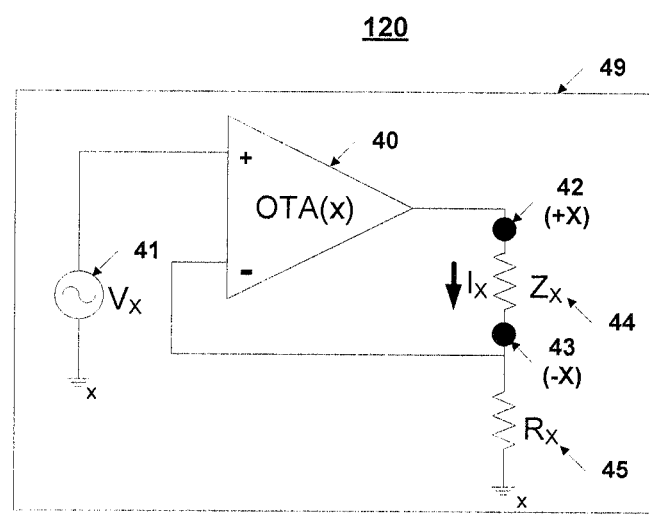
FIG. 6

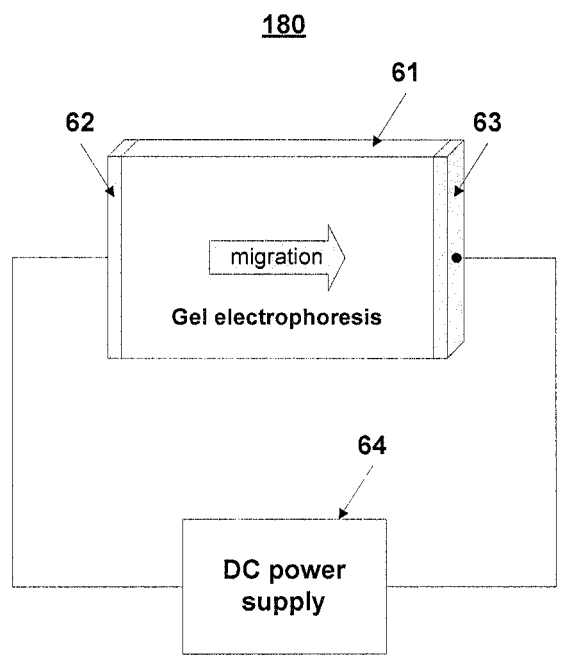
FIG. 9 – prior art
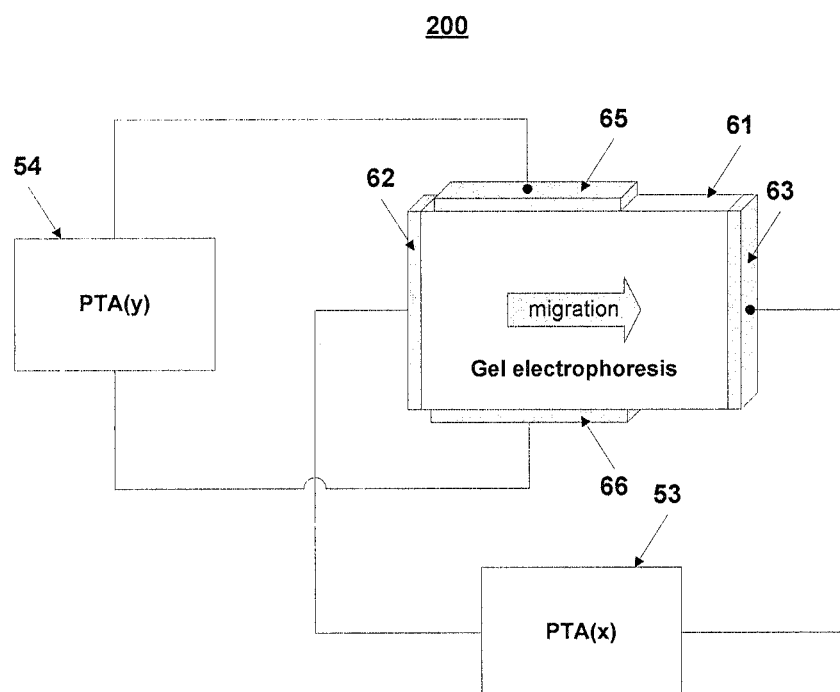
FIG. 10

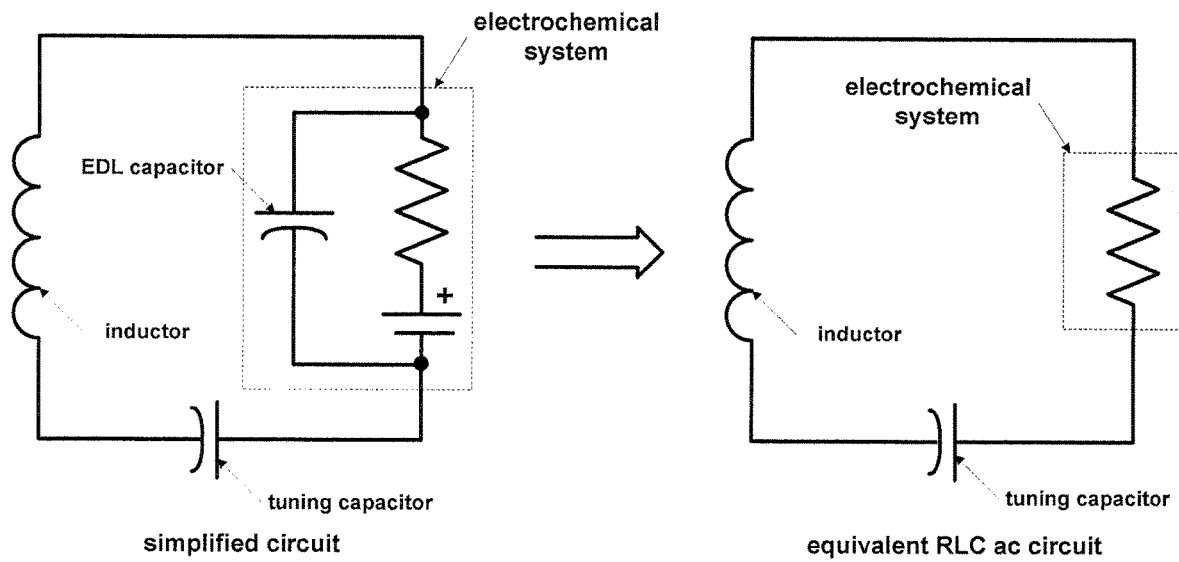
FIG. 14A
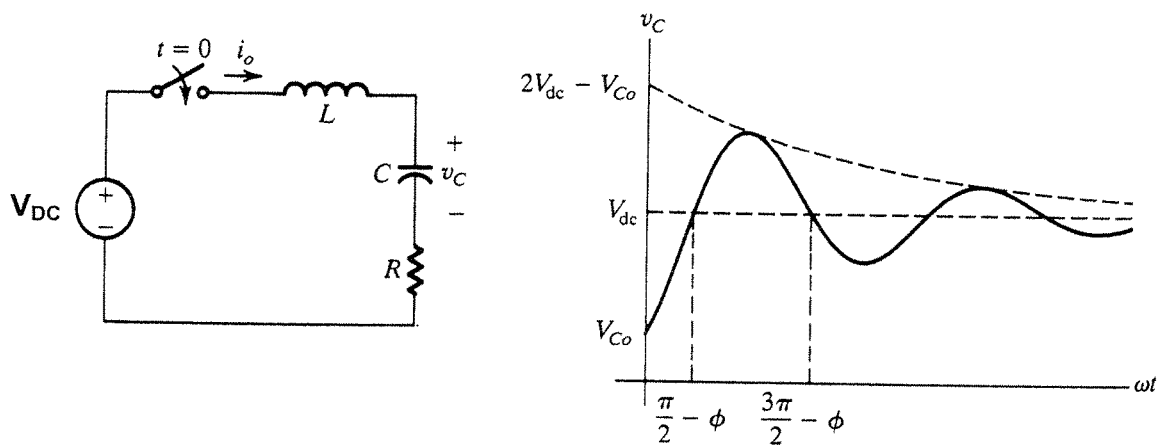
FIG. 14B – Kassakian et al, Principles of Power Electronics, Fig. 9.1

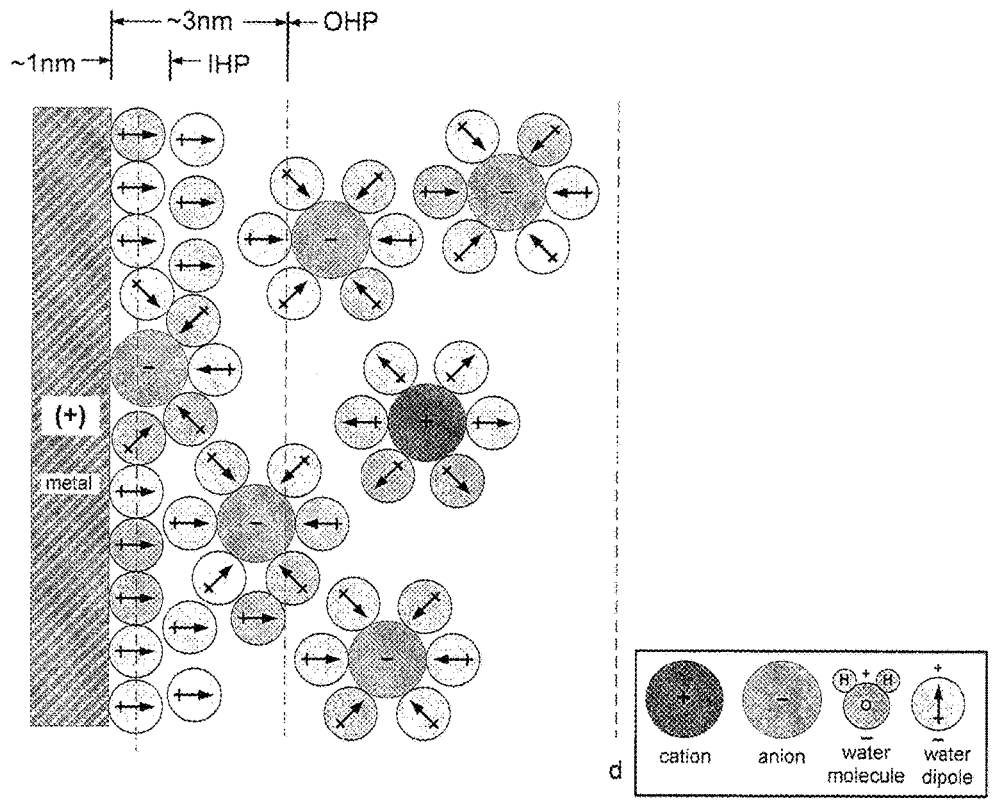
FIG. 15 – Simplified drawing highlighting the dynamic fluid nature of the Electric Double Layer (EDL) that forms at every interface
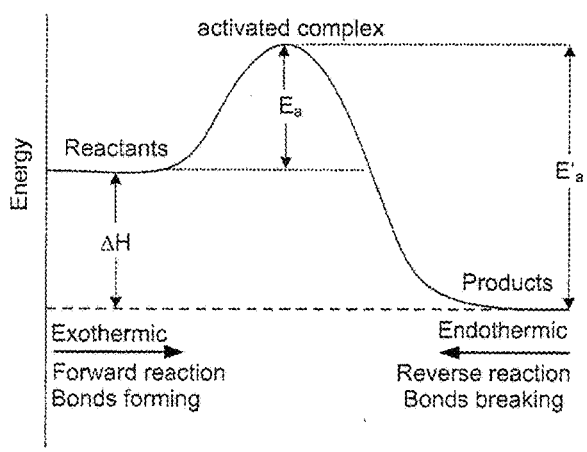
FIG. 16A – Activation energy in reversible reaction
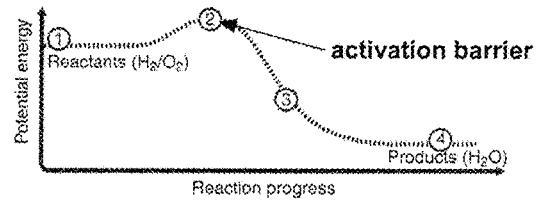
FIG. 16B – Activation energy and kinetics for water reaction, adapted from O'Hayre et al, Fuel Cell Fundamentals, Fig. 1.2

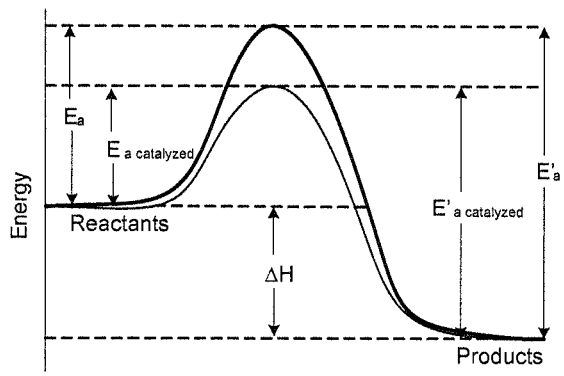
FIG. 16C - Catalysis' effect on activation barrier
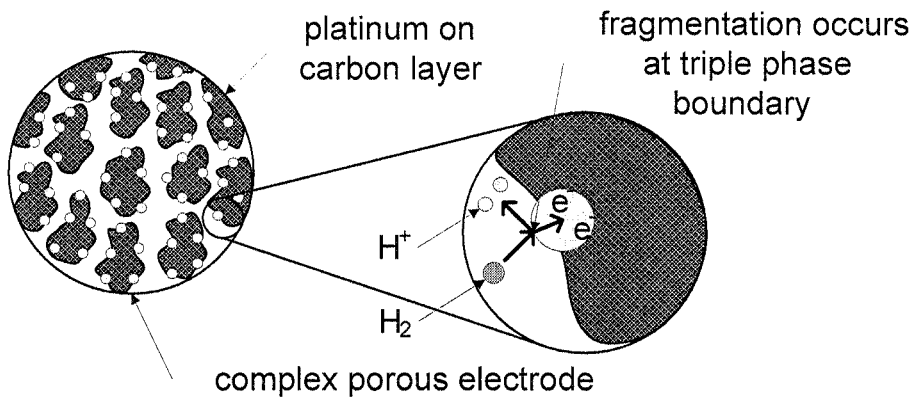
FIG. 16D – Example of platinum (Pt) catalytic effect fragmenting hydrogen ($H_2$) into hydrogen ions ($H^+$) plus the release of electrons ($e^-$)
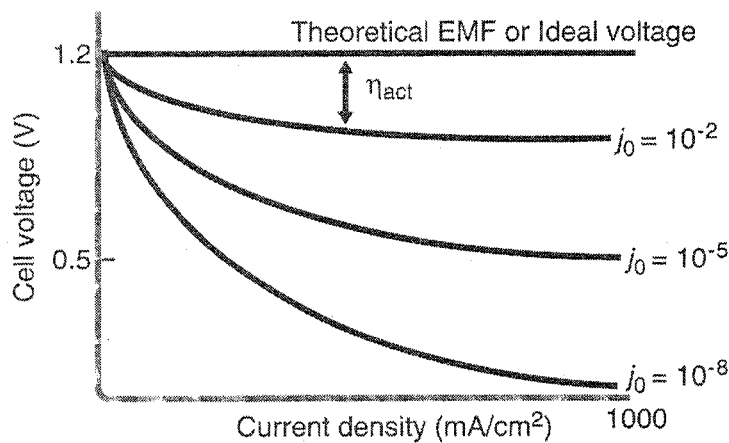
FIG. 16E – Effect of exchange current density on activation polarization, O'Hayre et al, Fuel Cell Fundamentals, Fig. 3.11

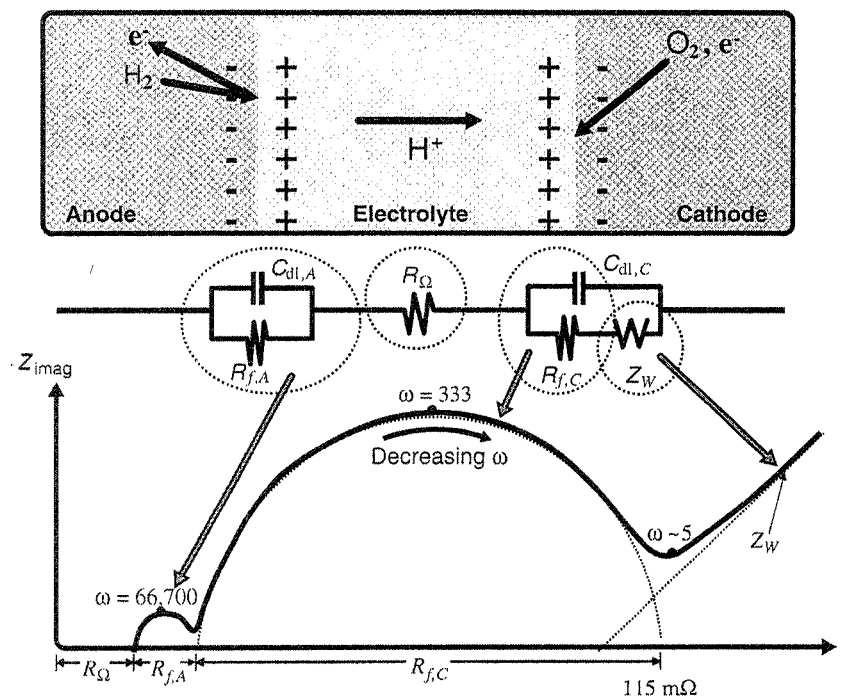
Fig. 17A - O'Hayre et al, Fuel Cell Fundamentals Fig 7.12
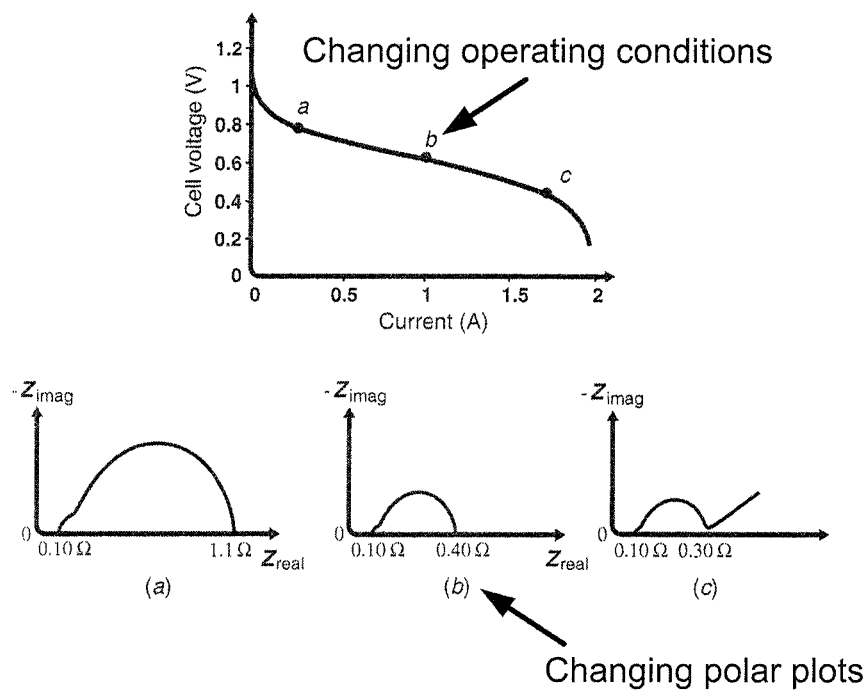
Fig. 17B – adapted from O'Hayre et al,
Fuel Cell Fundamentals Fig 7.14

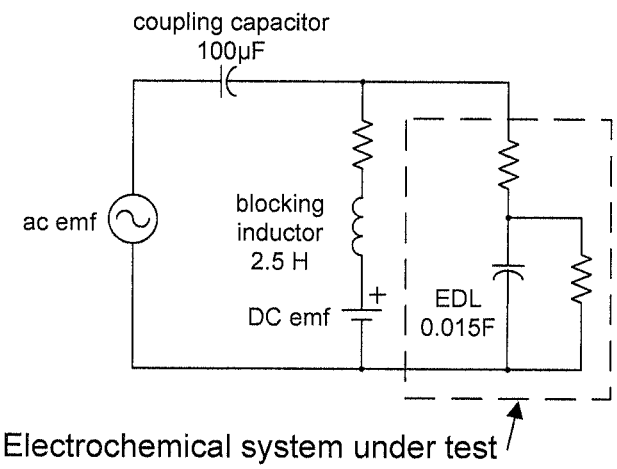

FIG. 18 'De facto' Injection Circuit – Prior art

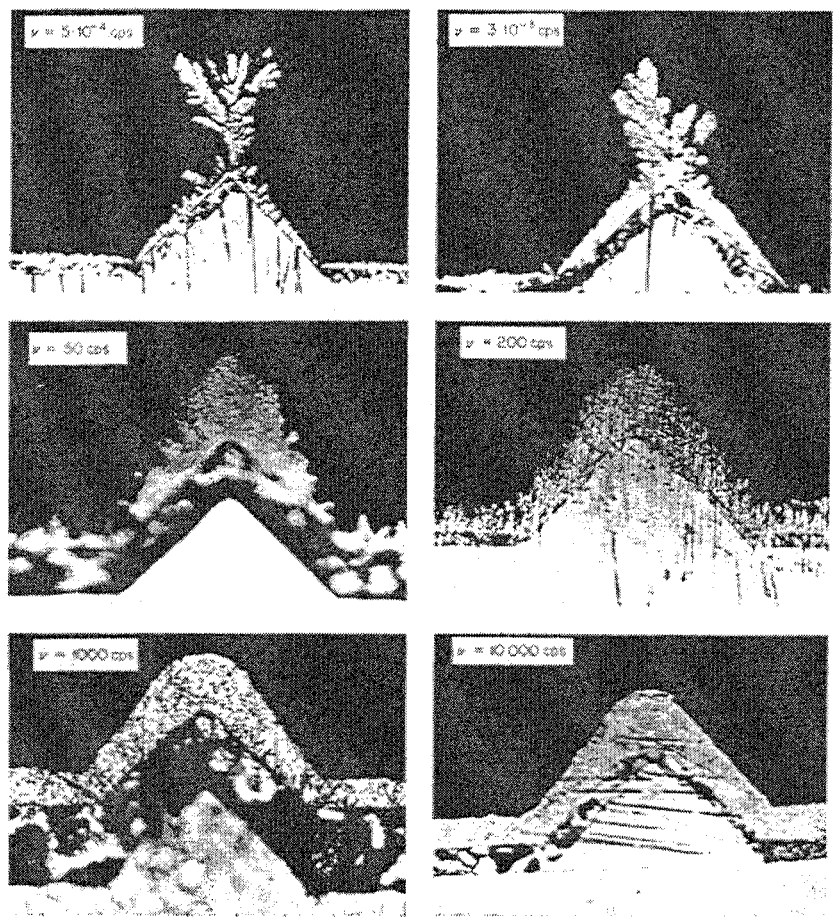

Plate 1 Photomicrographs of copper deposits onto a triangularly shaped irregularity (40μm high) obtained by a pulsating cathodic overpotention of varying frequency (magn. 750 x)

FIG. 19 – Despic & Popov 1971, The effects of pulsating potential on the morphology of metal deposits obtained by mass-transport controlled electrodeposition

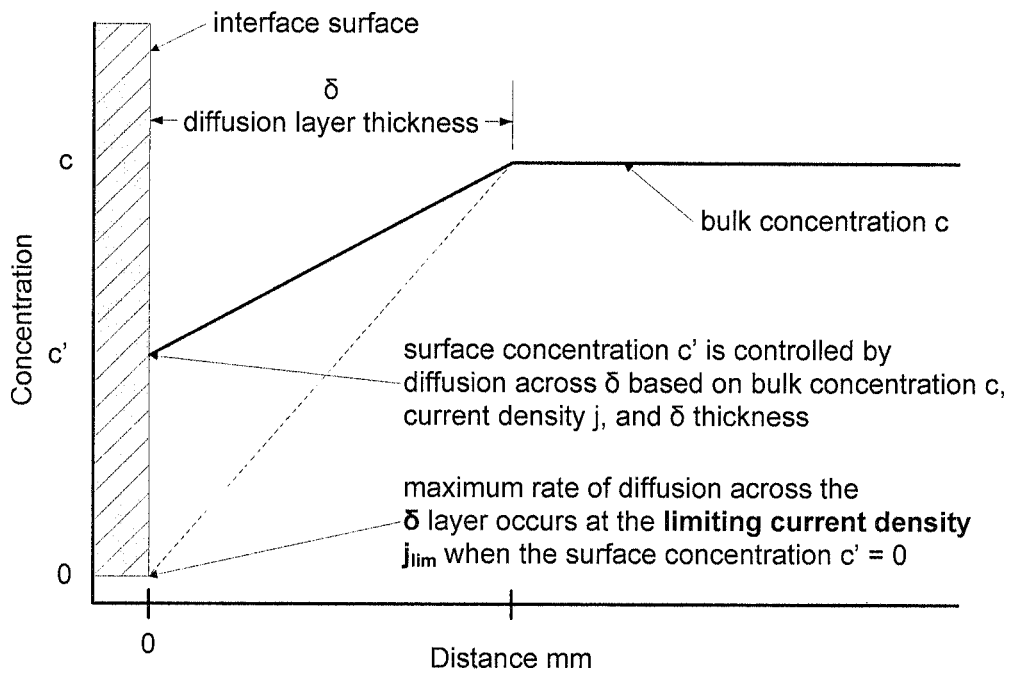
FIG. 20 – Nernst diffusion layer and $j_{lim}$ with DC emf
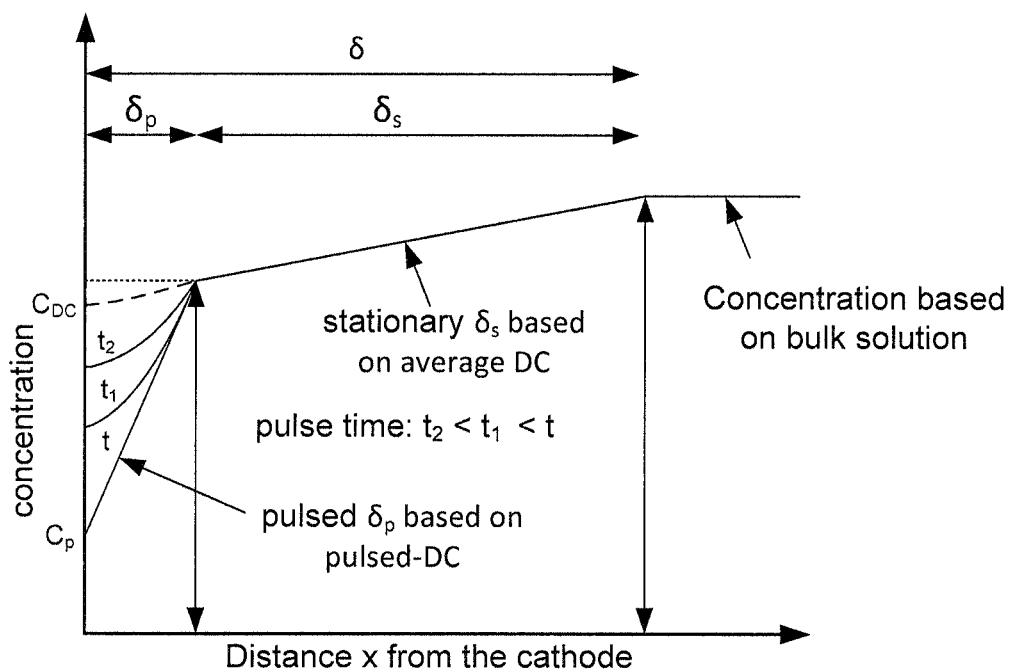
FIG. 21 – redrawn from IBL 1980, Some Theoretical Aspects of Pulse Electrolysis, Fig. 5

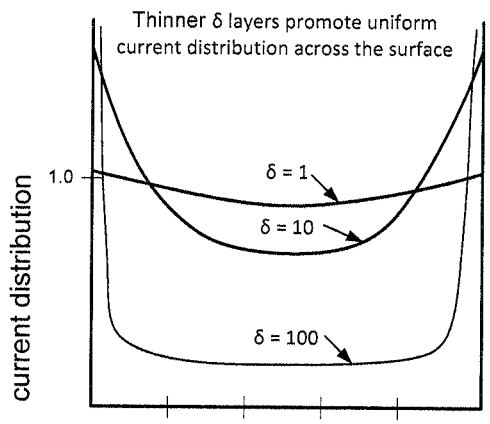

FIG. 22A – Effects of different Nernst diffusion layer thicknesses on current density distribution across a surface

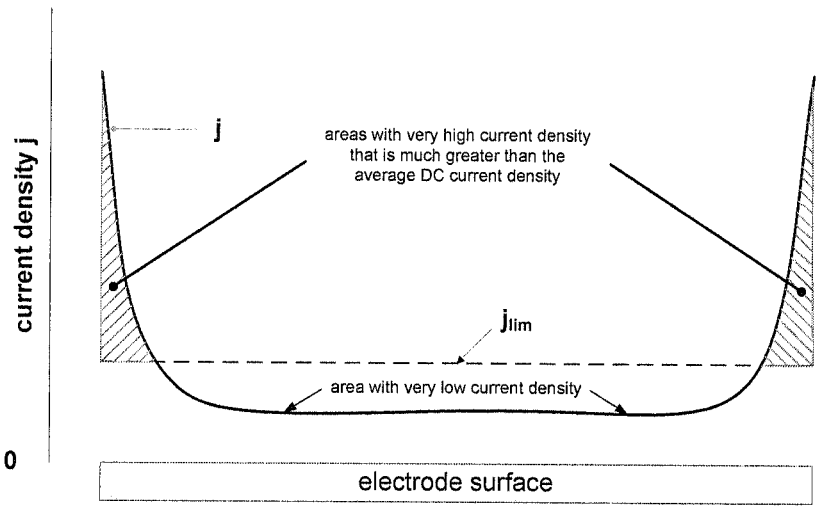

FIG. 22B – Effects of operating with DC current density near the limiting current density $J_{lim}$ with relatively thick Nernst layer thickness

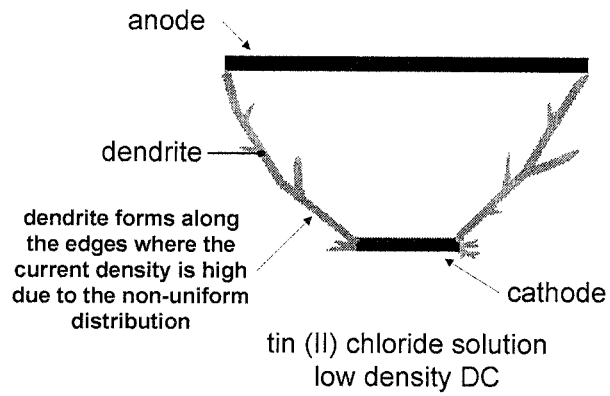

FIG. 22C – Example of operating with poor current density distribution when the DC emf approaches the limiting current density $j_{lim}$

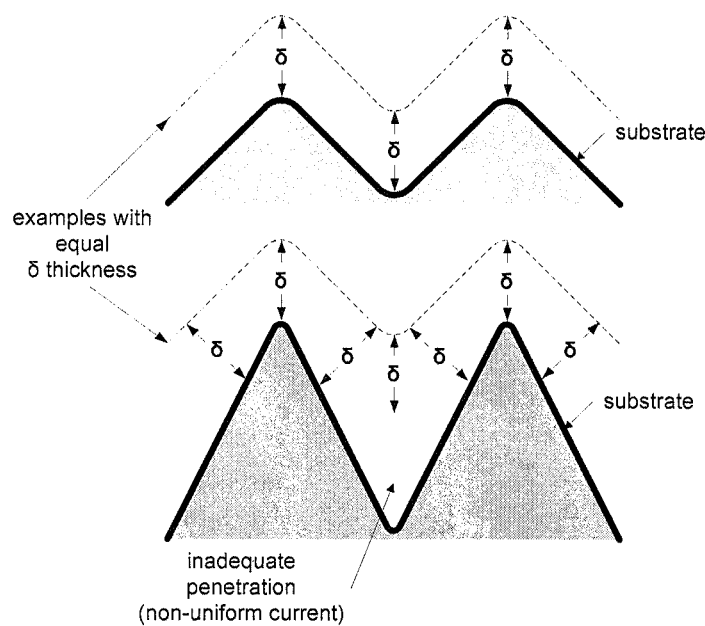
FIG. 23A – Effects of equal Nernst diffusion layer thickness δ on substrates with different surface complexities
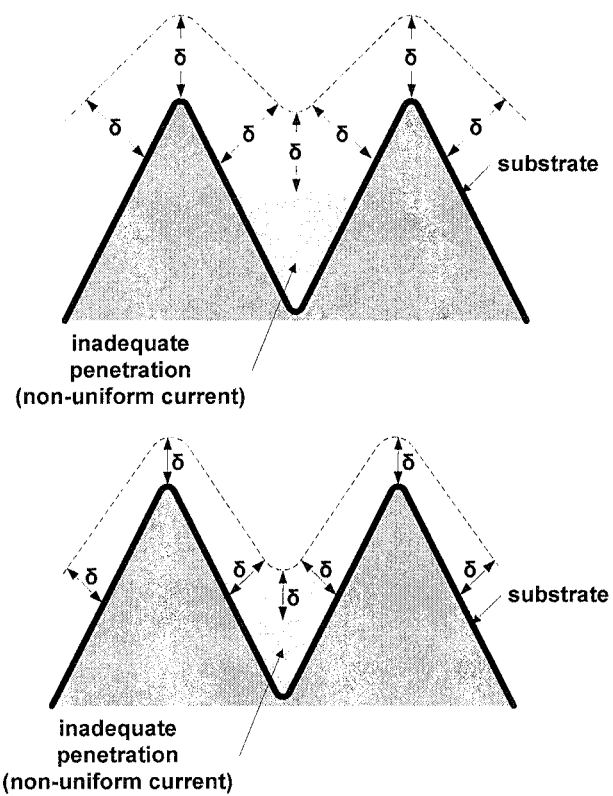
FIG. 23B – Effect of reducing Nernst diffusion layer thickness δ, to ~one-half, on substrates with similar surface complexities

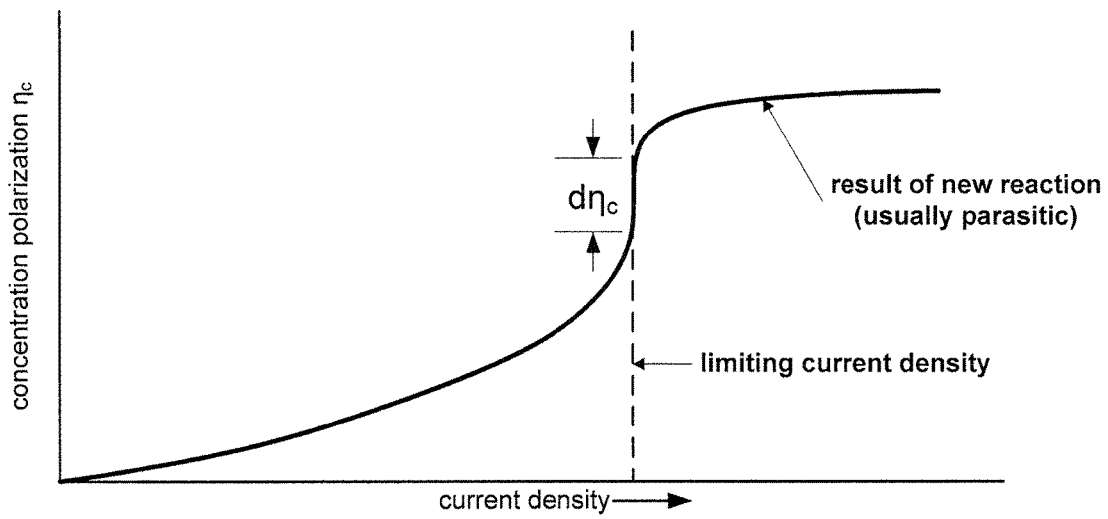
FIG. 24 - Limiting current density
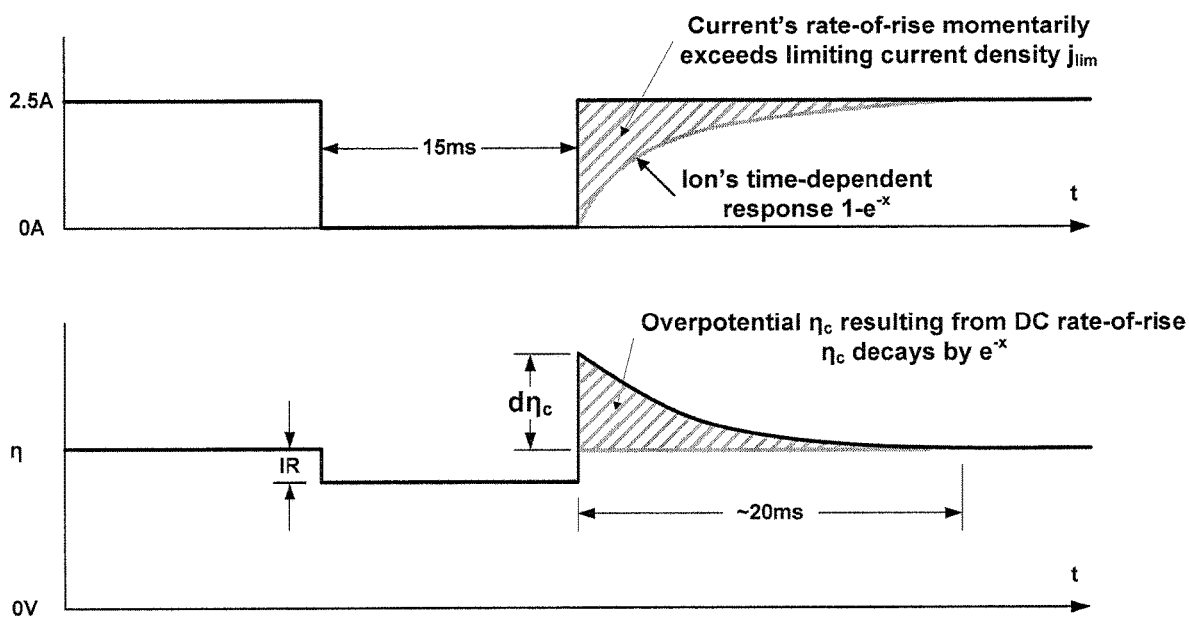
FIG. 25 – Effect of Pulsed-DC Exceeding the Limiting Current Density

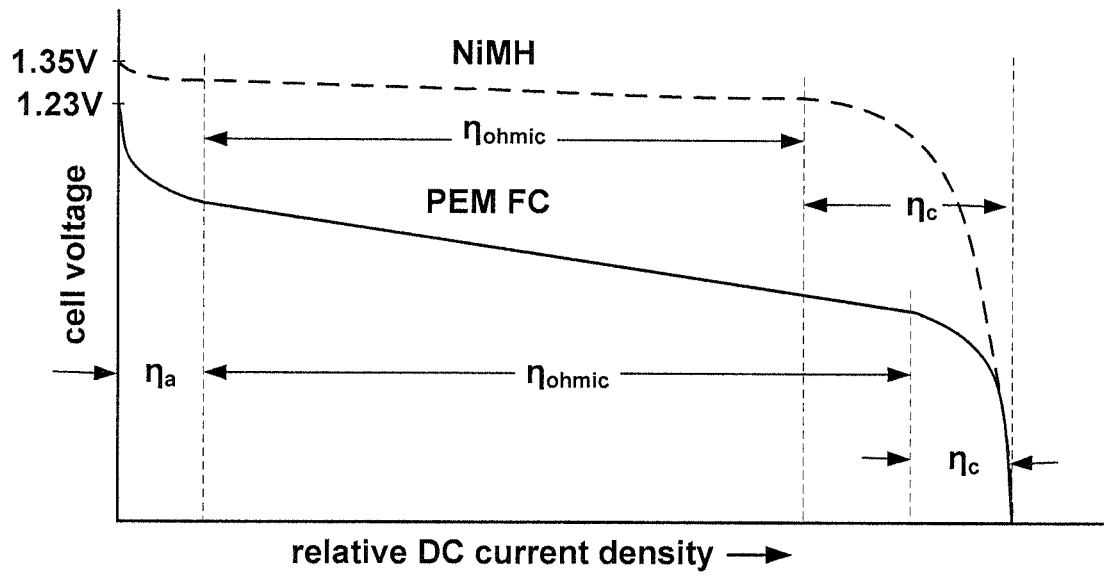
FIG. 26 – comparison of relative cell polarization losses versus current density for NiMH cell and PEM fuel cell
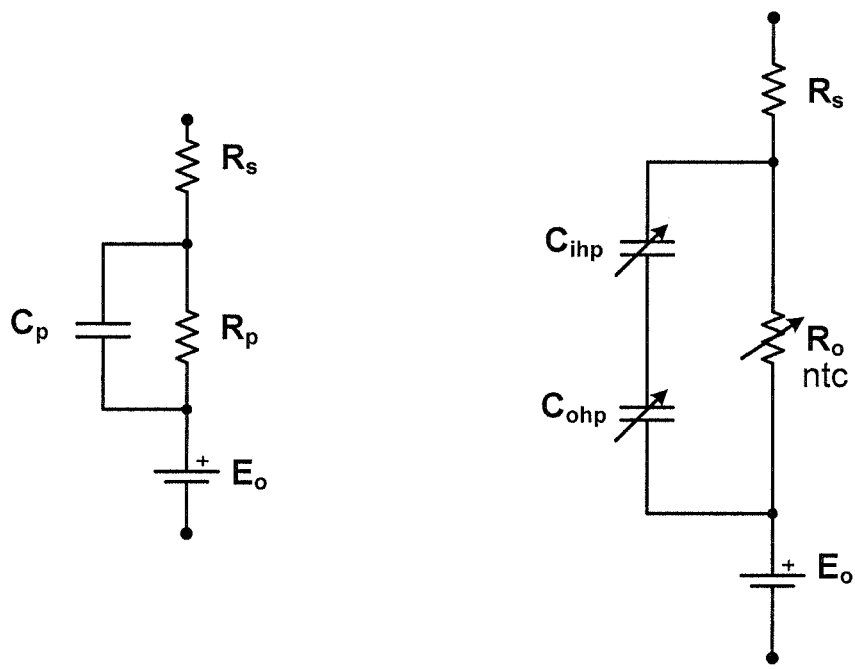
FIG. 27A – commonly used simplified equivalent model
FIG. 27B – simplified equivalent model described in U.S. 5,872,443

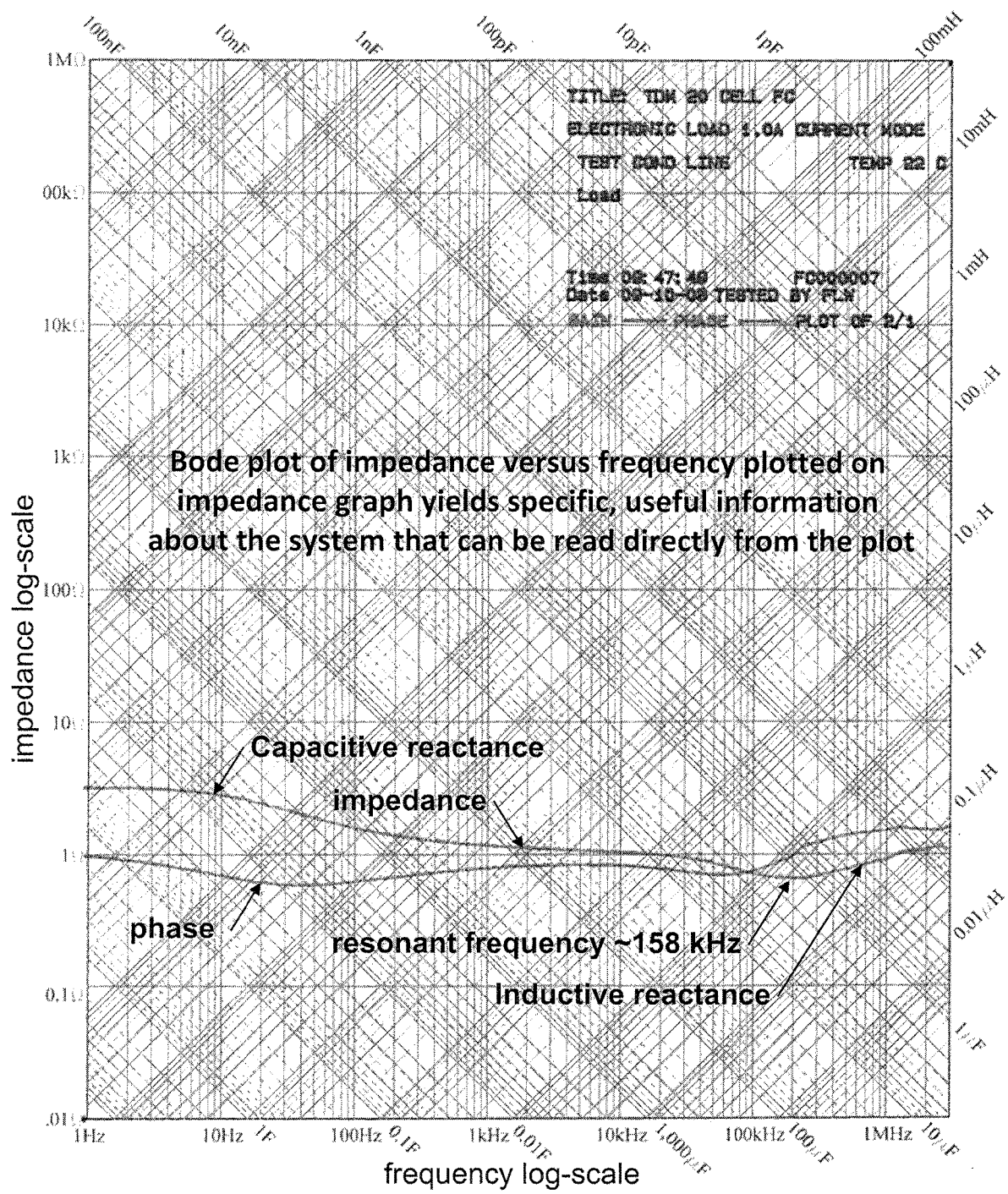
FIG. 28A – Bode plot of impedance for a 20-cell PEM Fuel Cell

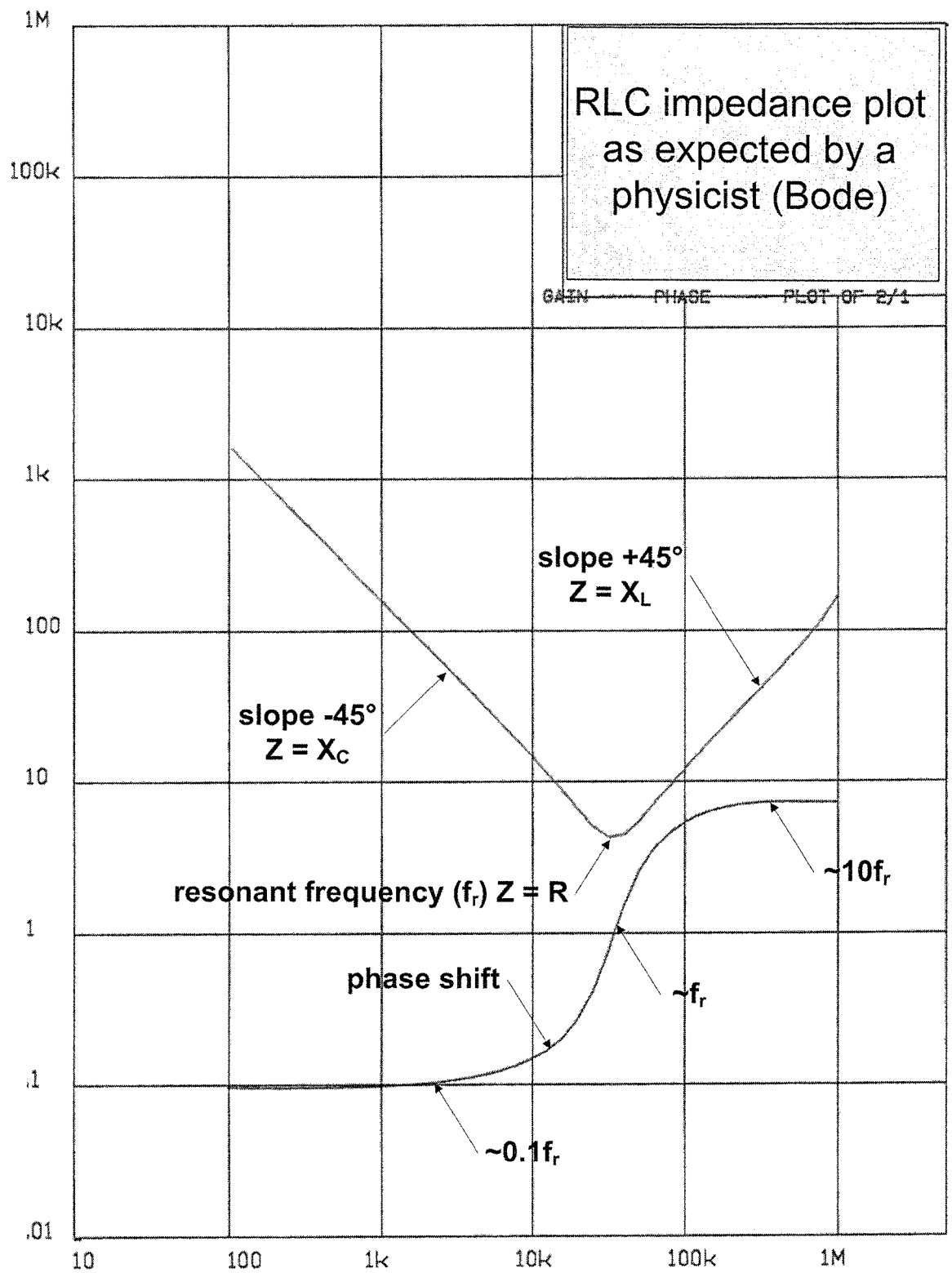
FIG. 28B – Expected Bode impedance plot of RLC circuit

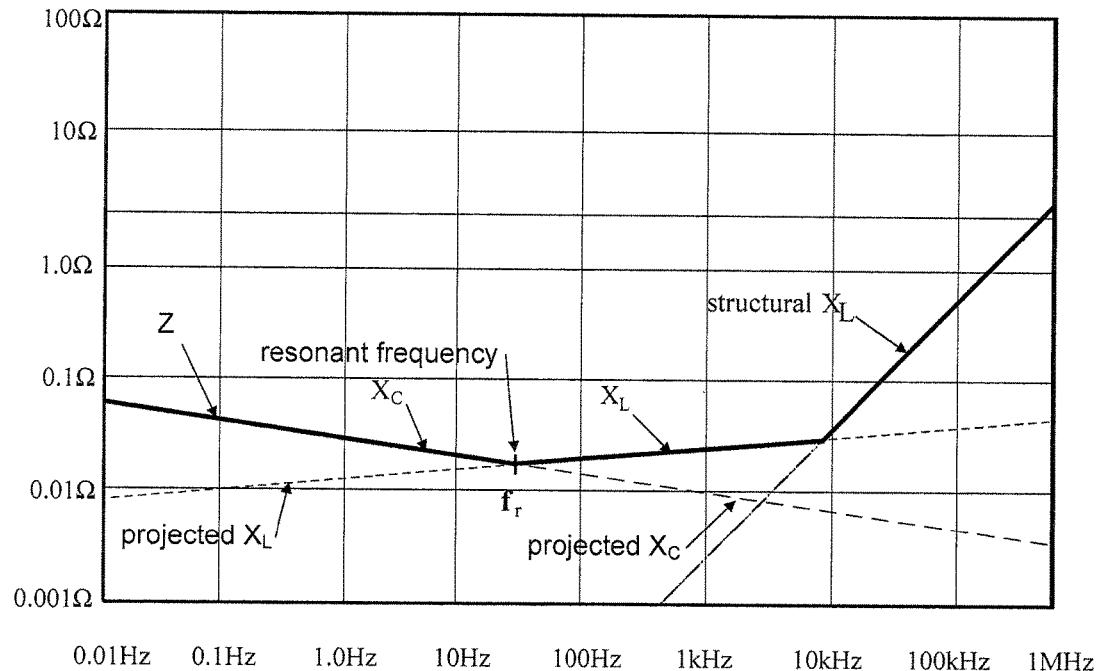
FIG. 28C – Impedance (Z) asymptotically plotted for generalized electrochemical system
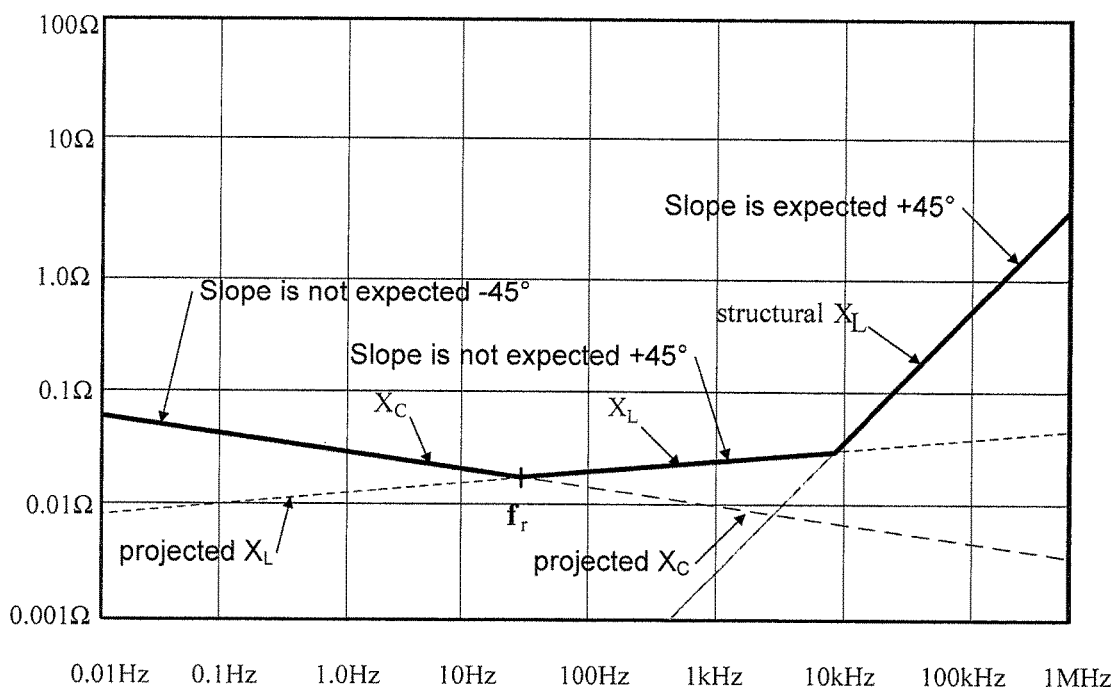
FIG. 28D – Impedance (Z) asymptotically plotted highlighting unexpected slopes

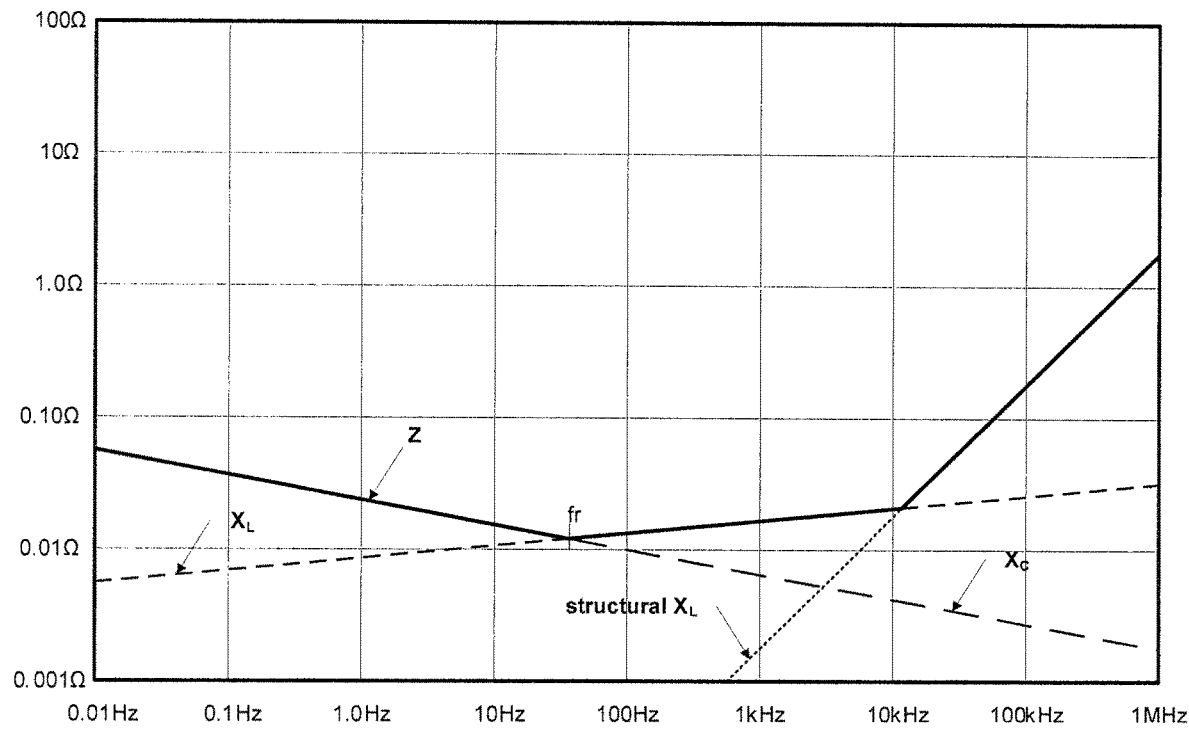
FIG. 28E – Generalized impedance plot for chlor-alkali process
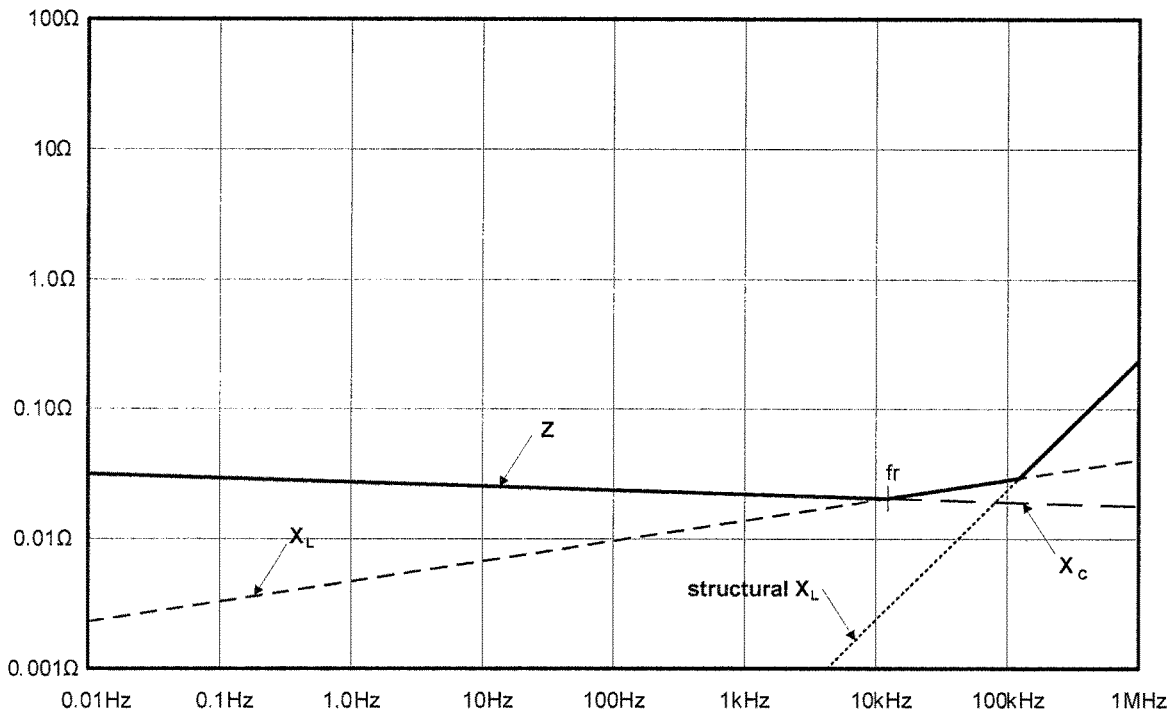
FIG. 28F – Generalized impedance plot for NiMH cell

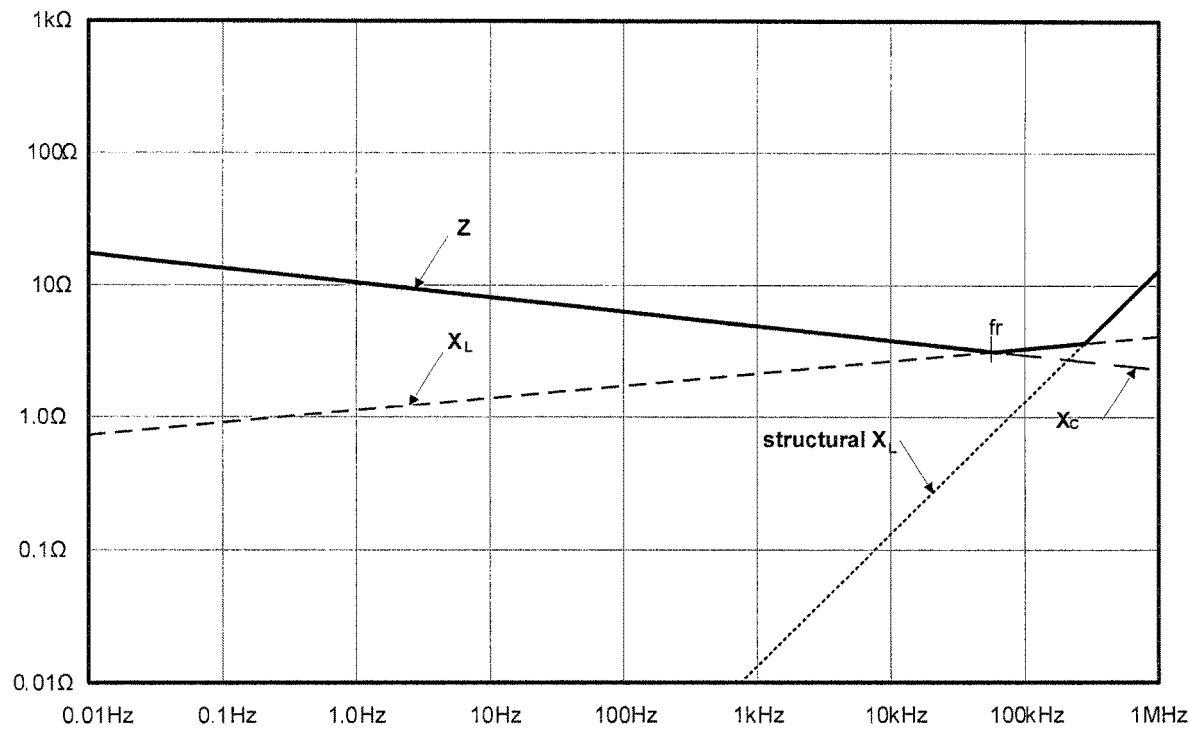
FIG. 28G – Generalized impedance plot of tin (II) chloride process
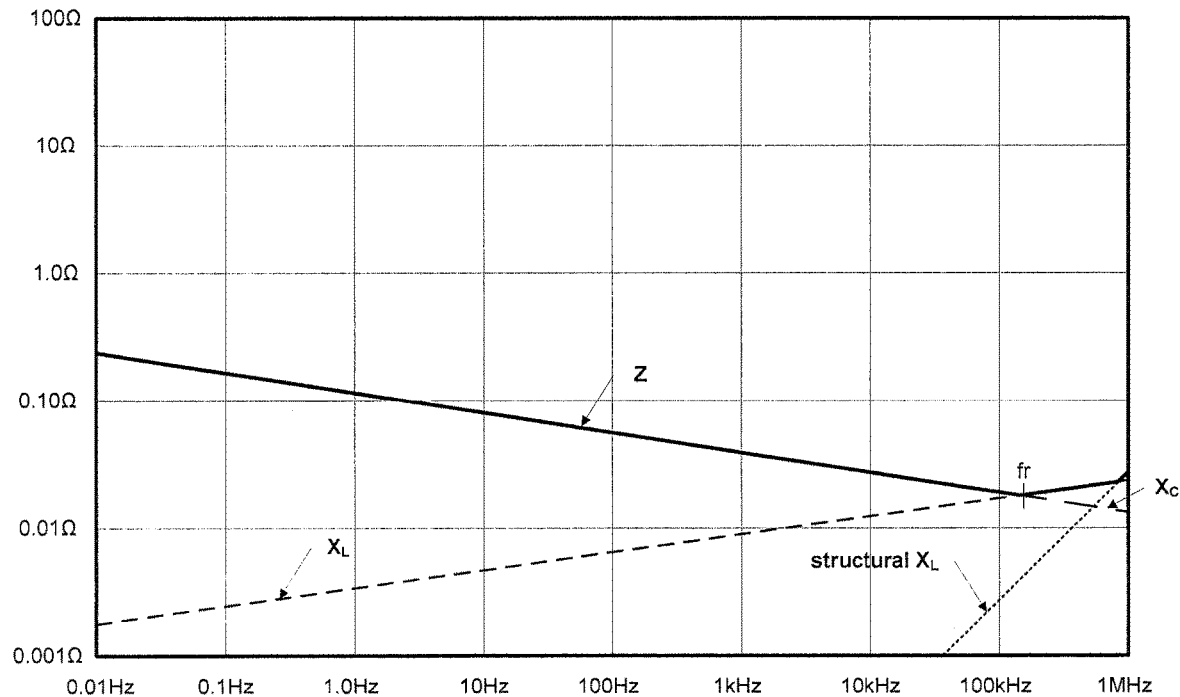
FIG. 28H - Generalized impedance plot of PEM 20-cell Fuel Cell

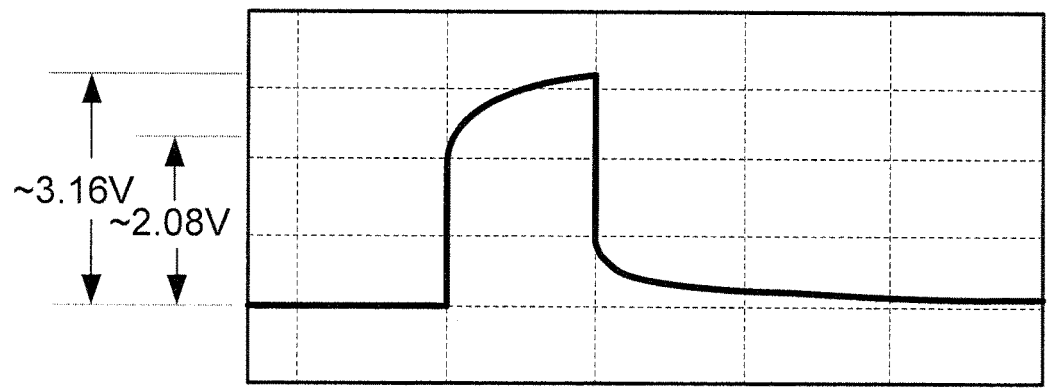
FIG. 29A – Polarization with 2.3 kA/m² pulsed-DC emf
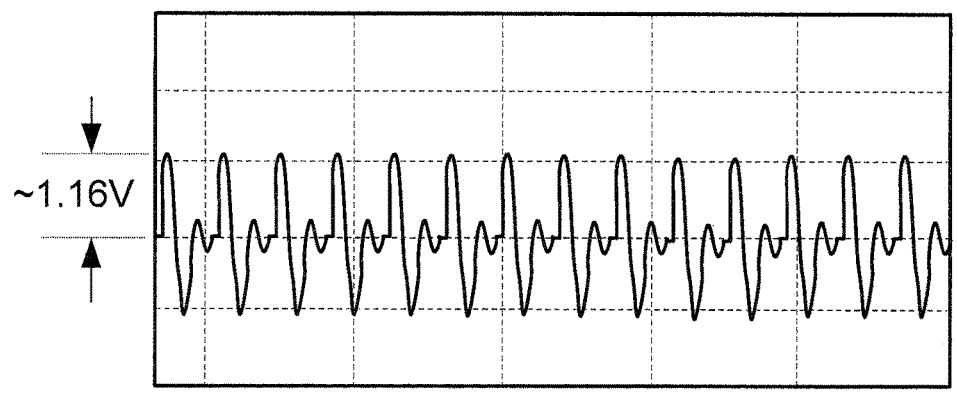
FIG. 29B – Polarization with 2.3 kA/m² damped sinewave emf

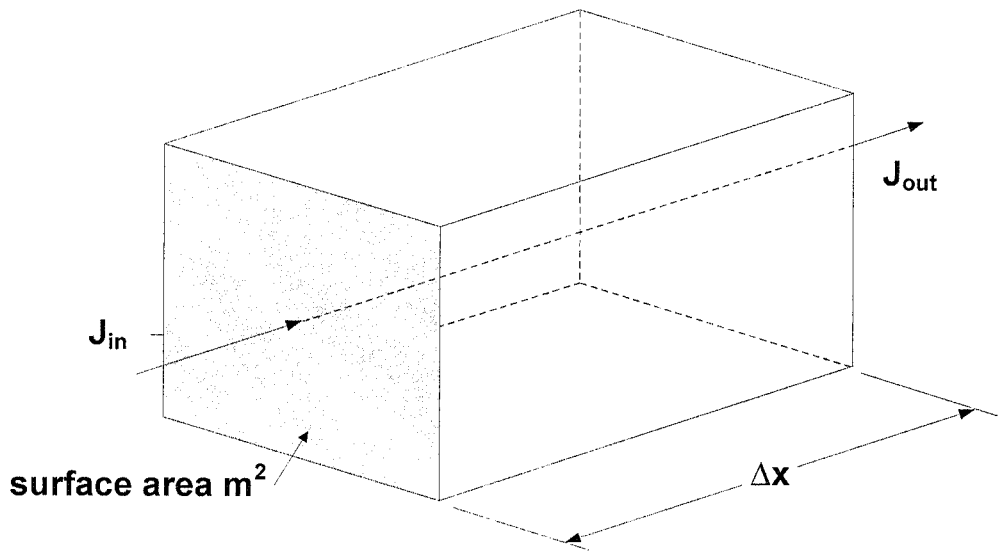
FIG. 30 – concentration gradient induced flux J, adapted from Eisenberg et al, Physical Chemistry, Fig. 15-7
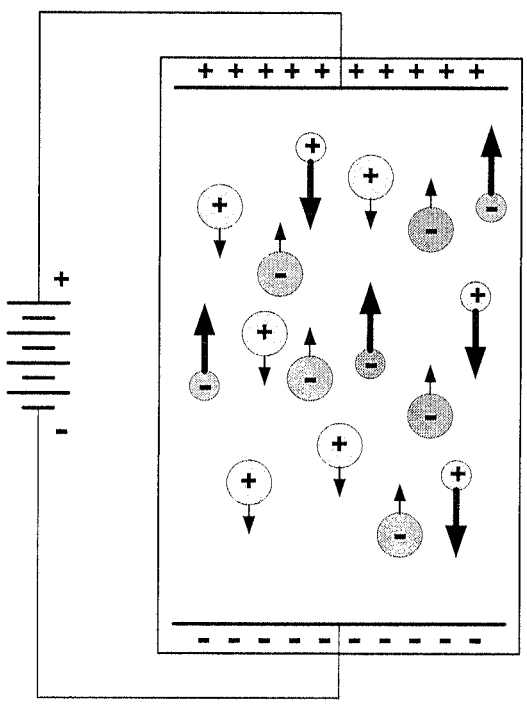
FIG. 31A – simplified block diagram illustrating electrophoresis
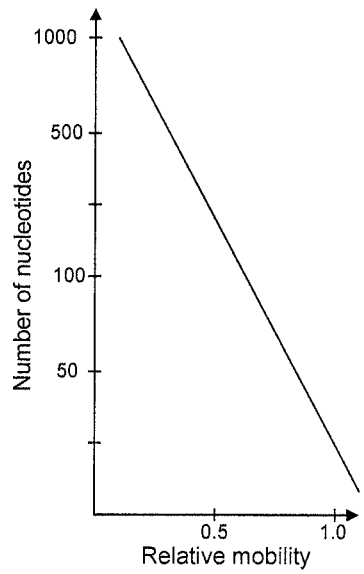
FIG. 31B – graph highlighting relative mobility of molecules based on logarithmic weigh, source American Chemical Society

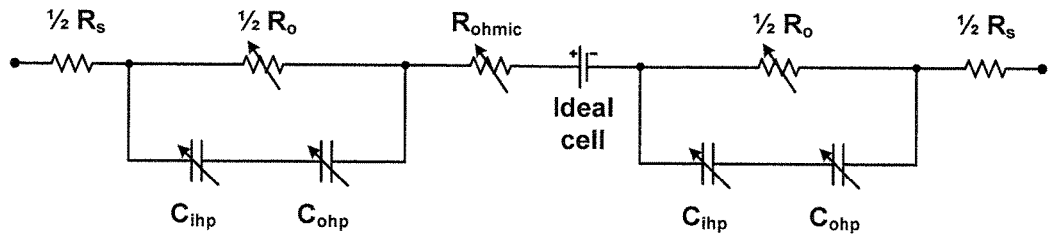
FIG. 32A – equivalent circuit highlighting both electrodes
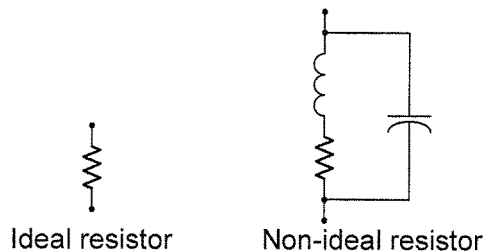
FIG. 32B – Ideal and non-ideal resistors
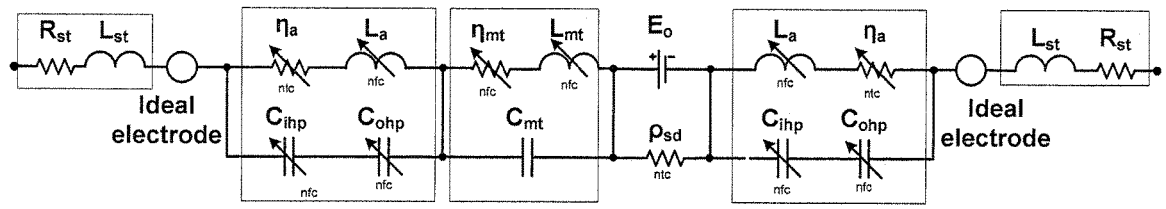
FIG. 32C – new equivalent electrical model minus parasitic elements
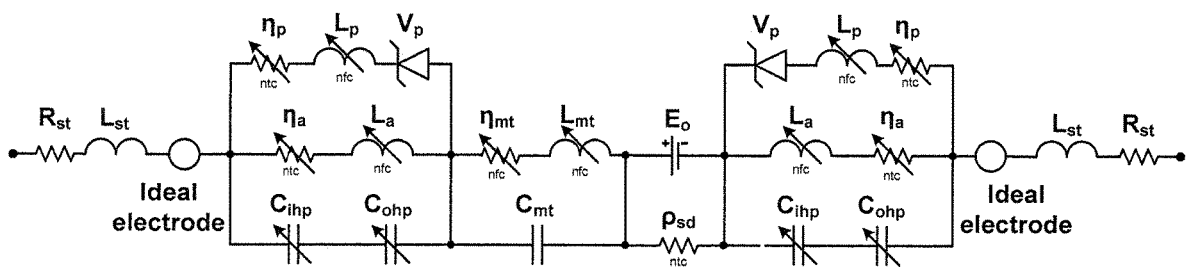
FIG. 32D – new equivalent electrical circuit model

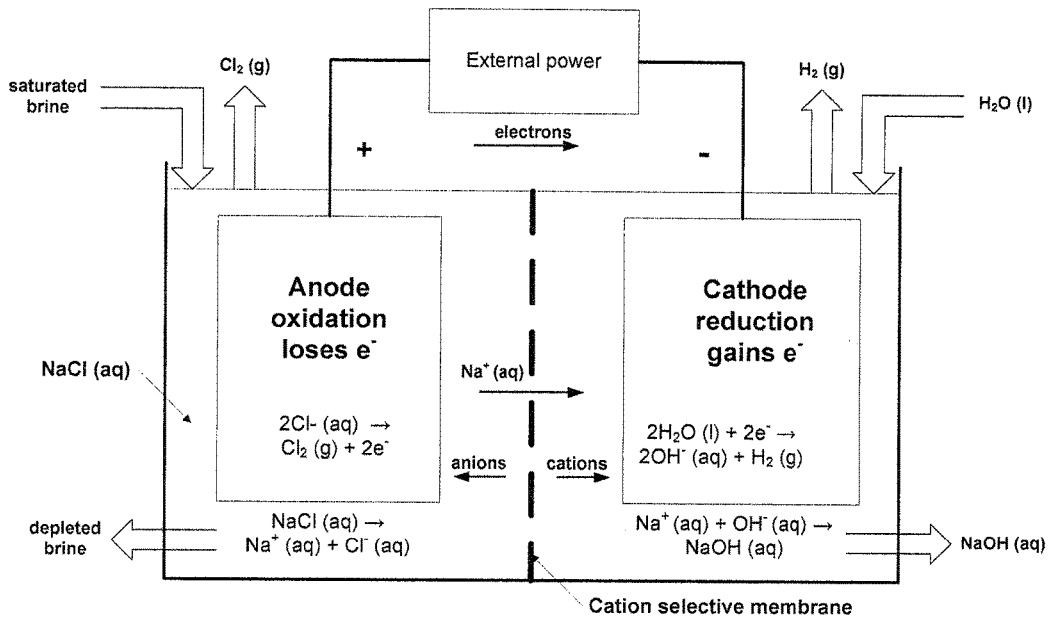
FIG. 33A – chlor-alkaline process block diagram
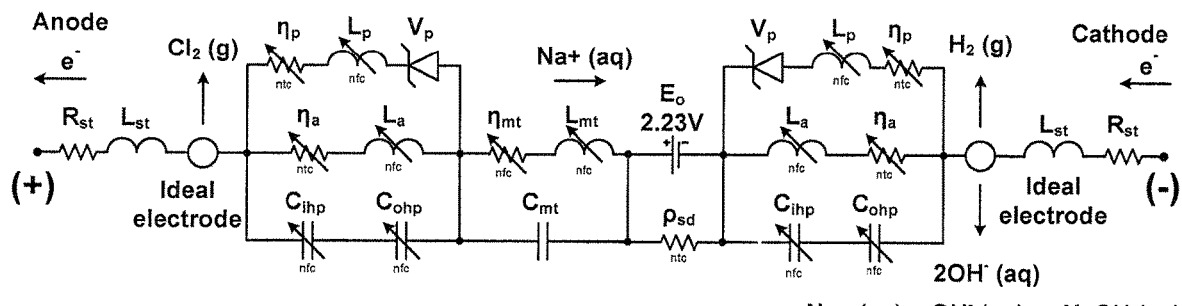
FIG. 33B – chlor-alkaline process equivalent electrical model
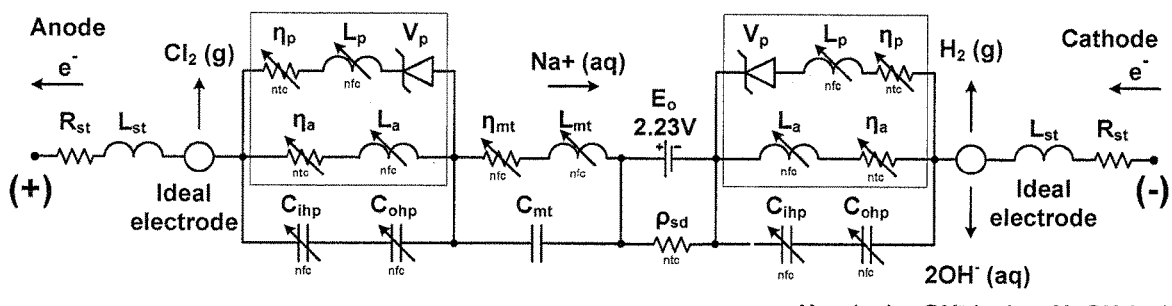
FIG. 33C – parasitic and gas bubble losses in chlor-alkaline process

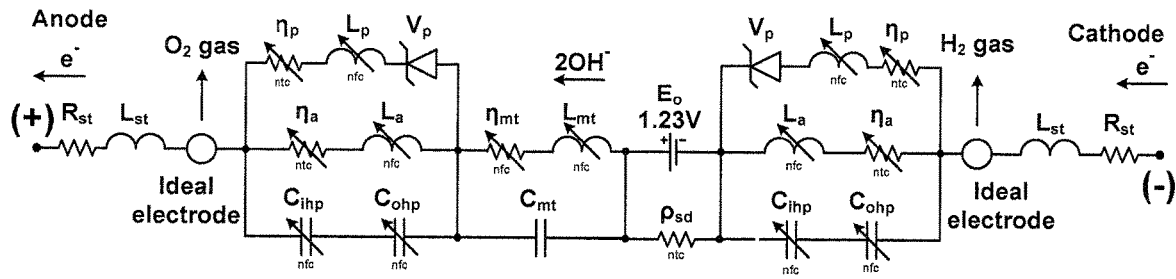
FIG. 33D – water electrolysis equivalent electrical model
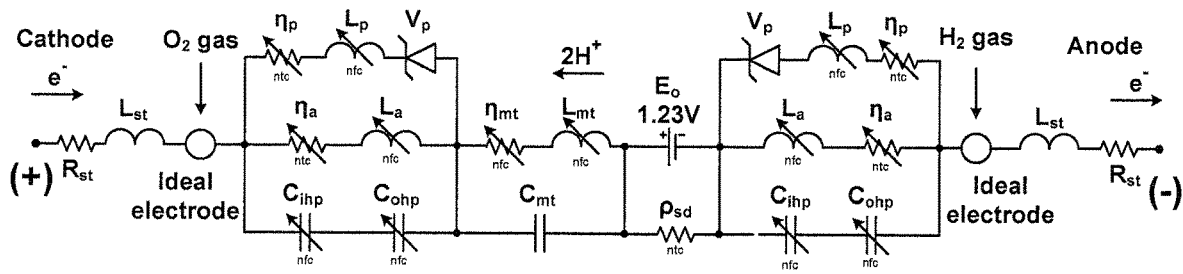
FIG. 33E – fuel cell equivalent electrical model
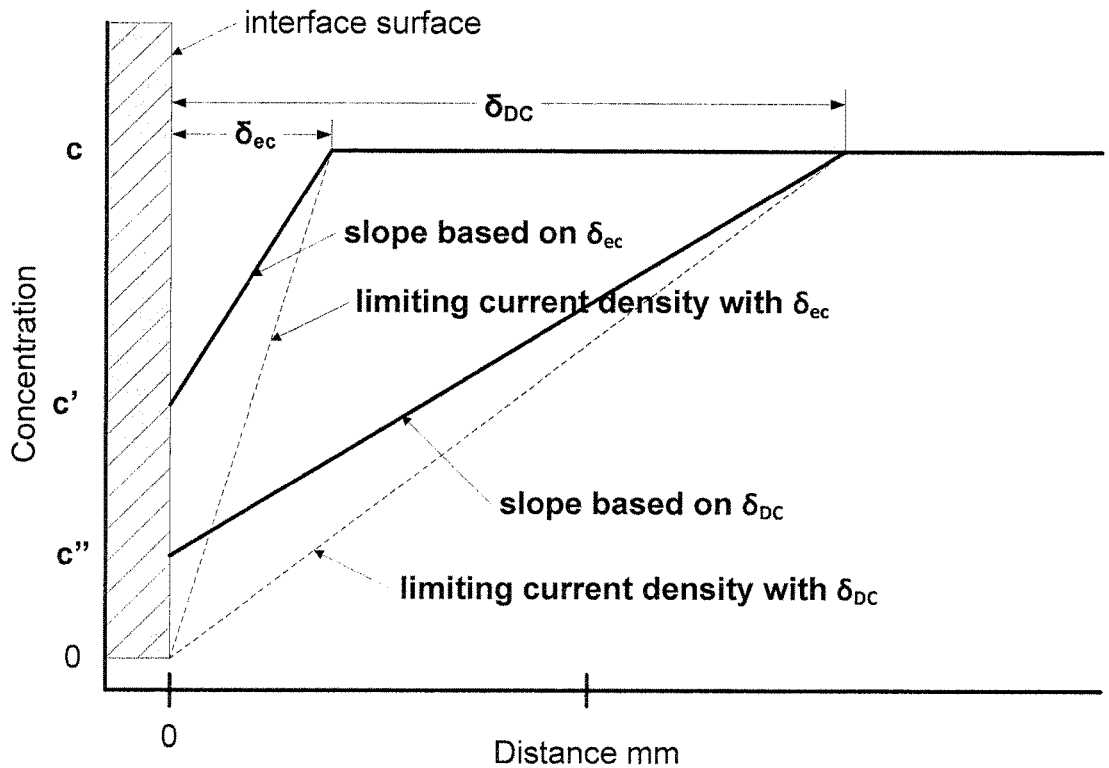
FIG. 34A

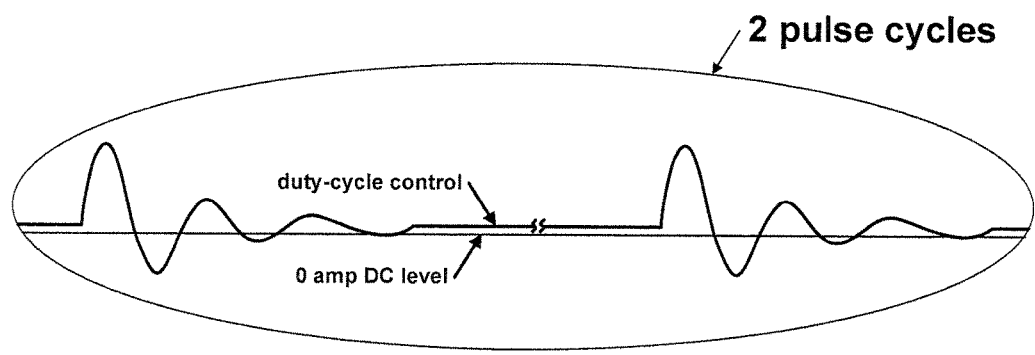
FIG. 35A – duty-cycle control
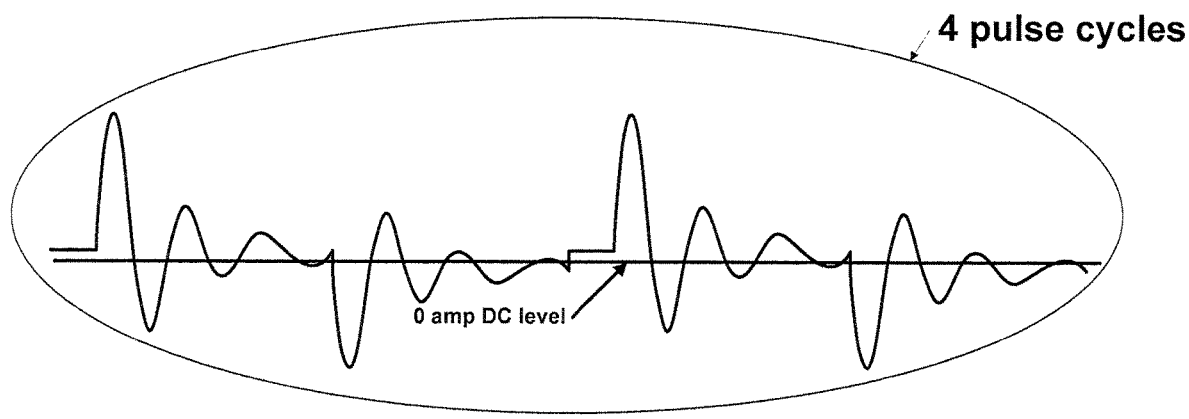
FIG. 35B – alternate positive and negative damped ac emf with DC offset

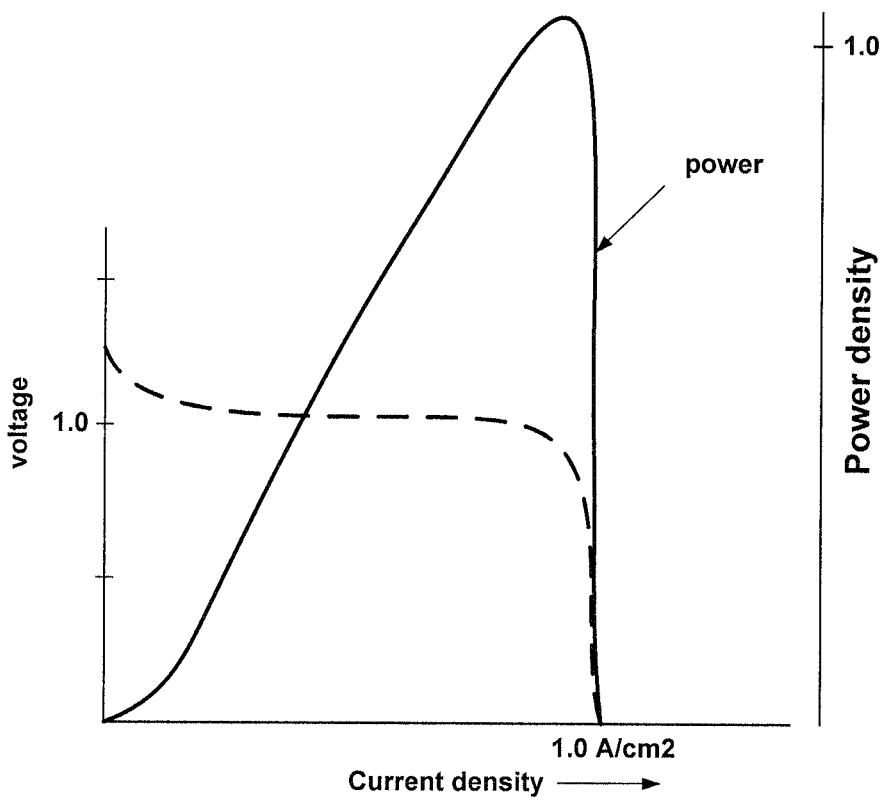
FIG. 36A – Fuel cell power density graph, adapted from Peter Atkins, Physical Chemistry Fig. 29.17
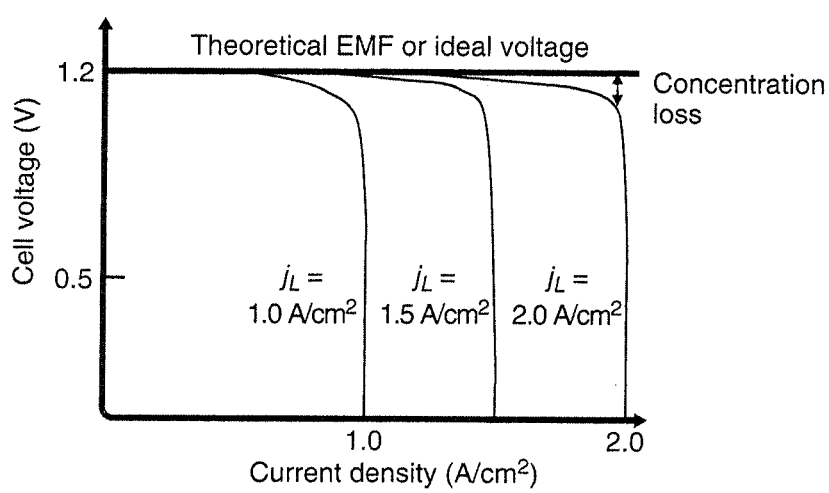
FIG. 36B – Effect of increasing fuel cell limiting current density $j_{lim}$, O'Hayre et al, Fuel Cell Fundamentals Fig. 5.5

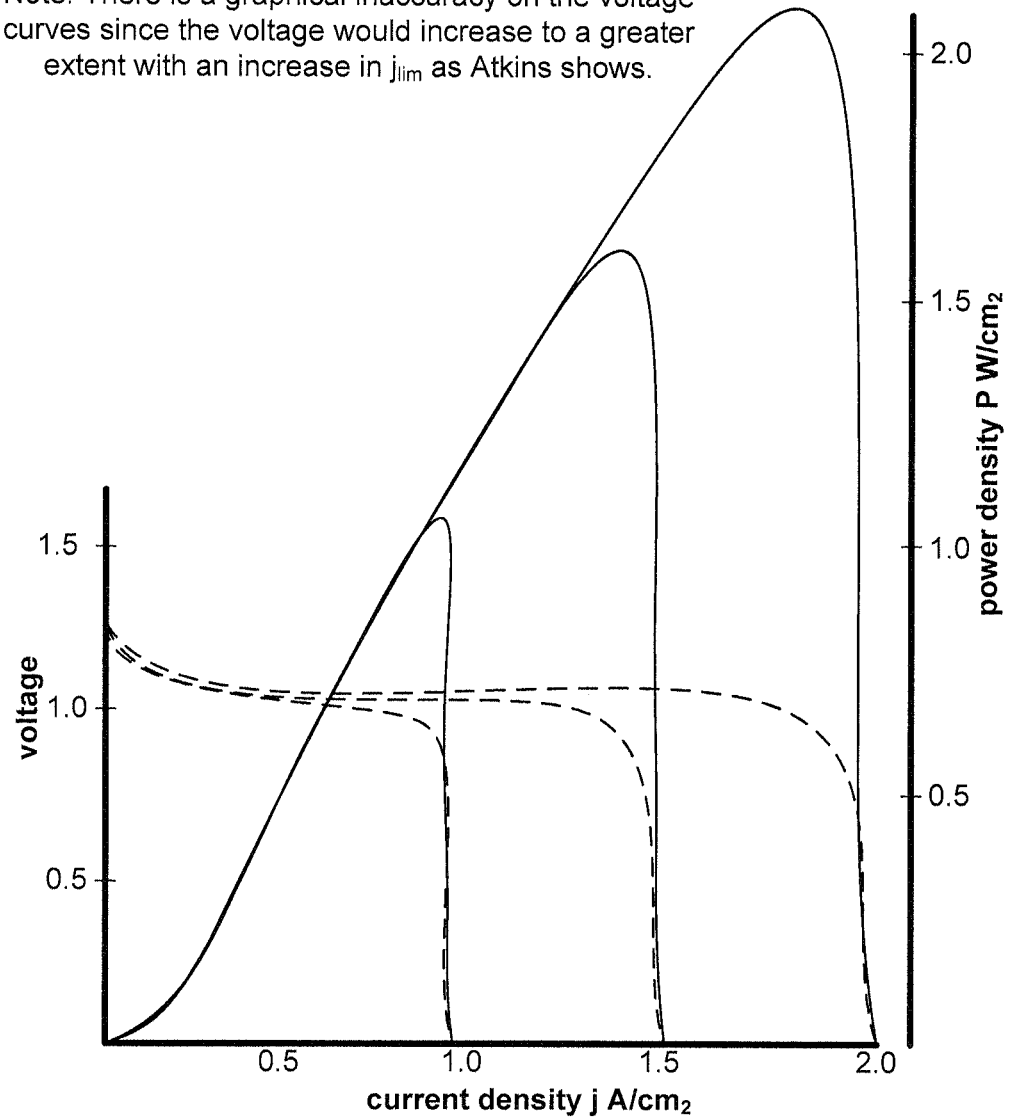
FIG. 36C – power density increase from increased limiting current density $j_{lim}$

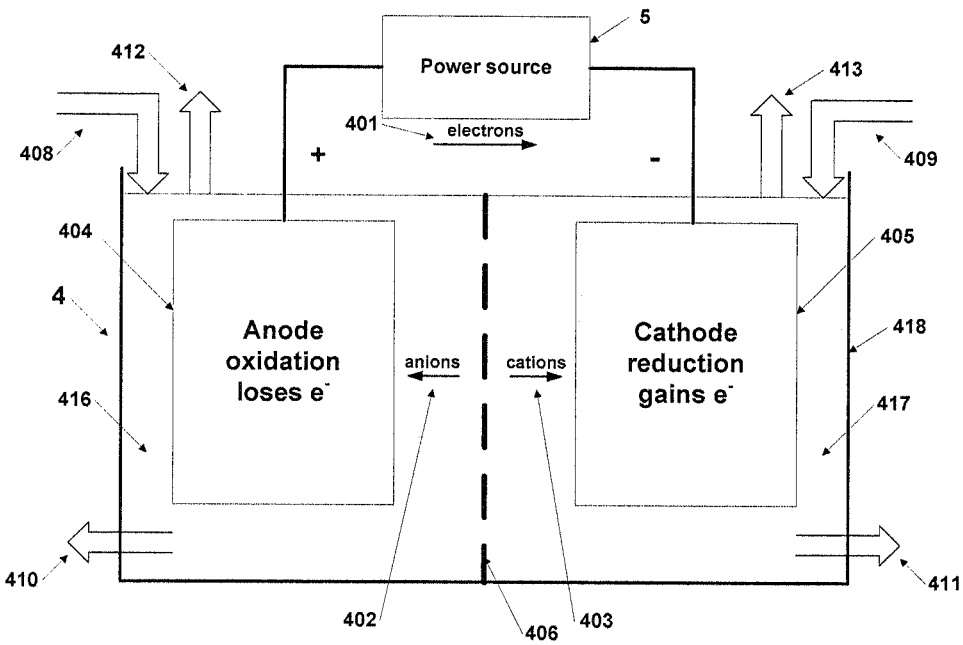
FIG. 37A – prior art electrochemical system block diagram
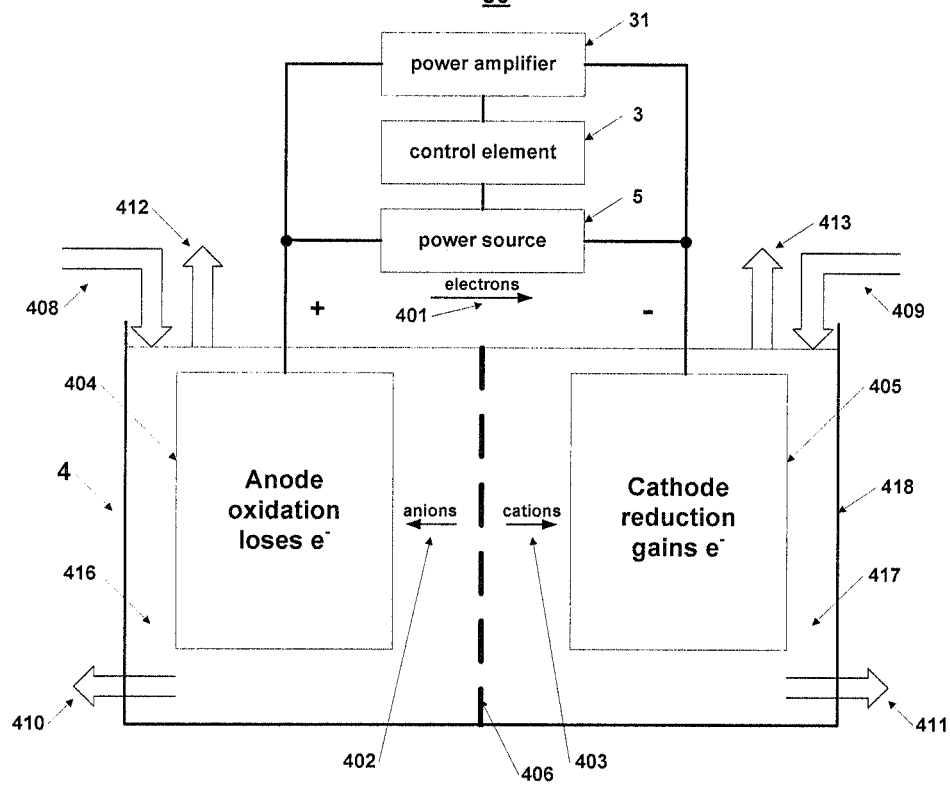
FIG. 37B – electrochemical system block diagram

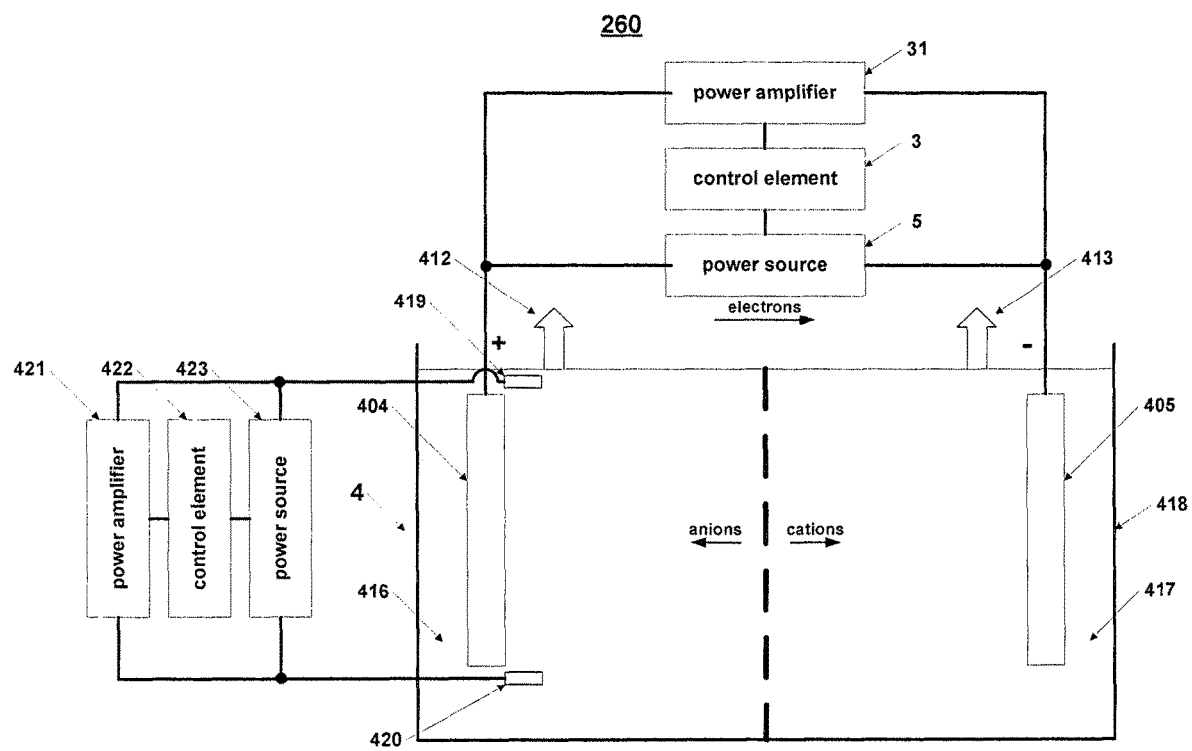
FIG. 37C – electrochemical system block diagram

SYSTEMS AND METHODS FOR CONTROLLING ELECTROCHEMICAL PROCESSES

CROSS REFERENCE TO RELATED APPLICATION

This application is a continuation-in-part of and claims priority to U.S. patent application No. 14/139,538 filed Dec. 23, 2013, which claims priority to U.S. Provisional Patent Application No. 61/912,097, filed on Dec. 5, 2013, both of which are incorporated herein by reference.

RELATED ART

Electrochemical systems are key to basically the entire industrial output of the world and life itself depends on electrochemistry. Man has been refining the processes since Volta's discoveries in 1796. Despite the effort, many systems and processes remain inefficient operating from DC emf and remain dependent on expensive catalysts and hazardous chemicals for small process improvements.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1 is system block diagram illustrating an exemplary XYZ-emf system 50.

FIG. 2 is a system block diagram illustrating a conventional emf system 60.

FIG. 5 is a simplified schematic diagram illustrating a conventional injection element and waveform generator system 70.

FIG. 6 is a simplified schematic diagram illustrating an exemplary emf system 120 implemented with an operational transconductance amplifier (OTA).

FIG. 9 is a system block diagram illustrating a conventional electrophoresis system 180.

FIG. 10 is a system block diagram illustrating an exemplary XY-emf electrophoresis system 200.

FIG. 14A is a simplified schematic diagram highlighting an exemplary conversion process used to convert an electrochemical system to a simplified RLC equivalent circuit. FIG. 14B illustrates series resonant RLC operation.

FIG. 15 is a simplified graphical representation of an electrical double layer (EDL) structure.

FIG. 16A-E highlight activation energy in reversible reactions and the effects of catalysts on activation energy.

FIG. 17A and FIG. 17B illustrate Nyquist impedance plots under different operating conditions.

FIG. 18 is a simplified schematic diagram describing the test circuit used for testing pulsed-DC and ac emf that became the de facto test circuit.

FIG. 19 is a series of photomicrographs illustrating exemplary effects of pulsating potential on deposition morphology.

FIG. 20 is a graph representing Nernst diffusion layer with DC emf.

FIG. 21 is a graph representing Nernst diffusion layer with pulsed-DC emf.

FIG. 22A-C illustrate an effect of the Nernst diffusing layer on current-density uniformity and parasitic effects.

FIG. 23A and FIG. 23B illustrate an effect of Nernst diffusion layer thickness on depth-of-penetration.

FIG. 24 highlights cell polarization with increasing current density and limiting current density.

FIG. 25 highlights the negative effects of pulsed-DC.

FIG. 26 compares the polarization voltage with increasing current density of a NiMH cell compared to a fuel cell.

FIG. 27A and FIG. 27B are simplified schematic diagrams illustrating electrochemical equivalent circuits.

FIG. 28A-H are Bode impedance plots for different electrochemical systems.

FIG. 29A is a voltage polarization plot developed from pulsed-DC. FIG. 29B is a voltage polarization plot, for the same cell, developed from an ac emf.

FIG. 30 is a three-dimensional (3-D) graphical representation of concentration gradient induced flux.

FIG. 31A and FIG. 31B illustrate electrophoresis.

FIG. 32A-D illustrate the development of a new electrochemical equivalent electrical model.

FIG. 33A-E illustrate an exemplary application of the new electrochemical equivalent electrical model.

FIG. 34A-C illustrate exemplary effects of different emf forms on the Nernst diffusion layer.

FIG. 35A and FIG. 35B illustrate two new waveform configurations.

FIG. 36A-C illustrate exemplary effects of current-density on the power-density for galvanic process.

FIG. 37A illustrates an embodiment of a conventional emf system.

FIG. 37B illustrates an exemplary embodiment of an emf system.

FIG. 37C illustrates an exemplary embodiment of a two-dimensional emf system.

Figure 3A:
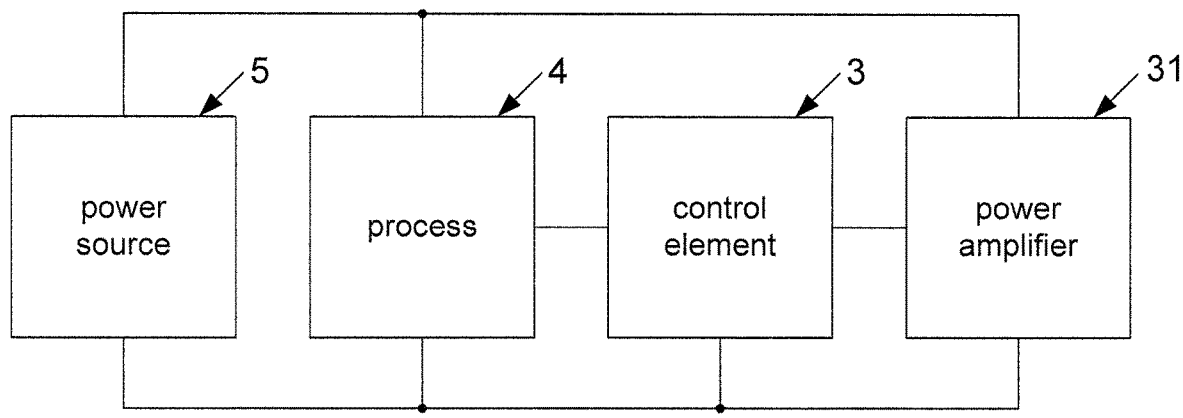
FIG. 3A is a system block diagram illustrating an exemplary emf system 80.

DETAILED DESCRIPTION,

A process improvement in electrochemical systems is described in U.S. Pat. No. 5,872,443, entitled "Electronic Method for Controlling Charged Particles to Obtain Optimum Electrokinetic Behavior", and issued Feb. 16, 1999, which is incorporated herein by reference.

U.S. Pat. No. 5,872,443 focuses only on a single-dimension (x-axis) versus time. The driving force for the reaction takes the form:

$$emf(x)=f(x)+h(x)$$

With the ac emf (electromotive force) component f(x) being a sinusoidal wave with an exponential decay described by:

$$f(x) = A * e^{-\frac{x}{B}} * \sin(c * x)$$

The value A establishes the amplitude, B defines the rate of decay, and C sets the frequency of oscillation. The function h(x) defines the DC offset (DC emf) and takes the form:

$$h(x) = D * \frac{\operatorname{atan}(R * x)}{\pi}$$

Value D is an offset multiplier and value R sets the rate of approach of the offset.

To develop the composite emf(x) requires superimposing the ac emf f(x) onto the DC emf h(x) by converting the electrochemical system into a simple RLC ac circuit as illustrated in the simplified schematic FIG. 14A. The relatively small value of the tuning capacitor effectively eliminates the much larger value of the electrochemical double layer (EDL) capacitor as well as the DC element. The relatively small tuning capacitor effectively eliminates the much larger EDL capacitor because capacitors in series add as the reciprocal so the smallest capacitor dominates:

$$\frac{1}{C_{net}} = \frac{1}{C_1} + \frac{1}{C_2}$$

The value of the inductor and tuning capacitor determine the desired resonant frequency $\omega_n$. One requirement is the use of a current source (forcing function) to inject an alternating current (ac) emf on the DC current. An inductor is not an ideal current source but it is adequate for this type of application. FIG. 14A does not show the external DC source since the conversion goal is to create an ac equivalent RLC circuit. Likewise, the required injection winding is not shown but will be discussed further.

The simplified schematic and graph in FIG. 14B highlight the development of a damped sinewave onto a DC source in a series resonant RLC circuit. The electrical circuit in FIG. 14B is a $2^{nd}$-order RLC resonant circuit governed by complex differential equations but can be converted to the s domain with the use of Laplace transforms and takes the form:

output response $Y(s)$=natural response $G(s)$*forced response $X(s)$

Y(s) is the resulting ac damped sinewave emf superimposed onto the DC offset emf. The natural response G(s) defines the natural response of the equivalent RLC circuit whereas the forced response X(s) defines the forcing function of the superimposed emf. The electrochemical system's resistance R ensures that the resulting RLC circuit is always a damped system (stable) and the forced oscillations will dampen out over time. A $2n^d$-order system will be underdamped, critically damped, or overdamped. The key to the degree of damping is the relationship between the inductor's reactance $X_L$ to the system's resistance R. Q is a dimensionless quantity that defines the degree of damping of the oscillation. The transfer function of the circuit is:

$$G(s) = \frac{Y(s)}{X(s)} = \frac{\omega_n^2}{s^2 + 2\xi\omega_n + \omega_n^2}$$

An underdamped system with complex roots takes the form:

$$\frac{R^2}{4L^2} < \frac{1}{LC}$$

$\omega_n$ is the undamped natural frequency:

$$\omega_n = \frac{1}{\sqrt{LC}}$$

$\xi$ is the damping ratio:

$$\xi = \frac{R}{2}\sqrt{\frac{C}{L}}$$

Inductive reactance is:

$$X_L = 2\pi f L$$

Q defines the degree of damping per:

$$Q = \frac{X_L}{R}$$

Figure 14C:
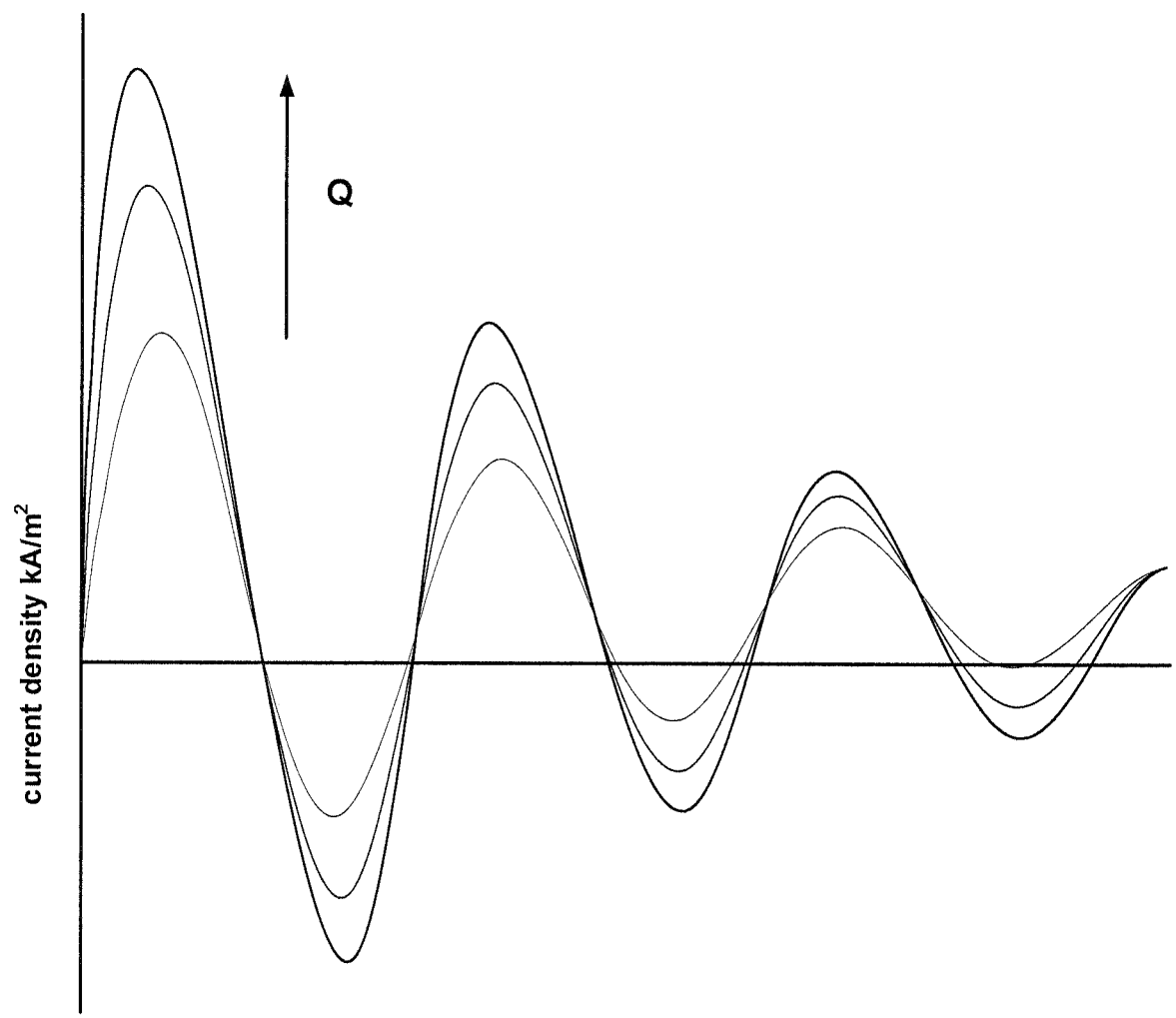
FIG. 14C is a graphical representation of the effect of circuit Q on a series resonant RLC circuit.

A $2n^d$-order system with Q>0.5 will be underdamped. FIG. 14C highlights the effect on the waveform with increasing Q. The selection of the inductor, after measurement of the system R, allows control of the resulting amplitude of the superimposed ac emf.

FIG. 2 and FIG. 5 highlight the block diagram and simplified electrical circuit described in U.S. Pat. 5,872,443. The separation of the injection element 1 and the waveform generator 2 deviate from the simplified approach given in FIG. 14A and 14B. The waveform generator 2, comprising an inductor 8 and a capacitor 7, is separated from process 4 (electrochemical system) by the winding of coupled-inductor 6. The complexity of the winding isolation makes matching of the inductor and capacitor to the electrochemical system more difficult. Direct coupling of the ac emf onto the DC emf via injection element 1 (coupling-inductor) further complicates the design of the coupling-inductor with the introduction of significant DC bias current into the core. The relatively large DC current increases the core size significantly, increases design complexity, and limits the power handling capability. The design process requires a high-degree of technical expertise while still reliant on trial and error.

In U.S. Pat. No. 5,872,443, the goal was to design the forced-response X(s) to make the output-response Y(s) resonant at the resonant-frequency of the natural-response G(s), but that view was flawed. The understanding at the time was based on the erroneous data describing how the physical structure of the system matched the electrical equivalent models. Empirical measurements and experiments lead to a deeper understanding of the physics of electrochemical systems and highlight flaws in the original understanding.

Faraday's Law of Electrolysis shows how the amount of chemical change produced by the passage of an electric current is proportional to the total quantity of electric charge:

$$m = \frac{QM}{zF}$$

With m being the mass, Q the total charge in coulombs ($6.24 \times 10^{24}$ e⁻), M the molar mass, z the valence #, and F the faraday constant (96,485 C/mol). Effectively mass (m) is proportional to the total charge Q. Mass (m) is better expressed as the product species flux J thus:

$$J \propto Q$$

The charge dQ:

$$dQ = i\, dt$$

Thus the total charge:

$$Q = \int_0^t i\, dt$$

A key to electrochemical reaction rates is the ability to manipulate an additional electrical potential that results in much greater control of the reaction process. A one-volt change at the surface of the electrode can result in an eight-order-of-magnitude increase in the reaction rate. This amount of change is equivalent to a temperature change of several hundred degrees in a chemical process. The Butler-Volmer equation expresses the electrode kinetics by relating the current-overpotential relationship to the exchange current ($i_o$) and the anode and cathode transfer coefficients. For large overpotential values, a simplification of the Butler-Volmer equation results in the Tafel equation:

$$i = i_o \exp\left(\frac{\alpha_a F}{RT} \eta_a\right)$$

With $\eta_a$ being the surface or activation overpotential, $\alpha_a$ the anode transfer coefficient, R the universal gas constant, and T the temperature in degrees Kelvin. The exchange current ($i_o$) is very important to reaction rates and catalytic effects. Note: Many authors use exchange-current-density $j_o$ and it will be used from this point.

The electric mobility μ (m²/Vs) of a charged particle is its drift velocity (m/s) in the field (V/m). The current density is expressed as j and the conductivity as σ. The x-axis displacement of a charged particle under a DC field can be estimated from the equation:

$$dx = \mu E\, dt = \mu j \sigma\, dt$$

Current density j (A/m²) is the average current per surface area s and takes the form:

$$j = \frac{di}{ds}$$

The potential developed across the cell is equal to the thermodynamic or reversible potential of the reaction plus the overpotentials or irreversible potentials that develop. The following simplistic equation defines the overpotentials:

$$V = \eta_a(\text{anode}) + \eta_c(\text{anode}) + IR - (-\eta_a)(\text{cathode}) - (-\eta_c)(\text{cathode})$$

The term $\eta_c$ is the concentration overpotential and the term IR represents the ohmic losses. The cathode overpotentials are negative by convention so that the five components are added to define the overpotential across the cell. The IR components can be quite complicated and result from many sources, such as, gas-bubble effects in processes that involve gases.

The activation overpotential $\eta_a$ controls the reaction rate and reflects the occurrence of an electrical double layer (EDL) structure that is present at the solid-liquid (surface-solution) interface. This EDL appears as a capacitor in parallel with the reaction process. The electric field developed by the EDL acts to impede the electrical field driving the reaction rate. FIG. 15 depicts a simplified model of the EDL. The water dipoles comprise the dielectric material for the capacitance that develops. On FIG. 15, d defines the distance from the surface where the influence of the EDL effectively ends and d is on the order of 100 nm from the surface. Clearly, the EDL, ions, water dipoles, and electrode form a very complex and fluid heterogeneous structure. It is critical to understand this structure is a fluid structure dependent on the electrical forces.

The Debye-Hückel theory explains that an ion atmosphere is surrounding each ion in the electrolytic solution. This ion atmosphere restricts ion mobility when current passes through the medium. Stern combined the Debye-Hückel theory with the previous electrical double layer theories. Stern described the double layer structure as two double layers, one fixed and immobile near the surface and the other a diffuse region extending into the solution. Frumkin added a correction to the Stern model to account for the changes in the double layer structure caused by localized variations in the concentration of the reactants and reaction products.

Stern described the capacitance of the two double layers as two capacitors connected in series. The inner Helmholtz plane (IHP) capacitance designated as $C_h$ and the diffuse or Gouy-Chapman layer or outer Helmholtz plane (OHP) designated as $C_{gc}$. Since the water dipoles are the dielectric material and the reactant species act as contamination to the dielectric, the capacitance value is greatest when the concentration of reactant species approaches zero. The result of this arrangement is that the smaller capacitance dominates the effective capacitance $C_s$ (Stern capacitor) of the double layer structure per the equation:

$$\frac{1}{C_s} = \frac{1}{C_h} + \frac{1}{C_{gc}}$$

The distance from the surface to the IHP is roughly one nanometer (nm) and the distance from the surface to the OHP is about three nanometers. If the potential across the IHP (1 nm) is 100 mV then the field strength across the region is very large at $1 \times 10^8$ V/m. This very powerful DC electric force locks the water dipoles in place. This potential acts as a kinetic resistance to the reaction. The potential energy of an ion in the electric field is based on the formula zeψ, with z equal to the valence of the ion and e equal to the charge on the electron. The potential ψ can easily be hundreds of millivolts. The water dipoles are affected by both the electric field and the reactant species. Inside the IHP, the electric field has a stronger effect on the water dipoles' orientation but outside the IHP, the water dipoles are more strongly affected by the reactant species. The water dipoles hydrate the ions based on the charge of the ion.

Another important factor is that outside the OHP the reactant species are too distant from the surface to react. The significance is that the driving force for the reaction is the potential developed across this roughly 3-nm layer. The activation overpotential thus dominates the reaction rate. Thus, the EDL structure dominates the activation energy required to overcome the activation barrier.

As stated, the EDL structure is not a rigid capacitor because it depends on water dipoles as the dielectric. The capacitance of the EDL is determined by:

$$C = \epsilon \frac{A \text{ (area)}}{d \text{ (distance)}}$$

The dielectric permittivity $\epsilon$ is dependent on the purity of the water dipole layer (IHP) thus the absence of ions in the IHP. The surface area is large and the distance, ~1 nm, is very small so the resulting capacitance is very large. The capacitance is greatest when the concentration at the surface is zero. Very large individual biological macromolecules reportedly form EDL structures because of their surface charge.

FIG. 16A highlights the activation energy in a reversible reaction. FIG. 16B shows a water reaction as an example of a reversible reaction to highlight the activation barrier. $\Delta H$ is the heat of formation, $E_a$ is the activation energy of the forward reaction, $E'_a$ is the activation energy of the reverse reaction, and the activated complex is the transition state that exists while bonds are formed or broken. At equilibrium, neither reaction is favored. When bonds are forming from reactants, the reaction is exothermic and must release energy, in the form of heat, equal to $E_a$ to proceed. When bonds are breaking, the reaction must absorb energy, in the form of heat, equal to $E'_a$ to split into reactants. The current that flows at equilibrium is the exchange current density $j_o$. FIG. 16B shows that the forward reaction proceeds from step 1 to step 4 and the reverse reaction proceeds from step 4 to step 1. An increase in external temperature will favor the endothermic reaction and a decrease will favor the exothermic reaction.

The very strong voltage field across the EDL means that ions have difficulty entering the EDL. Reaction rates are based on the percentage of reactants that have sufficient energy to overcome the activation barrier. Decreasing the activation barrier increases the reaction rate because a greater percentage of the ions have sufficient energy to overcome the kinetic resistance. Catalysts lower the activation energy in a reaction with no net chemical change. A catalyst provides an alternate path or reaction mechanism to lower the energy-barrier between reactants and products. FIG. 16C illustrates the effect of a catalyst on the activation barrier. Some metal catalysts promote the reaction by adsorption of the reactants on the metal surfaces thereby effectively increasing the concentrations and interfacial surface contact. FIG. 16D illustrates the catalytic effect of platinum (Pt), a very expensive but important catalyst, fragmenting hydrogen in hydrogen ions. The fragmentation occurs at the triple phase boundary between the hydrogen molecule, the fragmented hydrogen ions, and the released electrons.

FIG. 16E illustrates the catalytic effect of exchange current density $j_o$ on the overpotential voltage at various current densities thus explaining why expensive catalyst, such as platinum, are often required. Other factors affect catalysts as O'Hayre et al, note in FUEL CELL FUNDAMENTALS. Pt in an acid electrolyte has an exchange current density of $\sim 10^{-3}$ A/cm$^2$ while Pt in an alkaline electrolyte is $\sim 10^{-4}$ A/cm2. They also note, the exchange current density for nickel (Ni) in an alkaline electrolyte is $10^{-4}$ A/cm$^2$ and $10^{-5}$ A/cm$^2$ in an acid electrolyte. Exchange current density $j_o$ represents the rate of exchange between products and reactants at equilibrium. Ways to increase exchange current density: a. Increase concentration at surface C'; 2. Decrease the activation barrier $E_a$; 3. Increase temperature; and 4. Increase surface area or reaction site. Activation barrier $E_a$ is an exponential component so small changes cause large effects.

Contributing to the lack of progress in improving the understanding of electrochemical systems is the unfortunate selection of displaying impedance measurements with Nyquist diagrams in test instrumentation, such as Electrochemical Impedance Spectroscopy (EIS). Nyquist diagrams give a polar plot of the open-loop electrochemical system transfer function. The polar plot allows for a graphical analysis of the system gain margin and phase margin. To develop the Nyquist diagram it is necessary for conformal mapping or transforming the information from the s-plane to the P(s) plane. The impedance is presented as a complex number and plotted with $Z_{real}$ on the x-axis and $Z_{imag}$ on the y-axis. The effectiveness is limited because of the difficulty extracting useful information from the graph. The main reason the data is so difficult to interpret is the shape of the polar plot changes with simple changes or modifications to the operating conditions of the electrochemical system. The process can take considerable time and the electrochemical system must remain relatively unchanged. It is very difficult to translate the data into absolute values and it is difficult to determine the test frequency for a particular data point. The EIS employ algorithms to find the best fit between predefined models and measured data. The need for predefined models emphasizes the great potential for faulty or ambiguous results. The measurement of inductance triggers an error because the algorithm presumes electrochemical systems cannot exhibit inductance. In reality, the self-inductance presents as the opposition to changes in current over time (di/dt). The models also presume that the EDL is fixed in the range of 20-60 μF/cm$^2$ FIG. 17A and 17B highlight an example of Nyquist polar plots for a fuel cell operating at different conditions. FIG. 17A shows the complex polar plot at the one operating condition. FIG. 17B shows 3 different operating conditions, for the same fuel cell, and the 3 very different polar plots.

Contemporary literature describes the typical capacitance developed over the EDL region to be relatively constant and range between 10 μF/cm$^2$ and 50 μF/cm$^2$. Historically, the EDL was studied using a growing drop of mercury in water to develop the capacitance per area. Most instruments for measuring capacitance make the measurement at a single frequency. In earlier instruments, the frequency was typically 60 Hz and in newer instrumentation, the frequency was typically 1 kHz. The measurement techniques and instruments used have contributed to many errors in the contemporary understanding of the EDL. The belief that the EDL capacitance is relatively fixed is the first of the several serious errors when in fact is the capacitance varies with frequency and operating conditions. The Frumkin correction to the Stern model accounts for the changes in capacitance caused by localized concentration levels but researchers often overlook this fact.

A second error occurs when the model developed from the growing drop of mercury, a single electrode, is used to describe a complex cell with two or more electrodes. An EDL layer occurs at both electrodes. The effect is four capacitances in series. A further problem is the misconception that the EDL is similar to a physical capacitor with rigid plates and solid dielectric material. The actual EDL structure is fluid and thus dynamic. It is also important to note that the $C_h$ capacitors at the anode and cathode have to be different. Cations, because of Gibbs free-energy restrictions, rarely enter the IHP. Since the cathode IHP has relatively pure dielectric, the capacitance is very large, so the anode's smaller capacitance often dominates external measurement of cell impedance. Equally important, the anode IHP capacitance will be normally small, compared to the cathode, except in the case when operating near the limiting-current-density. When operating near the limiting-current-density, the concentration at the anode interface can become depleted, thus the permittivity of the dielectric would increase resulting in larger capacitance. Additionally, the IHP at the anode is only relatively fixed when operating under static DC conditions and only if operating below the limiting-current-density. Any change in concentration levels in the EDL will result in a change in capacitance value. These factors help explain why the complex EDL capacitance varies with operating conditions.

One additional error, which has caused great confusion, was an unfortunate selection of the circuitry and components used in many studies on the use of ac waveforms and pulsed-DC. In literally hundreds of papers on the subject, the simple external circuitry used caused serious measurement errors. Notable studies include El-Haft et al, INFLUENCE OF A SUPERIMPOSED A.C. ON CADMIUM ELECTROPLATING FROM AN ACIDIC CHLORIDE BATH, and Srimathi et al, ELECTROPLATING OF THIN FILMS OF Fe—Ni ALLOYS: SOME EFFECTS OF SUPERIMPOSED ALTERNATING CURRENT ON DIRECT CURRENT. This technique used an external ac generator and separate DC supply to study the effect of an ac emf on electrochemical systems. An external capacitor was used to block the DC current at the ac generator and a large external inductor was used to block the ac signal at the DC supply. In the early studies, the capacitor used was 100 µF and the inductor 2.5 H. When combined, the external LC circuit forms a filter, with a resonant-frequency of 10.07 Hz that effectively filters the higher ac emf. More important, the small size of the external capacitance, compared with the large capacitance of the electrochemical cell, caused the external capacitance to dominate the results. The smaller external capacitor consumed the majority of the ac emf. An ac analysis shows that for each volt of signal being applied only microvolts to a few millivolts are expressed across the cell. The key error is attempting to inject voltage via small coupling capacitor. FIG. 18 is a simplified schematic diagram showing the de facto test circuit responsible for so many errors.

The test circuit error was often compounded when a computer model was generated using a fixed capacitor value for the EDL. With a simple equivalent circuit model, such as FIG. 27A, using a fixed capacitor value for the EDL and a varying frequency, the computer-generated results would confirm the experimental results. A good example of the use of this simplistic model shown is Maksimovi et al, in INFLUENCE OF THE DOUBLE-LAYER CAPACITY IN PERIODICALLY CHANGING RATE METAL ELECTRODEPOSITION.

Fawzy et al, in EFFECT OF SUPERIMPOSED SINUSOIDAL AC ON THE CHARACTERISTICS OF ELECTRODEPOSITED Ni, Cu, and Cu—Ni ALLOY COMPOSITES WITH α-$Al_2O_3$ and $TiO_2$, erroneously concludes that the lower polarization at high-frequency results because the periodic-fluctuation of the process-potential is not able to follow the fast change in current (caused by the high frequency), and consequently, the effect of the ac on the process gradually diminishes as the frequency increases. Maksimovi et al, in THE DAMPING EFFECT OF DOUBLE LAYER CAPACITY IN A.C. SUPERIMPOSED ON D.C. METAL DEPOSITION, incorrectly concludes that due to the damping effect of the EDL, the positive effect on nucleation is greatest at 50 Hz and decreases to negligible amounts as the frequency approaches 5 kHz. Maksimovi et al, in THE EFFECT OF THE PERIODICALLY CHANGING CURRENT ON THE ELECTRODEPOSITION OF Ni—Fe ALLOYS, discusses the merits of pulse plating, reversing current (reverse pulse plating), and sinusoidal-ac superimposed on DC. Maksimovi also gives a noteworthy discussion on the evolution of hydrogen gas, as a parasitic process, and how the increase in hydrogen will cause a local pH rise [sic] near the electrode surface. The conclusion given is that reversing current is more effective than the ac but that the benefits decrease with increasing frequency.

In the electroplating and electrodeposition fields, considerable research has been conducted in the reverse pulse plating process to improve the uniformity of the deposit. In this pulsed-DC process, the current is alternated between positive and negative levels at various duty cycles. In U.S. Pat. No. 4,666,567, issued to Loch, a time ratio between the positive current and negative current maintains the process voltage below a burn voltage level. In any pulsed-DC process, the low duty cycle reduces (slows) the throughput of the operation. With reverse pulse plating, reverse plating effects (reactant species are pulled away from the electrode surface) further slow the processes.

In U.S. Pat. No. 5,026,465, issued to Katz et al, the DC emf is reversed periodically to remove deposited material from the membrane structures to prevent clogging of the electrodeionization equipment.

Paunovic and Schlesinger, in FUNDAMENTALS OF ELECTROCHEMICAL DEPOSITION pages 187 to 193, describe the difficulty of simultaneous codeposition of two or more metals at moderate current densities. They further describe how the parasitic evolution of hydrogen gas can completely control the cathode potential that develops and result in poor efficiency for alloy deposition. PULSE-REVERSE PLATING OF NANOCOMPOSITE THIN FILMS, in PULSE-REVERSE PLATING OF NANOCOMPOSITE THIN FILMS, show that pulse-reverse plating permits enhancement of particle concentrations in a metal matrix but under low duty-cycle conditions.

When applying a potential to an electrode, the charges accumulate on the surface and attract ions of opposite charge plus molecules that have a dipole moment. According to the rate equation, a reaction may slow because the reactants attempting to reach the reaction site must compete with other species already there plus any reaction products accumulating at the site. Irreversible losses result from transport limitations and these factors are responsible for ohmic losses and heating. Vigorous mechanical stirring of the solution can increase the rate of mass-transport in such systems.

Atkins, in PHYSICAL CHEMISTRY pages 723 to 724, defines four transport properties as diffusion, thermal conduction, viscosity, and electrical conduction. Atkins describes electrical conduction as the migration of electric charge along a linear potential gradient.

Despic and Popov, in THE EFFECT OF PULSATING POTENTIAL ON THE MORPHOLOGY OF METALS DEPOSITS OBTAINED BY MASS-TRANSPORT CONTROLLED ELECTRODEPOSITION, in 1971, and Ibl-SOME THEORETICAL ASPECTS OF PULSE ELECTROLYSIS, in 1980, shows the benefit of thin pulsed-DC on the δ layer-thickness but they offered different formulas to define the effect. FIG. 19 shows that Despic and Popov achieved great improvements in deposition morphology with higher frequency but noted that the pulsed-DC had considerable shortcoming and that the EDL consumed part of the current thus smearing out the pulsed current. Further, the adverse effect is more pronounced at higher frequencies and at very high frequencies the pulsed-DC, while pulsating in the outer circuit, the current at the surface approaches the DC current as far as the electrode is concerned.

Nernst defined a diffusion-layer (δ) that extends from the OHP into the solution. The layer develops because of the frictional forces acting on the solution as it approaches the surface. Inside the δ layer, convection is no longer a factor and conduction is carried out by diffusion only. The thickness of this layer is a convenient measure of the resistance of the system to the mass-transport of reactant species. FIG. 20 depicts the Nernst diffusion-layer. Contemporary literature states that the thickness of the diffusion-layer ranges from roughly 0.01 mm to roughly 1.0 mm (100:1). The thickness depends on the system hydrodynamics, such that, the greater the fluid agitation, the thinner the resulting layer. A thinner layer results in better system mass-transport.

The system hydrodynamics determine the δ layer-thickness but the DC current determines the steepness of the gradient that develops inside the δ layer. Refer to FIG. 20, by increasing the DC current to a point that the surface concentration c' approaches zero, the system reaches a limit. This limit defines the limiting-current-density $j_{lim}$ of the system. The limiting-current-density is inversely proportional to the thickness of the δ layer:

$$j_{lim} \propto \frac{1}{\delta}$$

The concentration in the bulk solution is c. The surface concentration c' is controlled by the diffusion across the δ layer based on the bulk concentration c, operating current density $j_{lim}$ and the δ thickness. The change in concentration across the δ layer thickness is thus:

$$\frac{dc}{dx} = \frac{c' - c}{\delta}$$

An electrochemical system operating near the limiting-current-density is operating under mass-transport control. Chemical engineers operate electrochemical systems as near to $j_{lim}$ as possible to balance between maximum system throughput but with acceptable parasitic effects associated with operating near the limit.

FIG. 21 depicts the effect of pulsed-DC on the δ layer and shows the development of two distinct Nernst diffusion layers that form with the pulsed-DC. Ibl could reduce the δ layer-thickness 2 or 3 orders of magnitude, compared with DC, by controlling the time-period of the pulsed-DC. The effect of the reduced δ layer yields significant morphology improvement at the surface. Ibl's formula, with D for the diffusion coefficient and t as the time-period of the pulse, is as follows:

$$\delta_p = \sqrt{2Dt}$$

Ibl's formula shows that the pulsed-DC $\delta_p$ thickness is proportional to the square of the pulse period t, thus:

$$\delta_p \propto \sqrt{t}$$

FIG. 21 also shows that the $\delta_p$ layer develops over time as the reactant species at the surface are consumed by the reaction.

Ibl's study and Cheh, in ELECTRODEPOSITION OF GOLD BY PULSED CURRENT, showed that the effect of the high current-density pulsed-DC comes at the expense of the average DC current density. System throughput depends on the average DC current density. To achieve the very thin δ layer, the pulsed-DC current density in Ibl's studies was 250 A/cm² but the average current density was only roughly 5 mA/cm². The ratio of peak to average current density is 50,000 to 1. Obviously, the very low average DC is a severe limitation to throughput.

Ibl further explains how even a small effect by the EDL capacitance changes the reaction by slowing the rise and fall of the faradaic current ($j_r$). The faradaic current is the portion of the applied current that contributes to the desired reaction. The applied current includes the faradaic current plus the current that flows, according to Ibl, only in the EDL without contributing to the reaction. Ibl states that the EDL capacitor continues to supply current to the reaction after the pulse is removed. In this manner, the EDL averages the pulsed-DC. Further, the EDL's averaging effect limits the useful frequency range for pulsed-DC. The assumption of a fixed value for the EDL capacitor and a simple equivalent-model, such as depicted in FIG. 29A with separate paths for current-flow, results in a faulty conclusion. The argument made about the averaging effect on pulsed-DC voltage is valid but the errors reduce the accuracy.

Ibl also shows that the 'throwing power' or uniformity of the current-distribution will be lower with pulsed-DC. Ibl and many others argue that the EDL, thus $\eta_a$, cannot respond to a high frequency emf. They base their conclusion on the theory that with DC or a low-frequency ac emf, the EDL has time to charge and the result is the development of an overpotential $\eta_a$ that drives the reaction. The argument continues that with a high frequency emf there is no time for the EDL to charge thus the resulting polarization is very low. Refer back to FIG. 19, Despic and Popov show dramatic improvement in surface morphology at 10 kHz but state that the electrical double layer smears (averages) the high frequency pulsed-current and as a result, the high frequency current approaches DC as far as the electrode is concerned. The consistent but incorrect conclusion, based on the pulsed-DC and symmetrical ac experimentation, is the beneficial effect of an ac emf must decrease with increasing frequency.

Paunovic and Schlesinger, FUNDAMENTALS OF ELECTROCHEMICAL DEPOSITION and Mordechay et al, MODERN ELECTROPLATING discuss the use of pulsed-DC and symmetrical ac emf by the industry. Pulsed-DC techniques have shown some process improvements but the use has not found widespread acceptance for numerous reasons but include the high cost of the equipment, parasitic issues, the intensity of control needed for use, and high contact resistance at the interface. The use of symmetrical ac emf in electroplating has been used with improvements in ductility, tensile strength, and yield strength but the high contact resistance at the interface limits its use in addition to the high cost of the equipment.

Paunovic and Schlesinger further state that geometric leveling produces uniform current-distribution. Without additives, uniform current-distribution is achieved only when the current density is low. Electrochemical parameters are the main factors in determining the texture of deposits for deposit thicknesses of one micrometer or larger. For thinner deposits, the substrate plays an increasingly important role and electrochemical methods become less significant. Reverse-pulse plating pushes and pulls ions to and from the electrode surface but the EDL averages the effect and the concentration at the surface is lowered. Further, it increases the δ layer-thickness and approaches or exceeds the limiting-current-density. Approaching or exceeding the limiting-current-density will result in increased parasitic processes, most notably, hydrogen gas evolution. Ibl's study cites localized stirring at the surface as the only benefit of parasitic hydrogen evolution. The leveling agents and additives used for process improvements are generally poisonous and environment hazards thus are heavily regulated by government agencies. Clearly, existing electrodeposition systems must sacrifice high efficiency and process speed to get good surface morphology.

The use of symmetrical ac emf, sinewave or squarewave, superimposed on DC has one other limitation. The positive half of the symmetrical emf averages out the negative half so there is no increase in the net current density and no improvement in the process throughput. Coupled to the erroneous conclusion that it took unacceptable amounts of energy to produce an ac emf on a DC emf, the conclusion was always that ac emf did show significant process improvements but the cost of the energy to generate the ac was prohibitive.

FIG. 22A shows the effect of Nernst diffusion layer thickness on current-density distribution or uniformity. Current density is not completely uniform across the surface thus the uniformity of the distribution is very critical to achieving the desired results without prohibitively large parasitic effects. In the graph, the value 1.0 represents a uniform current distribution across the surface. With a thin δ layer, represented as 1, the current is fairly uniformly distributed across the surface. A thicker δ layer value of 10 results in less uniformity and greater concentration on the edges. A thick δ layer value of 100 results in very low (poor) current density at the surface and very high concentrations at the edges. A 100:1 δ variation is very common as stated above.

FIG. 22B highlights the effect of operating near $j_{lim}$ with a thick δ layer. The current density is very low (poor) across most of the surface but extremely high on the edges. The shaded areas show the region with the very high current density. The very high current density areas exceed the $j_{lim}$ limits and are responsible for many parasitic effects, burning, dendrite growth, and other negative consequences. FIG. 22C shows an example where the very high current density along the edges results in rapid dendrite growth that quickly shorts out the cell. The plating across the surface is very poor and porous. The example in FIG. 22C confirms the predicted results in FIG. 22B.

Depth-of-penetration, also known by the industry as "throw", is critical to most electrochemical systems, such as electroplating and electrodeposition. Higher current density results in greater 'throwing power' but only if the current density is uniform as illustrated in FIG. 22A and FIG. 22B. FIG. 23A shows the effect of equal δ layers on substrates with different surface complexities. When the δ layer thickness matches the profile of the surface then the current density is uniform across the surface and penetrates properly. When the same δ layer thickness does not match the surface depths then the current density is not uniform and does not penetrate into the depths of the surface. Refer back to FIG. 19 for an example. The photomicrograph of the deposit at 10 kHz (10,000 cps) shows that even through the deposit shows excellent morphology, the current is not adequately penetrating to the 40 pm depth of the irregularity because the δ layer is still too thick.

FIG. 23B shows the effects of reducing the δ layer thickness on the depth-of-penetration into a complex surface. The thinner the δ layer, the better the current density follows the surface and the better the depth-of-penetration.

A practical example of the importance of the δ thickness on industrial processes is electroplating zinc (Zn) onto to steel to prevent oxidation on the steel surface. Roughly, ½ of the world's consumption of Zn, ~3.7 billion kg, is electroplated on steel annually. The morphology of the DC-emf process is so poor, as illustrated in FIG. 19, the Zn is typically electroplated to a thickness of roughly 20 um when a high quality and low porosity deposit of ~7 um would be sufficient.

Limiting current density $j_{lim}$ is extremely important in electrochemistry. As shown, $j_{lim}$ is inversely proportional to the δ layer thickness. Refer back to FIG. 20, $j_{lim}$ represents the maximum current density that the primary or desired reaction can support. It represents the point that the surface concentration c', of the desired reactants, approaches zero. Increasing the current beyond this point can only result in another unintended (undesired) reaction, electrode burning, dendrite growth, or other negative consequence. FIG. 24 highlights the relationship between the concentration polarization $\eta_c$ and the current density j. The $\eta_c$ voltage increases with increasing current density until reaching the $j_{lim}$ value and spikes up rapidly until leveling off when a second reaction begins supporting the current. The instantaneous voltage increase is defined as $d\eta_c$. A common detrimental parasitic reaction is the formation of hydrogen gas. Refer back to FIG. 22B, it is not necessary for the average current density to exceed $j_{lim}$ for the parasitic reactions to be triggered when the δ layer is thick.

FIG. 25, redrawn for clarity, shows the results of a pulsed-DC current that momentarily exceeds $j_{lim}$. The simplified graph does not show the minor exponential voltage responses. These measurements resulted while studying the effects of a DC-depolarization period. The 2.5 A DC current was applied for 1 second, followed by a 15 mS depolarization period. When the current was turned off, the polarization voltage instantaneously decreased by effectively the amount of the IR loss. Reapplying the DC-pulse (a step-function) resulted in a voltage that exceeded the IR loss by $d\eta_c$ (a step voltage). Clearly, the rate of rise of the current (di/dt) exceeded the mass-transport of the ions thus exceeding $j_{lim}$. Expanding on Ibl's point, it is clear that the total applied current momentarily exceeded the faradaic current and could not contribute to the desired reaction during that period. FIG. 25 highlights that some other process and not the desired reaction supports a large portion of the current during the period, in the shaded areas. As a note, the shaded area accounts for roughly 33% of the total energy being expended by a parasitic process in the period of roughly 20 mS duration.

Chemists are trained that electrochemical systems cannot exhibit inductance. Test instruments designed for measuring electrochemical systems are programmed to reject the empirical measurements that indicate an inductance. Self-inductance is the property of an electrical system to oppose a sudden change in the current (di/dt) by creating a voltage to oppose the change. Self-inductance creates a counter-emf (cemf) to oppose the change and takes the form:

$$cemf = L\frac{di}{dt}$$

Self-inductance is analogous to inertia and a priori results from the inability of the mass-transport of the desired reactants (ions) to support the driving emf:

$$emf's\frac{di}{dt} \gg ions'\frac{dx}{dt}$$

Refer to FIG. 24 and FIG. 25, the rate of the rise and decay of $d\eta_c$ matches the expected cemf waveform and is created by the rate of change in the current over time or di/dt. Solving for L in the experiment gives:

$$L = cemf\frac{dt}{di} = \sim\left(75\text{ mV}\frac{20\text{ mS}}{2.5\text{ A}}\right) = \sim 600\text{ μH}$$

A lack of understanding of the difference between physical capacitors in an electrical circuit and the capacitance exhibited by the EDL in a dynamic, fluid heterogeneous structure coupled with a misunderstanding of the equivalent electrical circuit has led to many errors. As discussed earlier, the EDL capacitors do not have fixed plates (electrodes) or a stable dielectric. In a physical capacitor, no electrons flow between the dielectric. The dielectric is by definition non-conductive to electrons. The current that flows is a displacement current and all electron flow is external to the capacitor's dielectric. This is the reason capacitors block DC current because there is no path for the electrons to flow and so the electrons collect, as a charge, on the electrode. Likewise, capacitors cannot block an ac emf but do develop a reactive impedance $X_c$ to the flow of current:

$$X_c = \left(\frac{1}{2\pi fC}\right)$$

Whereas inductors oppose sudden changes in current, capacitors oppose sudden changes in voltage by allowing the displacement current to flow:

$$i = C\frac{dv}{dt}$$

In an electrochemical system, no electrons flow between the electrodes and only flow external to the cell. If electrons flowed in the cell it would create a short-circuit with adverse consequences. The current that flows internally is based on charged particles, anions and cations. The dielectric is based on the purity of the water dipoles and it is dynamic because it is highly depended on the degree of 'contamination' by charged particles. Contamination is meant in terms of dielectric purity so the desired reactant species entering the EDL reduce the dielectric permittivity (purity). The capacitance in an EDL layer will be highest when the current density j approaches the limiting current density $j_{lim}$ because the concentration at the surface approaches zero. The reaction at the surface is the interface with the external emf source where the charged species accept or release electrons.

Any contemporary equivalent-electrical-circuit model presents the EDL capacitance as being physically parallel to the reaction. It is not parallel and as stated the entire EDL structure is a complex integrated heterogeneous structure. The electric circuit model is a model based on external electrical measurements and externally the EDL structure appears as a parallel process. It is inaccurate to view the external electrical model as accurate for the internal circuit when the current internally is the flow of charged particles (not electrons). These misconceptions lead to the erroneous argument that pulsed-DC or high frequency ac current splits between faradaic and the current the EDL 'consumes' to charge and discharge. Nernst's and many others' studies on the δ layer show that the charged particles do not accumulate on the EDL's IHP and OHP boundaries as an electrical charge. In fact, the concentration of charged species is decreasing at the surface under high current-demand conditions. The apparent charging of the EDL is a posteriori the increasing $\eta_c$ overpotential, highlighted in FIG. 24, resulting as the current splits between the desired reaction (faradaic) current and the current flowing via undesired parasitic reactions. The EDL capacitor opposes a sudden change in the $\eta_a$ voltage by allowing the current (charged particles) to flow including the current associated with the parasitic reaction(s). Externally, the increasing $\eta_c$ suggests that the parallel EDL capacitor is charging. Internally the effect is:

$$i(\text{ion flow}) = C(EDL)\frac{d\eta_a}{dt}$$

The EDL capacitance simply cannot allow an instantaneous change in $q_a$ regardless of the applied emf. The leading edge of pulsed-DC clearly exceeds the mass-transport limits, until reaching steady-state, resulting in ~33% of the energy being expended by a parasitic process as shown in FIG. 25. The averaging effect on the pulsed-DC emf is a posteriori the consumption of energy by parasitic reaction(s) thus the energy is not consumed by charging the EDL capacitance. The argument that high frequency ac emf is ineffective because the EDL cannot charge and discharge fast enough is likewise flawed. No ac emf can 'charge' the capacitance of the EDL as demonstrated.

Paunovic and Schlesinger, in FUNDAMENTALS OF ELECTROCHEMICAL DEPOSITION, state that nearly all electrodeposited films will include one or more of the following impurities: a. Added chemicals such as levers and additives; b. Added particles; c. Cathodic products or complex metal ions; d. Hydroxides of the depositing metal; and e. Gas bubbles, most notably hydrogen. They further state most deposits produced with low current density possess higher impurity content than those deposited with high current density. Hydrogen gas is usually the product of parasitic reactions and results from operating with high or non-uniform current density. Hydrogen gas is easily co-deposited and results in significant hydrogen embrittlement (HE) of the deposit. The key conflict, with prior-art processes, is the inability to operate at sufficiently high current densities.

Chemical engineers rate electrochemical systems based on the achievable current efficiency. Current efficiency is the relationship between the equivalent-chemical-units (ECU) produced by the electrical current. As an example, a process that consumes 1,000 coulombs of electrons and produces 960 ECU's has a current efficiency of 96%. Reportedly, industrial electrochemical systems consume approximately 35% of the world's electrical energy annually. Typically, industrial processes operate between 92-96% current efficiency. Efficiency is critical to the cost of the process and environmentally critical as well.

A frequent argument by chemical engineers is the process already operates at 96% efficiency so there is very little room for efficiency improvements. One of the most important industrial processes is the production of chlorine and sodium hydroxide. FIG. 33A shows a simplified block diagram of the chlor-alkaline process. A medium-size membrane production line operates in the range of 170 kA. The thermodynamic cell voltage E° is 2.23V but the voltage needed to operate is 3.65V. The current efficiency is usually in the range of 92% to 94%. A typical production line is 120 cells connected in series:

$$120 \text{ cells} * 170 \text{ kA} * 2.23 \frac{V}{\text{cell}} = 45.49 \text{ MW}$$

$$120 \text{ cells} * 170 \text{ kA} * 3.65 \frac{V}{\text{cell}} = 74.46 \text{ MW}$$

The real energy efficiency is only 61.1%. The energy efficiency is one consideration but it is also important how long a given process takes so energy efficiency alone can be deceiving if the throughput is low. This energy efficiency also ignores the inefficiency of converting incoming ac power to DC power.

Gas bubbles, in a gas producing process, such as the chlor-alkaline production, can cause considerable losses when the gas bubbles cling to the electrode and effectively block the surface. In the membrane chlor-alkaline example, gas bubbles losses can be as high as 400 mV per cell so the loss could be as high as 8.16 MW per line in the above example. Gas bubble losses are one example of IR loss.

FIG. 26 highlights the relationship between cell overpotentials or polarization to the relative current density for two different electrochemical systems. Ignoring the double-negative connotations discussed earlier, irreversible thermodynamic overpotentials can be described as:

$$V = \eta_a(\text{anode}) + \eta_c(\text{anode}) + IR + (\eta_a)(\text{cathode}) + (\eta_c)(\text{cathode})$$

External to the cell, the $\eta_a$ and $\eta_c$ losses cannot be individually distinguished as cathode or anode losses and identification is based on the exponential shape of their respective curves. The linear portion of the voltage curves is conventionally described as IR losses because the loss follows a linear slope proportional to the current (I) times the resistance (R). The NiMH battery cell has a very slight negative IR slope because of the very low R-value whereas the photon-exchange-membrane (PEM) fuel cell has a much steeper negative IR slope proportional to the larger R. The $\eta_a$ region describes the process where the cell is limited by the activation polarization losses, the linear range is dominated by IR losses, and the $\eta_c$ range is dominated by the mass-transport (concentration) losses.

FIG. 27A gives the simplified equivalent-electrical-model often cited in literature. The electrochemical process is represented as $R_p$ with a parallel EDL process capacitor $C_p$ with both connected in series with the thermodynamic or reversible potential voltage $E_o$ of the ideal cell. $R_s$ represents the series resistance incorporating all other loss mechanisms. FIG. 27B gives an improved equivalent electrical model described in U.S. Pat. No. 5,872,443. FIG. 27B highlights the variable nature of the EDL and process impedance $R_o$, the existence of two series connected capacitors, $C_{ihp}$ and $C_{ohp}$, at the dominate electrode, and the negative-temperature-coefficient (ntc) to highlight the thermodynamic nature of the process. The coefficient ntc indicates that the impedance of $R_o$ decreases with increasing temperature as:

temperature↑impedance↓

FIG. 28A is an actual impedance plot of a PEM fuel cell but plotted as a Bode plot. Henrik Bode developed a system to display the gain and phase on two separate graphs that gives a clear and concise representation of the transfer function. When plotted on log-log paper, the RLC values, at the different frequencies, can be read directly from the graph. The graph can be constructed asymptotically using straight-line approximations and a useful feature is that separate elements of a function can be graphically added to form the plot. FIG. 28A is plotted on specialized impedance paper so that the values can be read directly from the graph. Contrast the impedance plot in FIG. 28A to the Nyquist polar plots in FIG. 17A and FIG. 17B.

Whereas chemists are trained electrochemical systems cannot exhibit inductance, physicists are trained that an electrical circuit must contain the three physical quantities of resistance, capacitance, and inductance. Capacitors exhibit capacitive reactance to ac and inductors exhibit inductive reactance to ac, as:

$$X_C = \frac{1}{2\pi f C}$$

$$X_L = 2\pi f L$$

The total impedance Z in a RLC circuit is:

$$Z = \sqrt{R^2 + (X_L - X_C)^2}$$

The phase relationship between capacitance and inductance is a key indicator that verifies the accurate identification of electrochemical impedance as capacitive or inductive. In an ac circuit, the voltage (E) leads the current (I) by 90° if the impedance is inductive and the current (I) leads the voltage (E) by 90° with capacitive reactance. A simple memory tool is 'ICE' for the capacitance and 'ELI' for the inductance. The separate plot of phase on a Bode plot gives a positive verification that the identification is accurate.

FIG. 28B is an impedance plot of a discrete RLC electrical circuit plotted on log-log scale. Impedance paper is not used in FIG. 28B for clarity. Ideal components are linear across all frequencies but real components are only linear over a limited range of frequencies. The RLC components used for the measurement were selected to be relatively linear over the range of interest. The slight increase in slope around 800 kHz on the $X_L$ curve indicates the presence of a small parasitic capacitance in the inductor.

FIG. 28B shows a log-log plot of impedance versus frequency with a negative 45° slope (−20 dB/decade) approaching a minimum impedance at resonance $\omega_n$, a cusp at $\omega_n$, and positive 45° slope (+20 dB/decade) after the resonance point. The negative slope results from the capacitive reactance decreasing with increasing frequency. The capacitive reactance dominates the impedance until the inductive impedance begins to dominate at resonance. The positive slope results from the inductive reactance increasing with increasing frequency.

frequency↑$X_C$↓$X_L$↑

At resonance frequency, the inductive reactance and capacitive reactance are equal and cancel leaving the resistance. The phase will shift 180° as the impedance changes from capacitive to inductive. The phase shift begins at 0.1 $\omega_n$ and ends at 10 $\omega_n$. Phase shift at resonance is zero. Note: $\omega_n = 2\pi f_r$. Determining the phase from a Nyquist plot is difficult.

FIG. 29A is an oscilloscope graph, redrawn for clarity, showing the voltage polarization resulting from a pulsed-DC emf with a current density of 2.3 kA/m². From the graph, the instantaneous IR loss is ~2.08V and the exponential $\eta_a$ and $\eta_c$ losses are ~1.08V for a total overpotential of ~3.16V. FIG. 29B is an oscilloscope graph, redrawn for clarity, showing the voltage polarization, for the same cell, resulting from a damped sinewave emf with a current density of 2.3 kA/m². The total overpotential is only ~1.16V. The same cell with two equal current-density-pulses yields very different losses. It is not possible to differentiate the ac emf losses into IR, $\eta_a$, and $\eta_c$ components since the overpotential voltage follows the exponential shape of the ac pulse. The instantaneous IR loss response in FIG. 29A clearly suggests a fixed $R_{elect}$ component but the lack of response to the ac emf suggests the R component is more ionic or $R_{ionic}$. In the last few years, some researchers, such as O'Hayre, have been defining IR losses as $\eta_{ohmic}$:

$\eta_{ohmic} = I\,R_{ohmic} = I(R_{elec} + R_{ionic})$

Leading to O'Hayre defining:

$$\eta_{ionic} = iR_{ionic} = iA_{fc}\left(\frac{\delta}{\sigma A_{fc}}\right) = \frac{i\delta}{\sigma}$$

O'Hayre defines $A_{fc}$ as the area specific resistance based on current density.

$\delta$ and $\sigma$ are based on mass-transport conditions. A key is $\eta_{ionic}$ is proportional to $\delta$ layer thickness and inversely proportional to the conductivity.

$\delta$↓$\eta_{ionic}$↓:$\sigma$↑$\eta_{ionic}$↓

Adjusting the overpotential formula gives:

$\eta_T = \eta_a$(anode)+$\eta_c$(anode)+$\eta_{elec}$+$\eta_{ionic}$+($\eta_a$)(cathode)+($\eta_c$)(cathode)

Refer back to FIG. 29A and FIG. 29B, the lack of an instantaneous response to the ac emf and the instantaneous response to the pulsed-DC a priori points to the instantaneous IR loss being a $\eta_{ionic}$, not $\eta_{ohmic}$, induced when the pulsed-DC exceeded the limiting current density.

There are two types of electrochemical cells, galvanic and electrolytic. Galvanic cells generate voltage based on redox reactions and electrolytic cells consume electrical energy to drive a redox reaction.

For a galvanic cell the output voltage E' is:

$E' = E_o - \eta_T$

For the electrolytic cell, the external emf E' for driving the cell is:

$E' = E_o + \eta_T$

Eisenberg et al, in PHYSICAL CHEMISTRY, discusses concentration-gradient induced-flux. Fick's first law of diffusion states the flux of matter is proportional to the concentration gradient in a solution:

$$J = -D\frac{dC}{dx}$$

The negative sign indicates that if dc/dx is positive the flux direction is in the direction of decreasing concentration. Typical D values for ions in solution are 0.6 to 2.0×10$^{-9}$ m²/sec. Typical D values for biological molecules range from 10$^{-11}$ to 10$^{-10}$ m²/sec. Fick's 2$^{nd}$ law of diffusion introduces time as a variable so the equation becomes a partial derivative with respect to x at a certain t. FIG. 30 shows the concentration gradient induced flux, with:

$$J_{in} = -D\left(\frac{\partial C}{\partial x}\right)_t$$

$$J_{out} = -D\left[\left(\frac{\partial C}{\partial x}\right)_t + \Delta\left(\frac{\partial C}{\partial x}\right)_t\right]$$

The topic of flux is too complex for detailed discussion but can be summarized as:

Flux=−migration−diffusion+convection

Migration is movement under the influence of a force, such as pressure or emf. Convection is mechanical motion that is the result of a flow.

Electrophoresis is the movement of charged particles through a solution under the influence of an electric charge with the displacement equal to:

$dx = \mu\,E\,dt = \mu\,J\,\sigma\,dt$

Electrophoresis will occur because any particle in a liquid will normally carry a surface charge. Even neutral particles will carry a surface charge due to the molecular structure of water at the interface of the molecule and the liquid. FIG. 31A is simplified block diagram illustrating electrophoresis. Charged particles move towards the opposite charge. The greater the charge on the particle, the faster it moves. The greater the emf, the faster the particles move. The smaller a particle is, the faster it moves. Higher conductivity increases the rate of flux. Large molecules, such as proteins, typically have a negative charge and move to the positive charge. The net surface charge developed by a large molecule is highly affected by the pH of the solution. Macromolecules in gel electrophoresis migrate based on the logarithm of the weight, as shown in FIG. 31B, but are also dependent on the molecular shape. Key electrochemical system problems with gel electrophoresis are long run-times, larger molecules interfering with the free migration of small molecules, high electrical resistivity of the gel, and poor resolution or differentiation, and failed-runs. FIG. 9 is a simplified block diagram of a prior art gel electrophoresis system.

Refer back to FIG. 28A, the shape of the impedance graph deviates significantly from the shape of the impedance graph for discrete RLC circuits indicating the electrical properties of electrochemical systems are far more complex. The expanded $\eta_T$ formula is far too complex for the simple equivalent circuits given in FIG. 27A and FIG. 27B. IR losses are not simple linear losses as believed for so long. Conclusions believed for many decades about pulsed-DC and ac emf are flawed. Electrochemical systems clearly exhibit self-inductance.

Whereas in U.S. Pat. No. 5,872,443, it was understood the damped-sinusoidal emf disrupted the EDL structure thus reducing the activation barrier and provided an electronic agitation to the Nernst diffusion layer there were a number of flaws in the concept based on the prevailing flawed understanding, at the time, of electrochemical systems. Many years of testing and research lead to the development of a new equivalent electrical circuit model that provides a much better understanding of the complexity of electrochemical systems. The new equivalent electrical model gives deeper understanding of the implications from the Bode impedance graphs enabling accurate engineering of the driving emf to achieve the best balance between throughput; energy efficiency; product quality or purity; reduction of environmental and health issues; and reduction in the complexity of processes or facilities.

The new methods and systems enable precise control of the Nernst diffusion layer thickness and the limiting current density. The implications of this precise control are global in scope offering significant process improvements, such as, elimination of trial and error methods; reducing or eliminating the use of hazardous geometric leveling agents and additives; reducing or eliminating the need for expensive catalysts in many processes; significant reduction in the misunderstood 'IR' losses; improved power density in galvanic systems; significant reduction in the quantities of metal needed to achieve superior morphology in electrodeposition; significant reductions in activation polarization and concentration polarization; effective control and reduction of parasitic reactions; significant energy savings; cost savings via simpler equipment and facilities; and significant throughput improvements.

General Theory of Operation

Comparing the Bode impedance plot in FIG. 28A to the expected impedance plot for an RLC series circuit, in FIG. 28B, highlights the need for a deeper understanding of electrochemical systems. FIG. 28C is a generalized plot from thousands of impedance measurements for different electrolytic and galvanic electrochemical systems. FIG. 28C is plotted asymptotically and the log-log scale is not shown for clarity. Impedance Z has three roughly linear sections. Z decreases with increasing frequency until reaching $f_r$ and then Z increases slowly with increasing frequency until beginning an increase at +20 dB per decade of frequency. The three components, $X_C$, $X_L$, structural $X_L$, are projected asymptotically. The frequency range is from 0.01 Hz to 1.0 MHz. FIG. 28C and FIG. 28D are not meant to indicate all electrochemical system have these impedance characteristics at the specific frequency but to highlight all systems follow a similar pattern. The phase is not shown for clarity.

Contrast the impedance plot given in FIG. 28C with the impedance plot given in FIG. 28D. The $X_C$ slope is not the expected $-45°$ per decade, the $X_L$ slope is not the expected $+45°$ per decade slope, but the structural $X_L$ does follow the expected slope. As shown, reactive impedances are determined by:

$$X_C = \frac{1}{2\pi f C}$$
$$X_L = 2\pi f L$$

The reactance formulas are linear so that the only way for the slopes of the impedance to deviate from the expected slopes is for the capacitance and inductance to be changing as the frequency increases. This behavior requires a new designation to reflect the decreasing C and L with increasing frequency. The new designation is negative-frequency-coefficient (nfc). This one characteristic highlights the very complex nature of electrochemical systems compared to the simplistic equivalent electrical models.

FIG. 28E is a generalized impedance plot for a small-scale chlor-alkaline process. The $X_C$ impedance has a relatively steep slope with resonance occurring around 60 Hz and the $X_L$ impedance has a gentler slope extending out to ~12 kHz when the structural inductance begins dominating the impedance. FIG. 28F is a generalized impedance plot for a NiMH cell. The $X_C$ slope is gradual and long with resonance occurring at ~15 kHz. The $X_L$ impedance has a gradual and short slope before the structural inductance dominates beginning at ~200 kHz.

FIG. 28G highlights a generalized impedance plot for a small-scale tin (II) chloride process with a long $X_C$ slope and resonance at ~60 kHz. FIG. 28H is a generalized impedance plot for a 20-cell PEM fuel cell. The $X_C$ slope is relatively steep and long with resonance occurring at roughly ~200 kHz. The $X_L$ slope is short. Contrast the generalized graph in FIG. 28H with an actual impedance plot in FIG. 28A. The impedance plot in 28A shows impedance from 0.01Ω to 1 MΩ and FIG. 28H the impedances ranges from 0.001Ω to 100Ω so there may appear to be a greater approximation error than exists. The frequency measurement range is different as well.

Not showing the phase on FIG. 28H does lose a very important aspect highlighted by the phase plot on FIG. 28A. The phase shift on FIG. 28A clearly shows the existence of two resonance points. This characteristic highlights the very complex nature of fuel cells where the hydrogen electrode and oxygen electrode have very different operational characteristics. The hydrogen electrode is highly dependent on catalytic action whereas the oxygen electrode is a very sluggish reaction. A priori one resonance point is associated with the hydrogen electrode and the other resonance the oxygen electrode.

Contrast the impedance plots for the NiMH cell in FIG. 28F and the fuel cell plot in FIG. 28H to the cell polarization graph comparing the two cells in FIG. 26. The NiMH's gradual polarization curve, as current density increases, matches the gradual slope of the impedance $X_C$ plot. The fuel cell's steep and longer polarization curve, as current density increase, matches the longer and steep $X_C$ impedance curve. The NiMH's longer $X_L$ slope matches the larger concentration polarization area as the fuel cell's shorter $X_L$ slope matches the shorter concentration polarization area.

There is a consistent graphical match between the Bode impedance plots and the polarization graphs for various electrochemical systems as expected. In simple terms, impedance is equal to the voltage divided by the current. The Bode $X_C$ impedance graphically matches the activation polarization $\eta_a$, through the ohmic losses, to the $X_L$ impedance graphical matching the concentration polarization $\eta_c$. This should not be surprising when $\eta_a$ is based on the EDL capacitive structure and relates to $X_C$ through changes in dv/dt. Likewise, the mass-transport concentration polarization $\eta_c$ is based on particle diffusion or migration over a distance and relates to $X_L$ through changes in current, effectively like inertia, or di/dt.

The measured R impedance of the fuel cell is significantly smaller than the IR polarization curve in FIG. 26 indicates.

This is another indication that IR is a misnomer and the polarization is indeed complex as discussed.

Expanding on the improved equivalent electrical model in FIG. 27B, results in the equivalent circuit in FIG. 32A. To develop FIG. 32A, the impedances are divided to highlight two electrodes. $R_{ohmic}$ is added between the electrodes to match the new $\eta_T$ formula. The impedances would not divide evenly as shown. FIG. 32A still only represents resistance and capacitance but no inductance. FIG. 32B illustrates the structure of an ideal resistor, but no ideal resistors exist, so it also shows a non-ideal resistor. It is well documented that non-ideal resistors have a small parasitic inductor in series with a small parasitic capacitor in parallel as shown. Non-ideal capacitors have parasitic resistance and inductances as well.

Substituting the non-ideal resistor, into each resistor in FIG. 32A, results in the new equivalent model in FIG. 32C. FIG. 32C does not include parasitic reactions. The parasitic capacitance associated with the structural elements is so insignificant it can be ignored. $\eta_a$ represents the activation polarization, $\eta_{mt}$ the mass-transport concentration polarization, $L_a$ and $L_{mt}$ the inductance spread over the cell, $C_{mt}$ the capacitance spread across the bulk-solution, and $\rho_{sd}$ as the small parasitic impedance that exists in all cells. Note that all elements, except $E_o$, $L_{st}$, $R_{st}$, and $C_{mt}$, are dynamic and vary with either temperature (ntc) or frequency (nfc). It is well known that chemical activity roughly doubles for every 10° C. increase in temperature. The arrows indicate the variability of the elements with different operating conditions, such as current density and temperature. $E_o$ represents the thermodynamic or reversible potential voltage associated with the specific electrochemical system. $\rho_{sd}$ accounts for the small leakage of current in all systems that is particularly important to galvanic systems because of the self-discharge of the cell. The ntc coefficient indicates self-discharge increases with increasing temperature. Also, note that neither electrode has been designated as cathode or anode so the model is useful for both electrolytic and galvanic systems.

FIG. 32D introduces parasitic reactions at each electrode. It is known that there can be more than one parasitic reaction at an electrode. $V_p$, $L_p$, and $\eta_p$ represent the parasitic elements. $C_{ihp}$ and $C_{ohp}$ represent the EDL capacitors that extend across the entire electrode so no additional capacitors are required for the parasitic reaction. If the parasitic reaction affects the EDL any change will be expressed by $C_{ihp}$ and $C_{ohp}$. Remember the EDL is a complex heterogeneous structure with non-uniform current-density across the structure so localized concentration gradients exist. A zener diode was chosen to represent the voltage that activates the parasitic reaction. The voltage has to increase to match the required emf to drive the parasitic reaction. Zener diode V&I graphs are plotted with voltage on the x-axis and current on the y-axis. Chemists tend to plot current on the x-axis and voltage on the y-axis. Rotating the zener diode V&I curve on its axis and the V&I curve closely matches the V&I relationship shown in FIG. 24. The chosen zener voltage will match the voltage needed to trigger the parasitic reaction. Note: there is an error in the orientation of the zener when changing between electrolytic and galvanic. The error does not impact the usefulness.

FIG. 33A highlights a block diagram of the chlor-alkaline process, an electrolytic system, and FIG. 33B highlights how the new equivalent model is transformed to match the chlor-alkaline process. The left electrode is designated as the anode and the right electrode the cathode. The positive DC emf connects to the anode. $Cl_2$ gas is generated at the anode and $H_2$ gas at the cathode. Current flows via Na+ (aq) as it passes from the anode to the cathode. $2OH^-$ is generated when the hydrogen is produced at the cathode. FIG. 33C highlights the areas where parasitic and gas bubble losses develop.

FIG. 33D and FIG. 33E represent the equivalent electrical models for the reversible water reaction highlighted in FIG. 16B. FIG. 33D shows the electrolytic process where water splits into hydrogen and oxygen gases with the application of energy. FIG. 33E represents the galvanic process where the hydrogen and oxygen gases are recombined to generate energy and water. Note that the designations anode and cathode flip for the two opposite processes.

Refer back to FIG. 20, where the δ layer and $j_{lim}$ are illustrated with DC emf. Expanding on the flux discussion from Eisenberg et al, the flux of species J is:

$$J = -D\left(\frac{\partial C}{\partial x}\right) = D\left(\frac{c'-c}{\delta}\right)$$

Solving for the current density j gives:

$$j = zFJ = zFD\left(\frac{c'-c}{\delta}\right)$$

$J_{lim}$, the flux limit of specifies, relates to current density limit $j_{lim}$ as:

$$j_{lim} = zFJ_{lim} = \frac{zFDc}{\delta}$$

FIG. 21 shows how Ibl developed the pulsed $\delta_p$ based on the time period of the pulse t:

$$\delta_p \propto \sqrt{t}$$

Ibl was able to reduce the δ layer thickness 2 to 3 orders of magnitude (100 to 1,000), compared to the DC δ layer thickness, with pulse widths no shorter than 50 μS. However, the pulsed-DC was only achievable with the sacrifice of average current density. The time-period for a squarewave pulse would yield 100 μS. Frequency is the inverse of time so:

$$f = \frac{1}{t} = \frac{1}{100\ \mu S} = 10\ kHz$$

Ibl reports a 1,000 to 1 reduction in δ thickness from a pulse no higher than 10 kHz.

FIG. 34A highlights a new δ designation $\delta_{ec}$ based on a damped sinewave emf superimposed onto the DC emf ($emf_{ec}$). With the inverse relationship of frequency to time, $\delta_{ec}$ is:

$$\delta_{ec} \propto \sqrt{\frac{1}{f_{ec}}}$$

$\delta_{ec}$ presents a new control mechanism for the δ layer thickness. The thickness of the δ layer can now be exactly matched to the electrochemical system by the selection of the frequency $f_{ec}$ of the damped sinewave emf superimposed onto the DC emf [forced response X(s)]. To establish a new δ thickness becomes:

$$\frac{\delta_{new}}{\delta_{ec}} = \sqrt{\frac{f_{ec}}{f_{new}}}$$

Limiting current density is inversely proposal to δ:

$$j_{lim} \propto \frac{1}{\delta}$$

Therefore:

$$j_{lim} \propto \frac{1}{\sqrt{\frac{1}{f_{ec}}}} \propto \sqrt{f_{ec}}$$

There are two limits to the maximum achievable current density. $J_{lim}$ is the maximum limit for reactant specifies available to support the reaction thus $J_{lim}$ limits the maximum limiting current density $j_{lim}$. Referring to the impedance graphs of the various electrochemical cells it is apparent there is an upper limit to achievable $f_{ec}$ values.

Figure 34B:
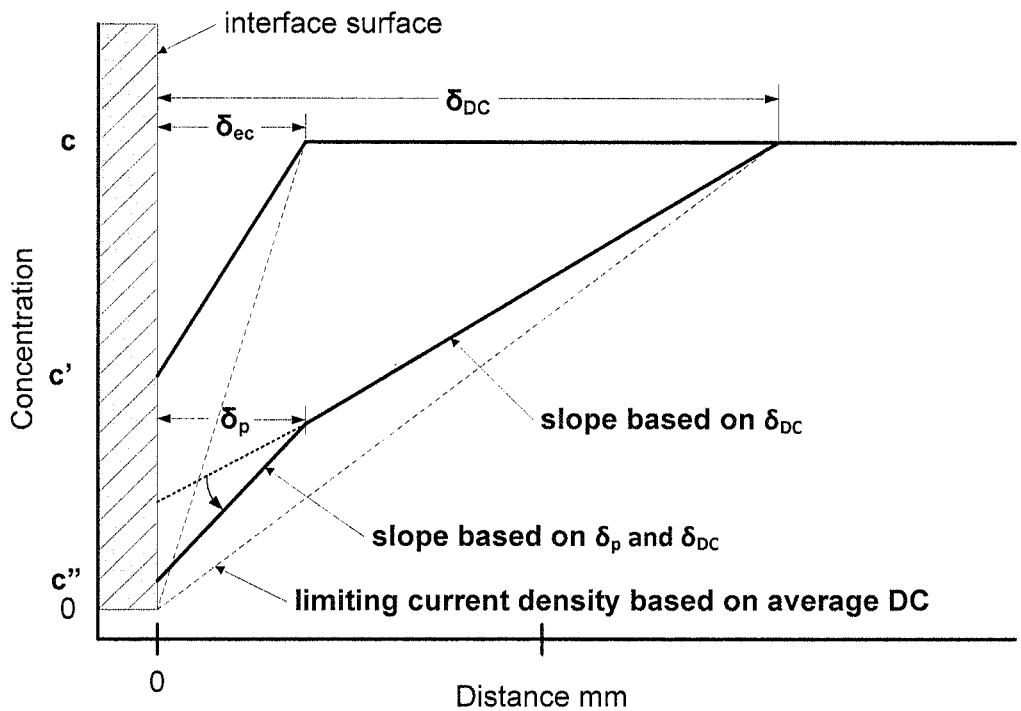

A comparison of Ibl's $\delta_p$ to the new $\delta_{ec}$ is given in FIG. 34B. The thickness of $\delta_p$ and $\delta_{ec}$ are equal (t=1/f) but the effect is definitely not equal. Ibl was only able to achieve the $\delta_p$ thickness with low average current density. The steepness of the concentration gradient indicates that the limiting current density with $\delta_{ec}$ is much greater. The average current density determines the throughput of the process. The concentration at the surface c' is higher than c" even through the average current density is greater. The $\eta_c$ polarization is lower at the higher current densities.

Non-uniform current-density has one other negative consequence, the formation of localized concentration gradients. The localized gradients can result because of the non-uniform current density associated with the effects highlighted by FIG. 22A, 22B, and 22C. These localized gradients increase the probability of parasitic reactions and dendrite growth. Proper control of the δ layer thickness will significantly reduce the formation of localized concentration gradients by ensuring uniform current density distribution.

Expanding the flux formulas gives:

$$J_{ec} = -D\left(\frac{\partial C}{\partial x}\right) = D\frac{c'-c}{\delta_{ec}}$$

$$j_{lim_{ec}} = zFJ_{lim_{ec}} = \frac{zFDc}{\delta_{ec}}$$

Figure 34C:
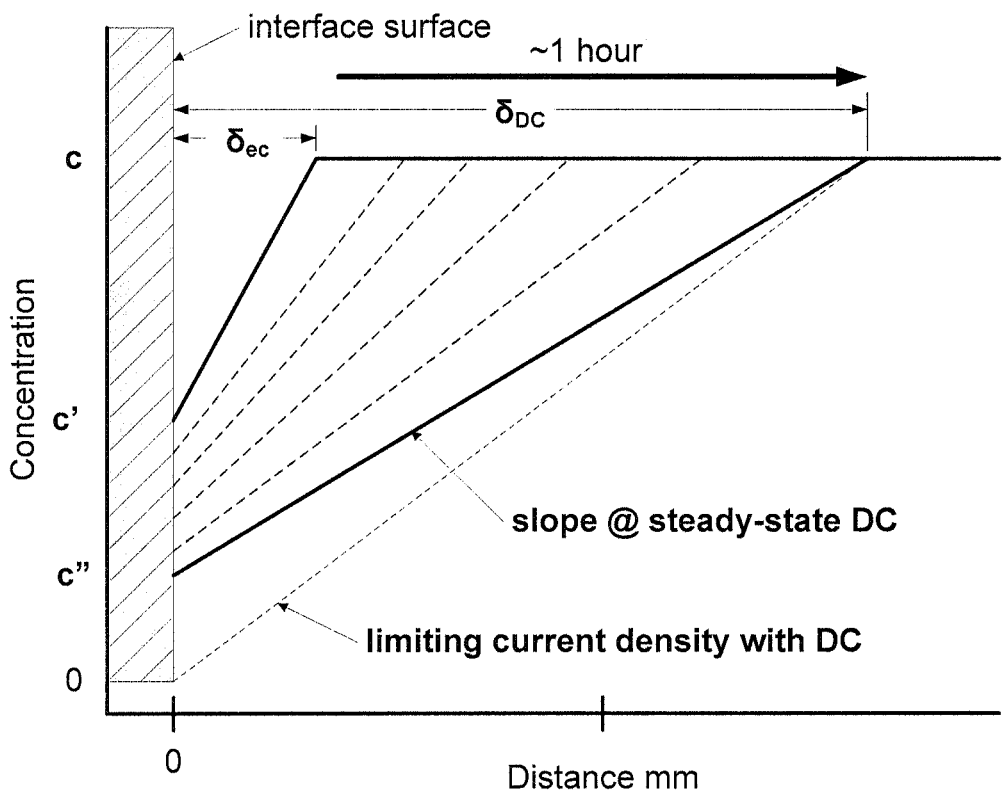

The result is:

$f_{ec}\uparrow\delta_{ec}\downarrow j_{lim_{ec}}\uparrow c'\uparrow\sigma\uparrow\eta_T\downarrow$ FIG. 34C highlights an unexpected result that has very important ramifications. Chemical engineers have expressed considerable concern about the negative portion of the ac emf. The $emf_{ec}$ current is a true ac emf with positive and negative current periods. U.S. Pat. No. 5,872,443 documents that integration over time yields a net current density greater than the DC emf. The degree of net increase relates to the ratio of the peak edge of the positive pulse to the DC current as controlled by the Q of the equivalent circuit, as discussed earlier. With a peak of 5 times the DC current, the net current density integrates to roughly a 1.27 increase in net current density. This value closely matches the expected increase from the formula for a resonant circuit highlighted in FIG. 14B:

$$ac_{emf} = \frac{4\ DC_{emf}}{\pi} = \sim 1.27\ DC_{emf}$$

The integration of the emf also shows there is never a net negative migration (dx) and the damped sinewave migration is always more positive than the DC.

Despite the mathematical assurance, there was considerable concern during chlor-alkaline experiments that the negative current would cause hydrogen gas to cross through the membrane and cause an explosion. The test cell was allowed to reach steady-state operation and it took roughly one hour. The δ diffusion develops over the time-period as reactant species are consumed by the reaction. At steady-state the δ layer has reached $\delta_{DC}$. The $emf_{ec}$ was applied for one second. The cell returned to roughly the initial conditions and it took another roughly one hour to return to steady-state. FIG. 34C indicates that the one second application of the $emf_{ec}$ reset $\delta_{DC}$ to $\delta_{ec}$.

As discussed, a medium size chlor-alkaline process can operate at 170 kA. In U.S. Pat. No. 5,872,443, it was believed that the $emf_{ec}$ had to be applied continuously and at a 1.27 net current density. FIG. 34C offers a new control mechanism of duty-cycle control to maintain the δ level at an acceptable level to achieve desired improvements. FIG. 35A shows 2 cycles with duty-cycle control. The $emf_{ec}$ does not have to be applied continuous and only applied as needed to meet the desired $j_{lim}$. The result is a much simpler and cheaper electronic circuit to control large-scale industrial processes.

An additional new control mechanism is the control of $\eta_{ionic}$ via $R_{ionic}$ as:

$$\eta_{ionic} = iR_{ionic} = i\left(\frac{\delta_{ec}}{\sigma_{ec}}\right)$$

The result of $emf_{ec}$ is a reduction of δ in the numerator and increase of σ in the denominator acting to reduce $\eta_{ionic}$:

$$\eta_{ionic}\downarrow\downarrow = i\left(\frac{\delta_{ec}\downarrow}{\sigma_{ec}\uparrow}\right)$$

The DC polarization in FIG. 29A and the polarization from $emf_{ec}$ in FIG. 29B clearly support the reduction of $\eta_{ionic}$ as predicted.

FIG. 35B highlights an additional $emf_{ec}$ configuration with alternate positive and negative damped sinewaves superimposed on the DC emf. This configuration offers intense electronic agitation of the δ layer to achieve the best-case uniformity of the current-density or maximum agitation at an electrode. It will also aggressive disrupts the EDL structure with the positive and negative currents if applied on the x-axis. The symmetrical ac configuration will yield a zero net increase in current density.

The new equivalent electrical model gives deeper understanding of the implications from the Bode impedance graphs enabling accurate engineering of the driving $emf_{ec}$ to achieve the best balance between throughput; energy efficiency; product quality or purity; reduction of environmental and health issues; and reduction in the complexity of processes or facilities. The new equivalent model and Bode impedance graphs provide a guideline for setting $f_{ec}$ to achieve the desired results. As an example, understanding the difference between the dominate process inductance $X_{Lmt}$ and the structural inductance $X_{LST}$ allows the design of the $emf_{ec}$ to overcome $X_{Lmt}$ or understanding that the system is wasting energy working against the structural inductance. The better understanding of the complex impedances can guide the decision to operate $f_{ec}$ against the structural inductance in a case of electrodeposition of a precious metal, such as platinum. The improved morphology, leading to a significant reduction in the quantity of precious metal deposited, can be gauged against the cost of the energy. Likewise, the understanding could be more significant when depositing a cheap metal, such as zinc on steel. The global impact is significant if the quantities of zinc reduce by half or more with the proper design of $emf_{ec}$.

FIG. 36A shows the power density graph, based on the limiting current density, for a fuel cell from Peter Atkins in PHYSICAL CHEMISTRY. The power density drops rapidly when the concentration polarization increases rapidly. Atkins gives a power density equation that directly relates deliverable power to the limiting current density. The background derivation is too complex to detail but is available in his book. The equation:

$$P = EI - I^2 R_s - \frac{2It'}{z}\ln g(I)$$

The formula reads:

P=emf–useless heat loss–steep potentiton reduction operating near $j_{lim}$.

Atkins uses a graphical simplification: f=F/RT thus t'=RT/F.
With:

$$g(I) = \left(\frac{I}{Aj}\right)^{2z}\left\{\left(1 - \frac{I}{Aj_{lim,O}}\right)\left(1 - \frac{I}{Aj_{lim,H}}\right)\right\}^{1/2}$$

For a hydrogen/oxygen fuel cell, $J_{lim,O}$ is the $j_{lim}$ for oxygen electrode and $j_{lim,H}$ is $j_{lim}$ for the hydrogen electrode and are derived from the exchange current densities $j_{o,O}$ and $j_{o,H}$. This formula emphasizes the Bode impedance graph of the fuel cell in FIG. 28A where the phase shift indicated two distinct and separate resonances for each electrode.

Referring back to FIG. 16E, O'Hayre et al show the effect of exchange current density $j_o$ on the limiting current density. In FIG. 36B O'Hayre et al shows the effect of increasing the limiting current density on a fuel cell. FIG. 36C expands Atkins' power density graph to show the effect of increases in the limiting current density. Reducing the δ diffusion by half in a galvanic cell will double the limiting current density and double the power density equivalently:

power density $\propto j_{lim} \propto f_{ec}$

A good catalyst has the following properties: high exchange current density $j_o$; large surface area effects (greater concentration c' at the surface); remains inert with no net chemical change in the reaction; mechanical strength (not fragile); high electrical conductivity; low corrosion rates or poison-resistant; ease of manufacturing, and low cost. Ways to increase the exchange current density: increase the concentration at the surface c'; decrease activation barrier $E_a$; increase the temperature; and increase the effective surface area. The $emf_{ec}$ fulfills the list except for the increase in temperature. The $emf_{ec}$ catalytic effects:

$$\delta_{sec}\downarrow j_{lim_{ec}}\uparrow c'\uparrow\sigma\uparrow\eta_T\downarrow$$

Figure 4A:
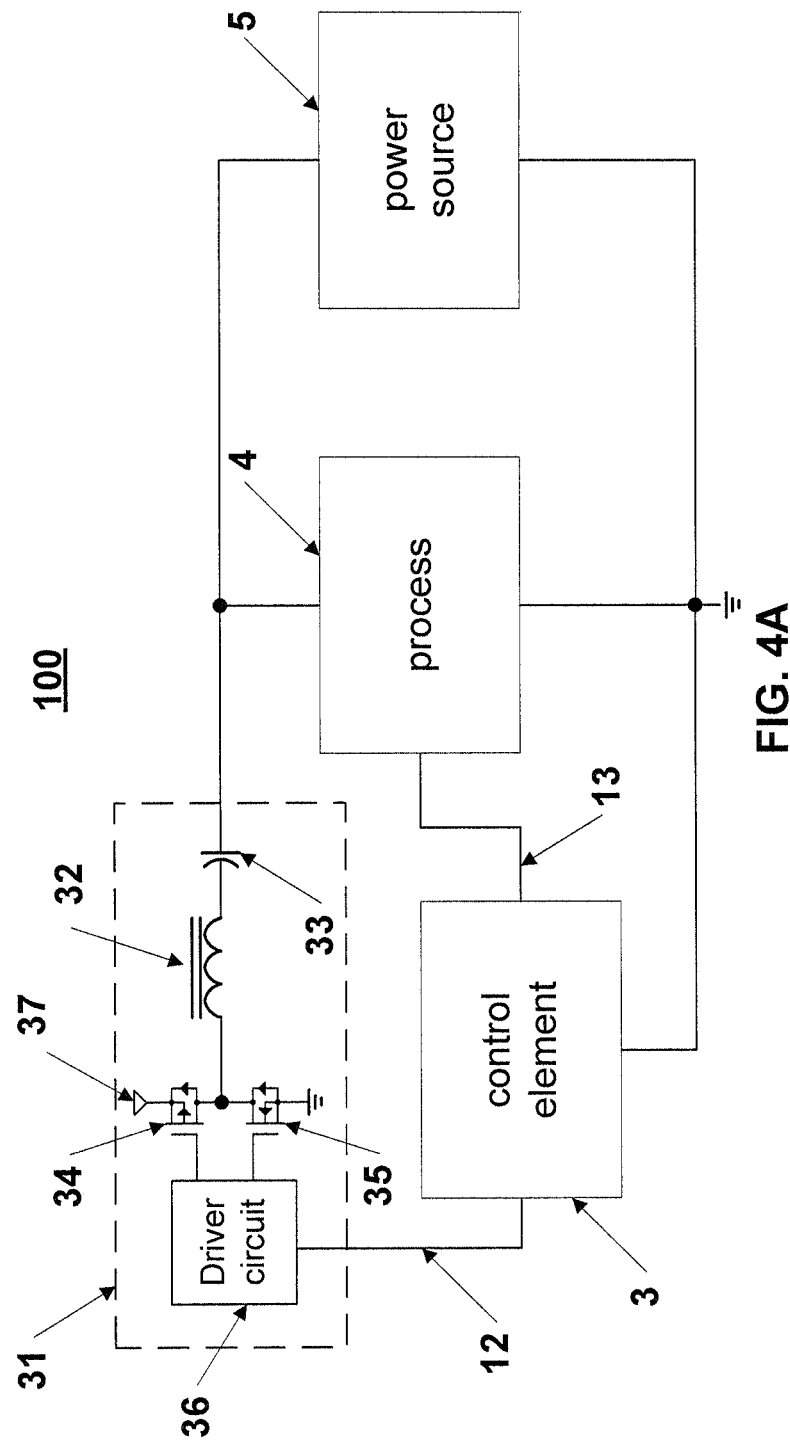
FIG. 4A is a simplified schematic diagram illustrating an exemplary emf system 100 for operating with an electrolytic process.

FIG. 3A illustrates a simplified block diagram for an embodiment of a system 80 having a power amplifier for a single axis. System 80 comprises power amplifier (PA) PA 31, control element 3, process 4, and power source 5. FIG. 4A illustrates a simplified schematic diagram for an embodiment of a system 100 having a power amplifier for a single axis. FIG. 2 highlights a conventional system 60 having a power amplifier for a single axis. System 60 comprises injection element 1, waveform generator 2, control element 25, process 4, and power source 5. FIG. 5 illustrates a simplified schematic diagram for a conventional system 70 having a power amplifier for a single axis. Process 4 is an electrochemical electrolytic process. Power source 5 is an external power source sufficient to power process 4. Control elements 3 (FIG. 3A) and 25 (FIG. 2) control the application of the emf, generated by the power amplifier 5, to process 4 in systems 80 and 60, respectively. There are multitudes of ways to implement control elements 3 and 25, such as microcontrollers, as is well understood by those skilled in the arts.

System 100 comprises PA 31, control element 3, control signal 12, control signal 13, process 4, and power source 5. PA 31 comprises inductor 32, capacitor 33, switch 34, switch 35, driver circuit 36, and power source 37. Control signal 13 provides feedback on process 4 to control element 3. Switch 34 is shown implemented with a p-channel MOSFET, with inherent body diode, and switch 35 is shown implemented with an n-channel MOSFET, with inherent body diode, but the switches can be implemented with other appropriate switches as is understood. Driver circuit 36 converts control signal 12 into the appropriate drive levels to operate switch 34 and switch 35, as is well understood. Power source 37 provides the appropriate voltage levels for operation of PA 31. Power source 37 may be derived from power source 5 but can be independently sourced as is well understood.

System 80 and system 100 operate essentially as a control system for electrochemical systems by effectively converting the system into effectively a series resonant RLC electrical circuit. When coupled, PA 31 and process 4 operate essentially as a series-resonant RLC electrical circuit as described. The effective conversion and operation of PA 31 and process 4 as effectively a series-resonant RLC circuit is illustrated in FIG. 14A and FIG. 14B. PA 31 deviates from conventional system 60 with the elimination of the separate injection element 1. PA 31 combines the separate injection means for injecting the current, into process 4, and waveform generation, of the ac emf, into inductor 32 and capacitor 33. Inductor 32 and capacitor 33 will oscillate based on the LC value. Inductor 32 acts a current source. As a series circuit, the current is the same through each element ensuring that an ac current is injected into process 4. Inductors are not ideal current sources but are adequate for the application. An additional deviation from prior art system 60 is PA 31 is electrically isolated from the DC emf generated by power source 5. Capacitor 33 provides electrical isolation from the DC emf from power source 5.

Figure 3B:
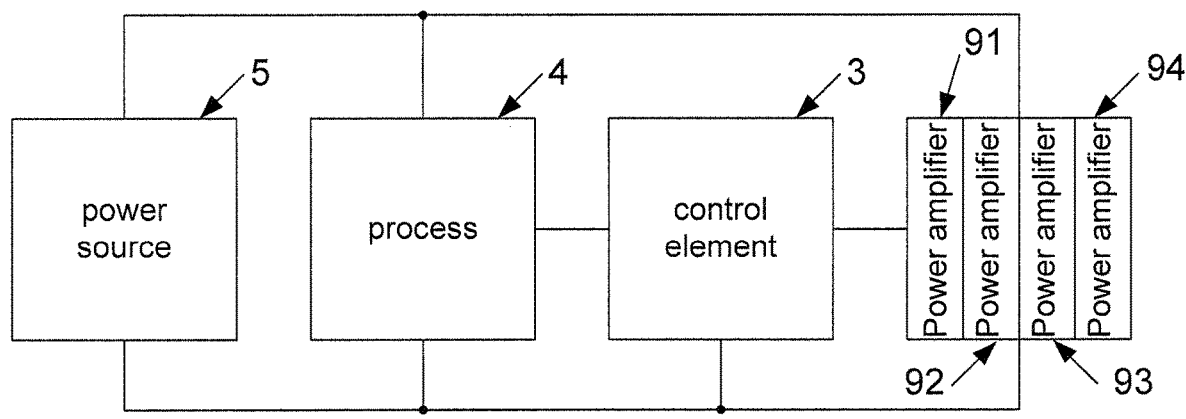
FIG. 3B is a system block diagram illustrating an exemplary emf system 90 having multiple parallel power amplifiers.

FIG. 3B illustrates a simplified block diagram for a system 90 having a power amplifier for a single axis. System 90 consists of PA 91, PA 92, PA 93, PA 94, process 4, control element 3, and power source 5. PA 91, PA 92, PA 93, and PA 94 operate essentially as described for PA 31 and are connected in parallel to boost the power handling capability beyond a single power amplifier. Four power amplifiers are paralleled in system 90 but the number can range from 1 power amplifier, as shown in system 80, to any practical predetermined number, as understood by someone skilled in the art.

Electrochemical systems vary greatly in size and power. System 90 highlights that multiple power amplifiers can be paralleled to match the power desired for a given system. Control element 3, process 4, and power source 5 essentially operate as has been described. Industrial electrochemical systems typically operate at 100's of thousands of amperes but the current has to be divided to interface with the process. A typical individual connection, in an industrial application, may be a few thousand amperes. These individual connection points allow connection of the appropriate number of power amplifiers to achieve the predetermined emf.

Figure 4B:
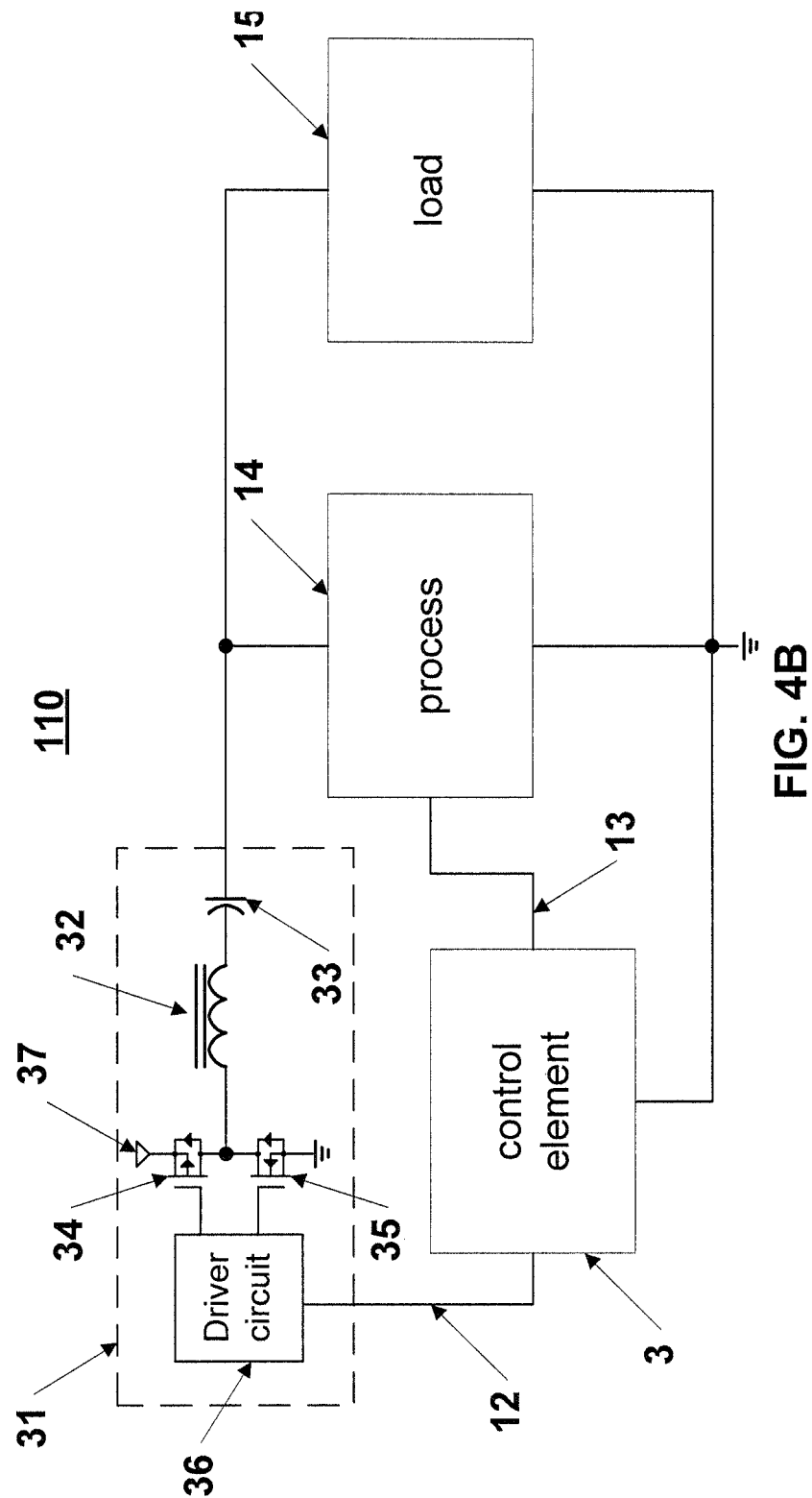
FIG. 4B is a simplified schematic diagram illustrating an exemplary emf system 110 for operating with a galvanic process.

FIG. 4B illustrates a simplified block diagram for a system having a power amplifier for a single axis. System 110 consists of PA 31, control element 3, control signal 12, control signal 13, process 14, and load 15. PA 31, control element 3, control signal 12, and control signal 13 essentially operate as previously described. Process 14 is an electrochemical galvanic system. Process 14 can be any appropriate galvanic process such as a battery system or a fuel cell. Load 15 is an electrical load for process 14. Load 15 can be any appropriate electrical load such as an electric motor or electronic assembly.

Whereas process 4 was described as an electrochemical electrolytic system, process 14 is an electrochemical galvanic system. Electrolytic systems consume electrical energy to drive the chemical process. Galvanic systems consume chemicals to produce electrical energy to drive an electrical load. The elimination of the separate injection element 1 (coupled-inductor), with the DC emf current flowing in the primary winding from system 60, enables the application of the ac emf to the galvanic process 14 without superimposing the ac emf directly onto the output current of process 14 delivered to load 15. The ac current emf will induce minor ac voltage perturbations on the output of process 14. Those skilled in the art understand there are multitudes of ways to deal with the small ac voltage perturbations; and in most applications, existing filtering, normally provided for process 14 and load 15, will be adequate. When coupled to process 14, PA 31 operates essentially the same, as with an electrolytic system, to enhance the operation of the galvanic system, such as increasing the deliverable power density as described.

FIG. 6 is a simplified schematic diagram for an embodiment of a system 120 using a single-axis power amplifier. System 120 describes an alternate power amplifier embodiment, compared to PA 31, a power transconductance amplifier (PTA) PTA 49. PTA 49 consists of operational transconductance amplifier (OTA) OTA 40, voltage signal generator 41, current output 42, current output 43, process 44, and resistor 45. It is well understood process 44 may require an external power source, such as power source 5, but it is not shown for clarity. In many applications, PTA 49 may provide the DC offset emf to process 44 and power source 5 would not be required.

An OTA is a current source and the output current is proportional to the input signal voltage. OTA's are not generally well known but anyone skilled in the art will understand the configuration of the OTA; with the load, process 44, and resistor 45; controls the predetermined current level. Transconductance g (units in micromhos) is described as:

$$g = \frac{dI_o}{dV_{in}}$$

Thus transconductance produces a linear output current $I_o$ proportional to g times the input voltage $V_{in}$. As configured, PA 49 will produce a current $I_x$, within the limits of the circuitry, based on the input signal voltage $V_x$ divided by resistor 45. PTA 49 highlights one method, out of many, to implement a current source and any appropriate current source could be used. An ideal current source will provide a predetermined current regardless of the load. No ideal current sources exist. A suitable OTA will have very high output impedance compared to the load impedance. Process 44 is an electrochemical system and shown as impedance $Z_X$ to illustrate the operation. The use of the resistor to describe complex electrochemical impedance is a simplification, as discussed in detail, but it is accurate for this operational description. A current source, such as PTA 49, is more complex than a current source like PA 31 but has greater flexibility. PTA 49 can produce a DC or ac output current.

FIG. 1 depicts a simplified block diagram of one embodiment for a 3-axis (XYZ) system 50. System 50 comprises PA 20, PA 21, PA 22, and process 4. Process 4 is an electrochemical system. The process 4 will utilize a power source 5, and the power amplifiers are controlled by control element 3, but they are not shown in FIG. 1 for clarity. PA 20, PA 21, and PA 22 operate essentially as described except PA 20 is applied to the x-axis, PA 21 to y-axis, and PA 22 to the z-axis. Proper operation requires electrical isolation between PA 20, PA 21, and PA 22 as is understood by anyone skilled in the art.

Real systems are 3-dimensional and a 3-D example is illustrated in FIG. 30. This operational description follows the conventional labeling of the XYZ axes, but the designations are arbitrary. The x-axis denotes the length, y-axis the height, and z-axis the width. Following convention, the main migration axis in an electrochemical system is the x-axis, again as highlighted in FIG. 30.

U.S. Pat. No. 5,872,443 and this patent specification describe the single axis emf and generation of the emf. PA 20, PA 21, and PA 22 operate essentially as described for the single axis power amplifier but the application of the XYZ emf is different. The power amplifiers can be implemented with different independent current sources as appropriate. The net emf depends on the composite of the three individual emf sources. The net emf is:

$$\text{emf}(x, y, z) = \text{emf}(x) + \text{emf}(y) + \text{emf}(z)$$

The individual and isolated emf sources are defined as:

$$\text{emf}(x) = f(x) + h(x)$$

$$\text{emf}(y) = f(y) + h(y)$$

$$\text{emf}(z) = f(z) + h(z)$$

With the f function defining the ac emf and the h function defining the DC emf. The individual displacements are:

$$dx = \mu\, E_x\, dt = \mu\, (J\sigma)_x\, dt$$

$$dy = \mu\, E_y\, dt = \mu\, (J\sigma)_y\, dt$$

$$dz = \mu\, E_z\, dt = \mu\, (J\sigma)_z\, dt$$

System 50 gives independent X, Y, and Z control of DC offset current, peak ac emf, polarity of DC current, polarity of the initial ac current pulse, damping factor for the ac emf, the frequency of the ac oscillation, the number of oscillations per pulse cycle, and duty-cycle control of the pulse cycles. Control of the damping factor for the ac emf enables the generation of symmetrical or damped sinewave emf. FIG. 13 highlights a few of the many variations that can be configured, with different types of power amplifiers, to match different electrochemical system applications. No scale is intended for the illustrations of waveform shapes in FIG. 13 and the shapes and amplitudes are examples to highlight the concept.

Figure 7A:
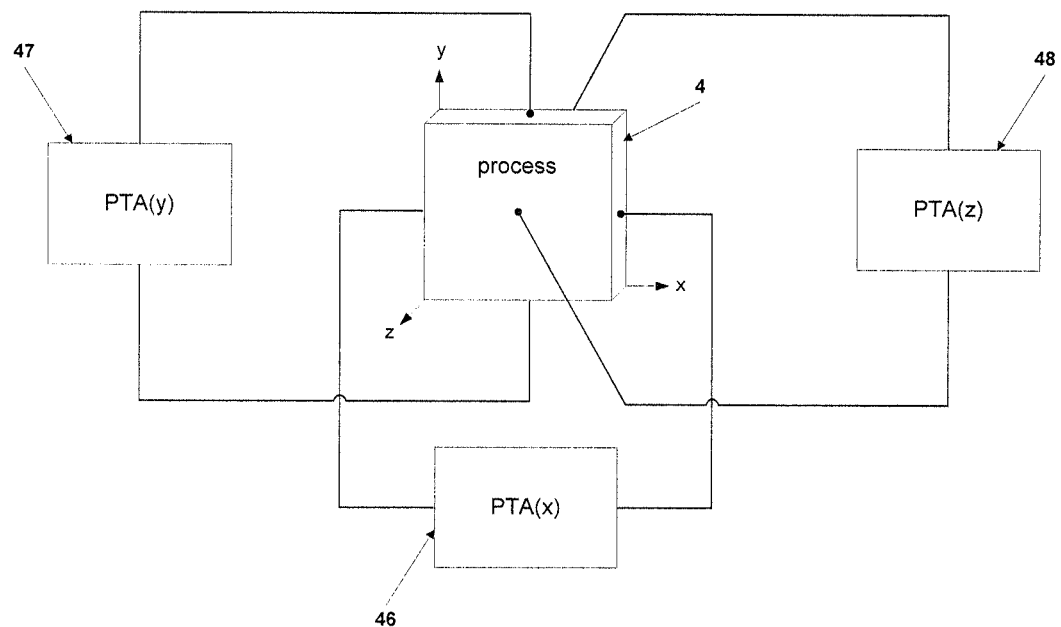
FIG. 7A and 7B are system block diagrams illustrating a XYZ-emf systems 140 and 150 utilizing power amplifiers based on operational transconductance amplifiers (PTA).

FIG. 7A depicts a simplified block diagram for an alternate embodiment for a 3-axis (XYZ) system 140. System 140 comprises PTA 46, PTA 47, PTA 48, and process 4. Process 4 is an electrochemical system. It is well understood process 4 may utilize an external power source, such as power source 5 but it is not shown for clarity. PTA 46, PTA 47, and PTA 48 operate essentially as described for PTA 49 except PTA 46 is applied to the x-axis, PTA 47 to y-axis, and PTA 48 to the z-axis. In many applications, PTA 46, PTA 47, and PTA 48 may provide the DC offset emf to process 4 and power source 5 would not be required. Proper operation requires electrical isolation between PTA 46, PTA 47, and PTA 48 as is understood by anyone skilled in the art.

Figure 7B:
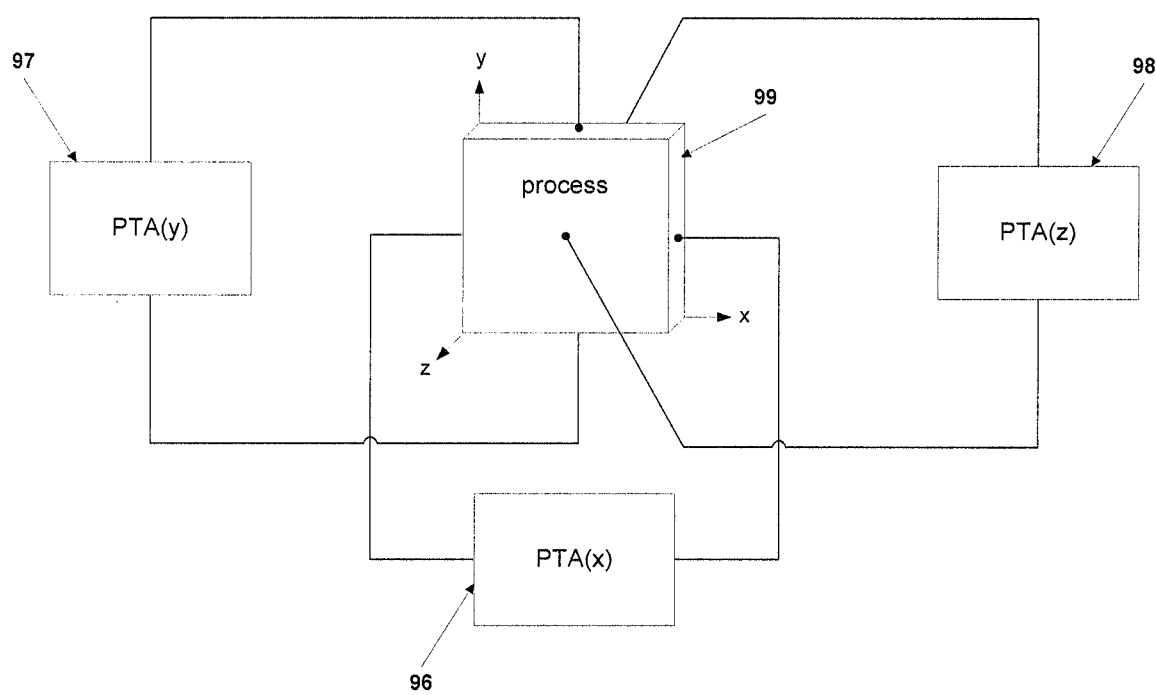

System 150, FIG. 7B, depicts a block diagram for a biological electrochemical process. System 150 comprises PTA 96, PTA 97, PTA 98, and process 99. It operates essentially the same as system 50, FIG. 1A, except implemented with power transconductance amplifiers (PTA). System 150 also operates essentially the same as system 140 except process 99 is a biological process. Proper operation requires electrical isolation between PTA 96, PTA 97, and PTA 98. System 150 is intended to control the movement of charged particles within a biological process to provide 3-dimensional iontophoresis.

System 140 operates essentially the same as system 50 but with greater range of frequency operation and precision. System 140 utilizes PTA power amplifiers with greater frequency ranges and accuracy required by specialized applications, such as an Electrochemical Impedance Spectroscopy (EIS). System 140 shows the three channels connected to the x, y, and z axes but each channel can be applied independently as appropriate.

Figure 8:
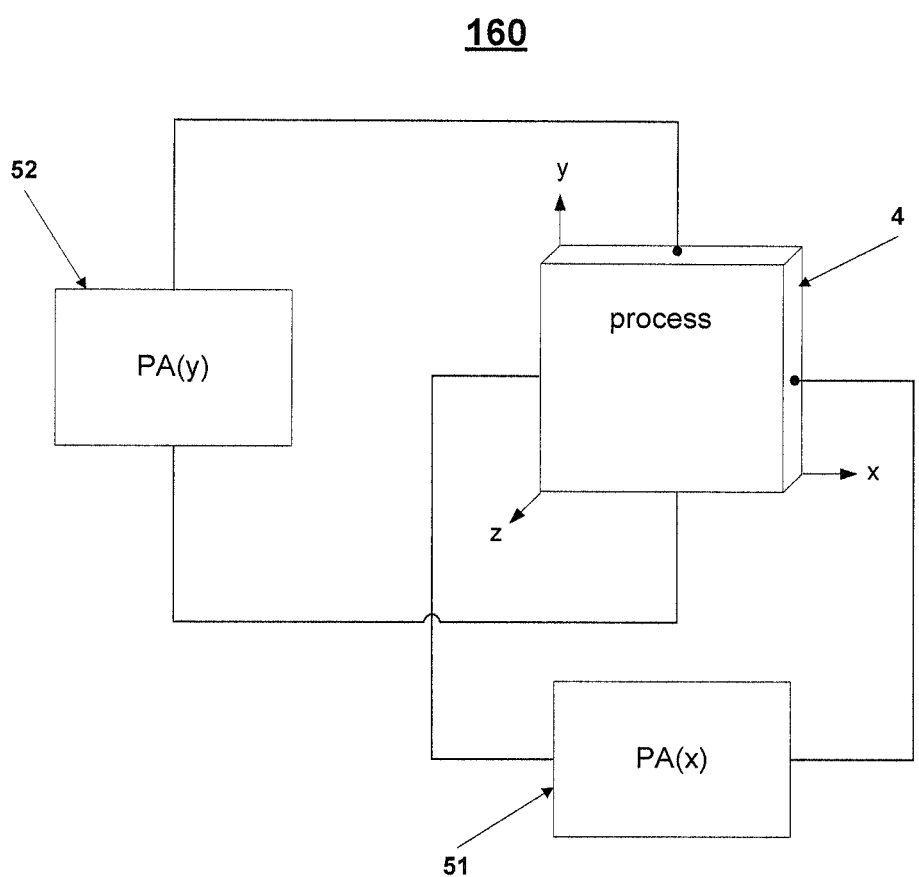
FIG. 8 is a system block diagram illustrating an exemplary XY-emf system 160.

FIG. 8 depicts a simplified block diagram for an alternate embodiment for a 2-axis (XY) system 160. System 160 comprises PA 51, PA 52, and process 4. Process 4 is an electrochemical system. It is well understood process 4 will utilize an external power source, such as power source 5 but it is not shown for clarity. System 160 operates essentially as described for system 50 except the z-axis power amplifier is eliminated. Proper operation requires electrical isolation between PA 51 and PA 52 as is understood by anyone skilled in the art.

System 160 operates essentially the same as system 50 but the z-axis emf(z) is zero. System 160 shows the two channels connected to the x and y axes but each channel can be applied independently as appropriate.

FIG. 10 depicts a simplified block diagram for an alternate embodiment for a 2-axis (XY) system 200. System 200 comprises PTA 53, PTA 54, process 61, electrode 62, electrode 63, electrode 65, and electrode 66. Process 61 is an electrochemical gel electrophoresis system. PTA 53 provides the predetermined ac emf with predetermined DC offset so no separate, external DC power source is required to power process 61. PTA 53 applies the x-axis emf directly to electrode 62 and electrode 63. PTA 54 applies the y-axis emf directly to electrode 65 and electrode 66. Proper operation requires electrical isolation between PTA 53 and PTA 54 as is understood by anyone skilled in the art.

System 200 operates essentially the same as system 160, except implemented with PTA power amplifiers, intended for gel electrophoresis to overcome the well-documented limitation with DC voltage emf. System 200 is specialized for gel electrophoresis with x and y axis emf substantially matching the shape of the waveform shown in FIG. 13E. PTA 53 drives the migration along the x-axis as shown in FIG. 10. The ac component of the emf(x) reduces the high resistivity of the gel and allows operation at higher current-density. The ac x-axis emf(x) also provides agitation to the charged particles along the x-axis but the net positive offset increases the dx migration. The y-axis emf(y), a symmetrical ac current, provides agitation along the y-axis that provides much needed dy migration to free the smaller particles from the larger particles. The symmetrical ac emf has a net zero dy migration so there is no skewing of the smaller particles to either y-axis direction. The predetermined y-axis emf magnitude is very low relative to the predetermined x-axis emf and the dy migration is slight. The slight predetermined dy migration is set to be just adequate to allow separation of the large and small charged particles. System 200 shows the y-axis electrodes do not extend the full length of the y-axis because the needed separation occurs early in the dx migration. No scale is intended on the size of the electrodes in FIG. 10 or the scale of x and y axis emf waveforms shown in FIG. 13E. FIG. 9 shows prior art gel electrophoresis with DC voltage emf as a reference.

Figure 11:
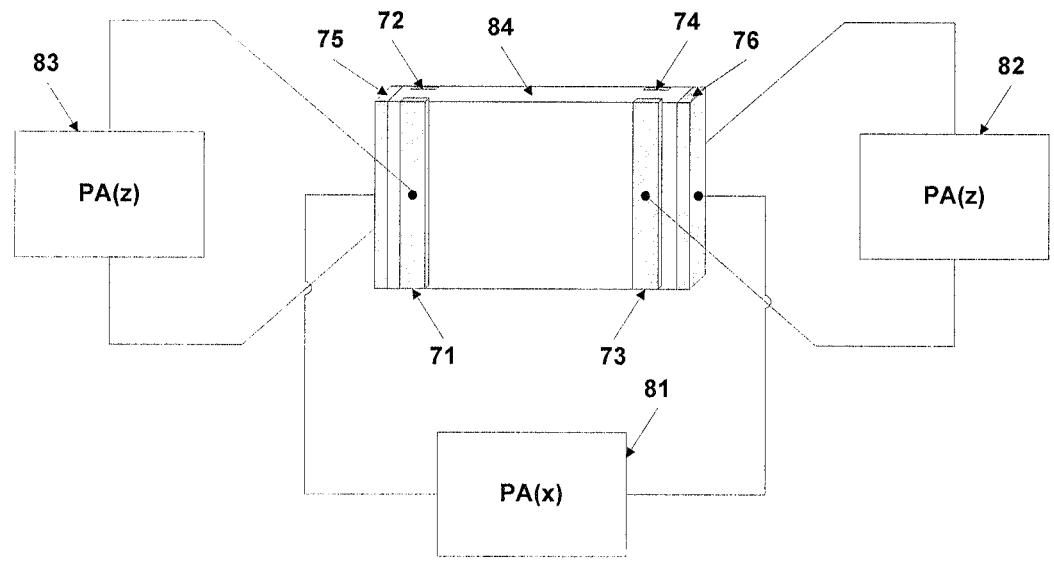
FIG. 11 is a system block diagram illustrating an exemplary XZZ-emf system 220.

FIG. 11 depicts a simplified block diagram for an alternate embodiment for a 3-axis (XZZ) system 220. System 220 comprises electrode 71, electrode 72, electrode 73, electrode 74, electrode 75, electrode 76, PA 81, PA 82, PA 83, and process 84. Process 84 is an electrochemical system. It is well understood process 84 will utilize an external power source, such as power source 5 but it is not shown for clarity. System 220 operates similarly to system 50 except PA 82 and PA 83 are both applied to the z-axis with PA 81 being applied to the x-axis. PA 83 is applied to electrode 71 and electrode 72 along the anode's z-axis and PA 82 is applied to electrode 73 and electrode 74 along the cathode's z-axis. PA 81 is applied directly to electrode 75 and electrode 76. Electrode 72 and electrode 74 are partially hidden in FIG. 11. Proper operation requires electrical isolation between PA 81, PA 82, and PA 83 as is understood by anyone skilled in the art.

System 220 is a system intended to reduce losses associated with gas bubbles clinging to the electrodes and creating significant losses, such as the chlor-alkaline system highlighted in FIG. 33A. System 220 can be used in any system requiring greater agitation near an electrode. Gas bubbles cling to the surface a priori because they develop a surface charge. The z-axis emf can be either symmetrical or a damped sinewave emf with or without DC offset. The emf waveform highlighted in FIG. 35B can be used with and without DC offset. The polarity of an optional DC offset will be matched to create a migration from the bottom of the cell to the top. In a system with just one electrode producing gas, one z-axis power amplifier can be eliminated. No scale is intended on the size of the electrodes in FIG. 11.

Figure 12:
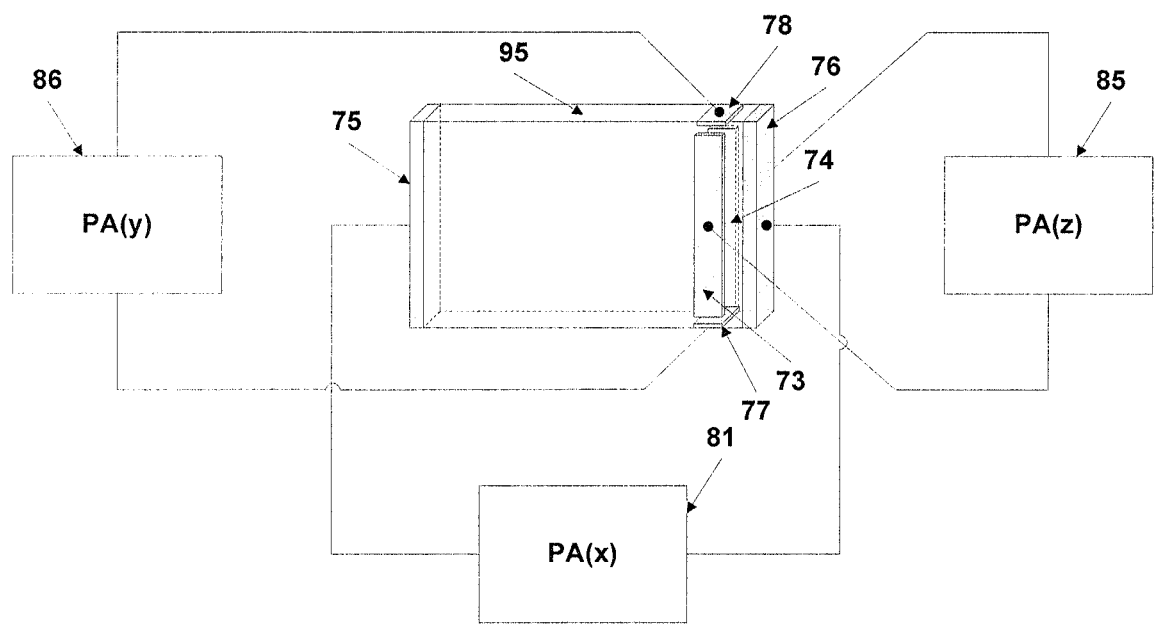
FIG. 12 is a system block diagram illustrating an exemplary XYZ system 240.

FIG. 12 depicts a simplified block diagram for an alternate embodiment for a 3-axis (XYZ) system 240. System 240 comprises electrode 73, electrode 74, electrode 75, electrode 76, electrode 77, electrode 78, PA 81, PA 85, PA 86, and process 95. Process 95 is an electrochemical system. It is well understood process 95 will utilize an external power source, such as power source 5 but it is not shown for clarity. System 240 operates similarly to system 50 except the y and z axis electrodes are located at one chemical electrode. PA 86 is applied to electrode 77 and electrode 78; PA 85 is applied to electrode 73 and electrode 74; and PA 81 is applied directly to electrode 75 and electrode 76. Electrode 74 and electrode 77 are partially hidden in FIG. 12. Proper operation requires electrical isolation between PA 81, PA 85, and PA 86 as is understood by anyone skilled in the art.

Figure 13A:
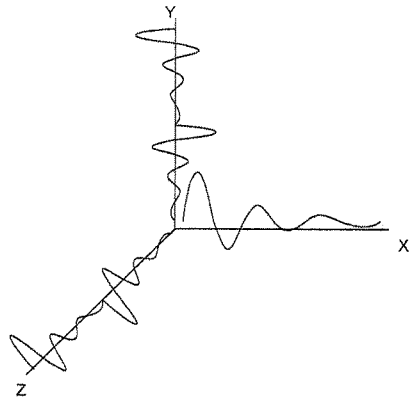
FIG. 13A-I are graphical representations highlighting some of possible XYZ emf waveform configurations.
Figure 13B:
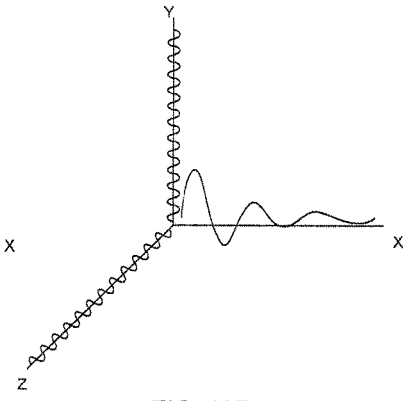
Figure 13C:
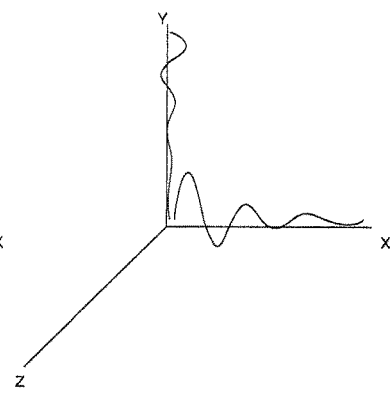
Figure 13D:
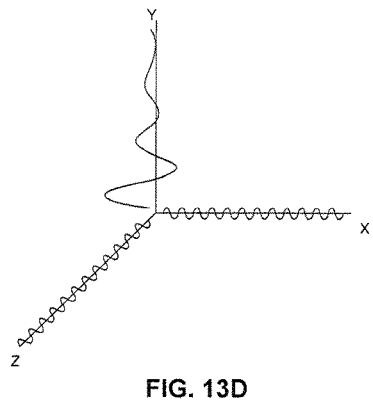
Figure 13E:
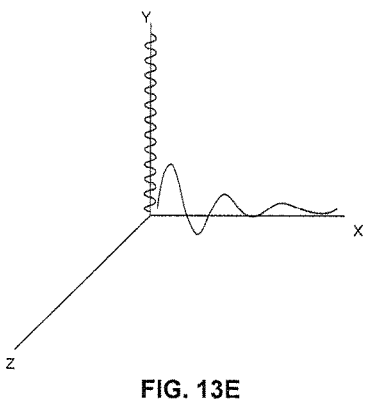
Figure 13F:
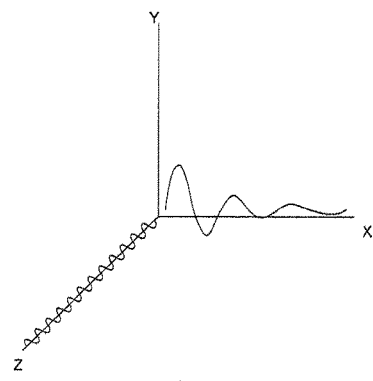
Figure 13G:
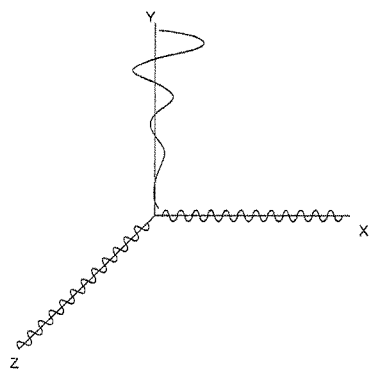
Figure 13H:
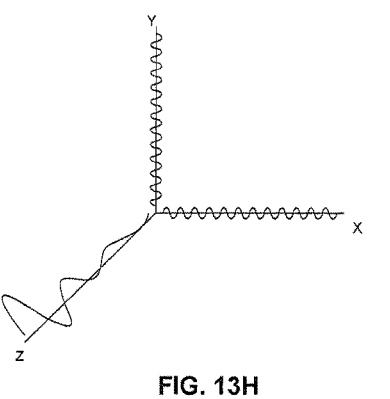
Figure 13I:
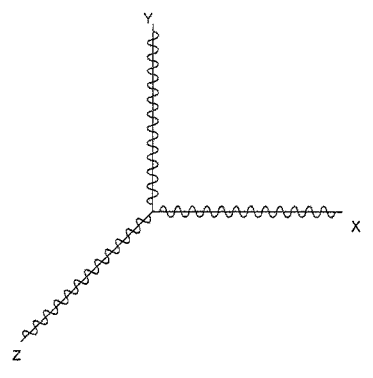

System 240 is a system intended to produce maximum agitation at a single electrode particularly in an electrodeposition system requiring very thin and uniform layers for deposition of precious metals or for co-depositing metals or alloys. The y and z-axis emf can be either symmetrical or a damped sinewave emf with or without DC offset. A typical waveform combination is shown in FIG. 13B. The emf waveform highlighted in FIG. 35B can be used with or without DC offset. Applying the waveform shown in FIG. 35B to both y and z axes would be similar to the waveforms shown by FIG. 13A. No scale is intended on the size of the electrodes in FIG. 12 and no scale is intended on the waveforms given in FIG. 13.

FIG. 37A shows a simplified block diagram of an electrochemical system for a single axis to illustrate the principles of an electrochemical process. System 250 comprises process 4, power source 5, electrode 404, electrode 405, barrier 406, input 408, input 409, output 410, output 411, output 412, output 413, and container 418 containing an electrochemical solution that provides a conductive path between the electrodes 404 and 405, as will be described. The electrochemical solution includes a solution 416 of a first type (e.g., a saturated brine solution) in which the electrode 404 is positioned and a solution of a second type (e.g., water) in which the electrode 405 is positioned. In other embodiments, other types of solutions may be used between the electrodes 404 and 405.

Process 4 is an electrochemical process with electron flow external to the process and ionic current flow within the process. Electrode 404 is shown as the anode electrode and electrode 405 is shown as the cathode electrode. Electrons 401 flow from the anode electrode 404 via the external wiring through power source 5 to electrode 405. Power source 5 generates the electron flow (emf). The electrons at the cathode react with the positively-charged cations at the electrode surface. The cations gain electrons in a process called reduction. The current then flows through the solutions 416 and 417, from the cathode to the anode via the movement of ions, either anions 402 or cations 403. In FIG. 33A, the solution 416 (e.g., saturated brine) provides sodium and chlorine ions, via the dissociation of the salt (solvation), to form an electrolyte. An electrolyte refers to a substance that contains free ions and can be used as an electrically conductive medium for the conduction of current (ions), but not electrons, through the solution. At the anode surface the negatively-charged anions release electrons at the anode surface completing the electrical circuit. The anions lose electrons in a process called oxidation. At the cathode, in FIG. 33A, water molecules ($H_2O$) react in a reduction process to form hydroxyl anions and hydrogen gas. In FIG. 33A, the negatively-charged anions in solution 416 are chlorine ions ($Cl^-$) that lose their electrons and form chlorine gas and the positively-charged cations are sodium ions ($Na^+$) that migrate through barrier 406 to react with the hydroxyl anions ($OH^-$) to form sodium hydroxide (NaOH). Barrier 406 is used in many electrochemical systems, such as the chlor-alkali process highlighted in FIG. 33A, but not required in other processes, such as gel electrophoresis highlighted in FIG. 31A. Barrier 406 may be an ion selective membrane as shown in FIG. 33A or constructed from other material as is well understood in the art of electrochemistry. In many processes, solutions 416 and 417 only differ in the localized concentration levels of the cations and anions. At the surface of each electrode, an electrical double layer (EDL) forms within roughly 3 nm of the surface as illustrated in FIG. 15 and a diffusion layer ($\delta$) forms within millimeters of the surface as illustrated in FIG. 20. These physical structures form when the DC emf is applied by power source 5. The electrode's surface area and composition, especially porous electrodes, greatly complicate the formation and behavior of the process' physical parameters.

In electrochemical processes that are continuously operated there will be input and output ports as required as material or reactants are consumed and generated. Input 408 and input 409 illustrate the continuous flow of solutions into process 4. As shown in FIG. 33A, input 408 is saturated brine (salt (NaCl) solution) flowing into solution 416, and input 409 is water flowing into solution 417 as materials are depleted. The input of materials can be continuous or in batches. In other embodiments, other types of inputs are possible. Output 410 and output 411 illustrate the output of products or waste in liquid form whereas output 412 and output 413 illustrate the output of products or waste in gas form. In FIG. 33A, input 408 is saturated brine, input 409 is water, output 410 is depleted brine, output 411 is product sodium hydroxide, output 412 is product chlorine gas, and output 413 is waste hydrogen gas. Note that the hydrogen gas in the chlor-alkaline process is of poor quality and considered waste. In galvanic systems such as a fuel cell, as illustrated FIG. 33E, input 409 is air or oxygen gas and input 408 is hydrogen gas. The byproduct of the reaction in the fuel cell is water and the output is energy in the form of electrons that are supplied to the electrical load that would replace power source 5 (electrical load is not shown in this example).

When the DC emf is first applied, the diffusion layer is very thin and the concentration of reactants at the surface essentially matches the concentration levels in the bulk solution. As the reaction continues, the reactants near the electrode surface begin to be depleted and new reactants flow towards the electrode surface. The reactant concentration c' at the surface begins to decrease as illustrated in FIG. 20 and FIG. 34C. A concentration gradient or diffusion layer $\delta$ forms as the reactants are consumed faster than they can be replaced. The thickness of the Nernst diffusion layer that forms is dependent on a number of factors as detailed. The thickness of the diffusion layer limits the maximum current density that the process can support. The limiting current density is inversely proportional to the thickness of the diffusion layer. With static DC emf, a diffusion layer thickness will develop and stabilize as the system reaches steady-state operation. The limiting current density determines the system throughput, efficiency, and the degree of parasitic effects.

FIG. 37B depicts an exemplary embodiment of emf system 80, illustrated in FIG. 3A, and system 100, illustrated in FIG. 4A. System 80 differs from system 250 by the addition of control element 3 and power amplifier 31. FIG. 37B shows control signals 12 and 13 connecting control element 3 and power amplifier 31 (FIG. 4A) but does not show the numerical designations for clarity. Likewise, FIG. 37B shows control element 3 connecting to power source 5 instead of process 4 as a graphical simplification for clarity. Control element 3 is connected to the positive and negative inputs of process 4 via the positive and negative outputs of power source 5. Power amplifier 31 superimposes an ac emf current onto the DC emf current generated by power source 5 and the combined ac and DC emf current drives process 4 via electrodes 404 and 405. Process 4 is shown as an electrolytic electrochemical process but it could be a galvanic electrochemical process shown in FIG. 4B. Process 4 could be a biological process 99 as described in system 150 in FIG. 7B. Process 4 in FIG. 37B operates essentially the same as described above for system 250 in FIG. 37A.

The superimposition of a true ac emf, with positive and negative current periods, onto the DC emf disrupts the EDL that forms at the interface of the electrodes 404 and 405 and solutions 416 and 417. The disruption of the EDL lowers the activation barrier at the electrode surface. The ac emf also directly affects the diffusion layer thickness as described in detail. As an example, refer back to the photomicrograph in FIG. 19, the irregularity is roughly 40 µm and the depth-of-penetration of the electroplating is roughly 75% so a posteriori the diffusion layer is roughly 53 µm at 10 kHz. To achieve a diffusion layer thickness of 40 µm or less, the frequency of the ac emf needs to be increased to roughly 18 kHz or greater as outlined in the mathematical formulas described earlier. Decreasing the diffusion layer thickness to 40 µm should achieve the desired surface morphology. Increasing the frequency from 10 kHz to 18 kHz will increase the limiting current density by a factor of roughly 1.34. Increasing the limiting current density will decrease the parasitic effects, improve the uniformity of the current distribution across the electrode surface, and increase the power density in galvanic applications. Decreasing the diffusion layer thickness will increase the concentration c' at the electrode surface thus increasing the conductivity σ. Increasing c' and σ will increase the exchange current density $j_o$ and decrease overpotential $\eta_t$ and resistance $R_{ionic}$.

Increasing the frequency of the ac emf does come at a cost that is highly dependent on the electrochemical system. In U.S. Pat. No. 5,872,443 the simplistic theory was to set the frequency at the system's dominant resonance frequency $f_r$ because the impedance is at a minimum and the energy required to generate the ac emf is minimal. In some cases, this selection of $f_r$ may be correct. As an example, refer to the impedance plot of a tin (II) chloride process in FIG. 28G, $f_r$ is about 60 kHz and the impedance is relatively flat out to roughly 300 kHz. A further example, refer to the impedance plot for a chlor-alkali process in FIG. 28E, $f_r$ is roughly 60 Hz and the structural inductance begins to dominate just above 10 kHz. The energy required to increase the frequency of the ac emf for the tin (II) chloride process from 10 kHz to 18 kHz is insignificant whereas it is not for the chlor-alkali example. For a medium scale chlor-alkali process operating at 170 kA for example, the energy-cost-benefit could be improved by the use of duty-cycle control of the ac emf as shown in FIG. 35A. Since the diffusion layer thickness develops over time as depicted in FIG. 34C, the ac emf does not have to be applied continuously and can be applied at the optimal frequency (18 kHz in this example) but at a low duty-cycle designed to maintain the needed limiting current density. As a further example, if the impedance plot in FIG. 28E were an electroplating process for electroplating zinc or platinum the issue of increasing the frequency from 10 to 18 kHz would be decided by the energy-cost-benefit for achieving the desired surface morphology. For inexpensive zinc the cost of the energy may be significant when compared to the cost of the zinc needed whereas the cost of energy versus the cost of platinum would be insignificant. For a fuel cell needing platinum as a catalyst, decreasing the diffusion layer thickness with resulting increases in c' and σ thus increasing the exchange current density $j_o$ could greatly decrease the need for the platinum catalyst.

It should be noted that the embodiment shown by FIG. 37B can be used with a variety of processes that employ any of a variety of electrochemical solutions. In addition, there are numerous types of operational parameters of the electrochemical solution or electrodes that can be precisely and directly controlled via application of ac emf signals in order to obtain a desired result, depending on the application of the system. Such operational parameters include, but are not limited to, a thickness of the Nernst diffusion layer of the electrochemical solution, a limiting current density of the system or process, a power density of the system or process, an overpotential voltage of the system or process, an ionic resistance of the electrochemical solution, an exchange current density of the system or process, a surface concentration, a surface conductivity, and a surface morphology. Note that the surface concentration refers to the concentration of molecules at the interface of the electrode and the electrochemical solution at the surface of an electrode, and surface conductivity refers to the conductivity at the surface of an electrode at the interface of the electrode and the electrochemical solution. Also, surface morphology refers to parameters indicative of the shape, thickness, uniformity, or physical structure of molecules at the surface of an electrode. As an example, in a electroplating application where an electrode is being electroplated with molecules from the electrochemical solution, the thickness and uniformity of the molecules formed at the surface of the electrode could be parameters for surface morphology. Other types of surface morphology parameters are possible in other examples.

In using the system 80, a desired value of the operational parameter is determined, and the frequency, amplitude, duty cycle, and damping factor (if any) for achieving the desired value of the operational parameter are determined. Input indicative of the determined frequency, amplitude, duty cycle, and damping factor are provided to the control element 3, which controls the power amplifier such that an ac emf signal in accordance with the determined frequency, amplitude, duty cycle, and damping factor is repetitively generated and applied to the electrochemical solution via the electrodes 404 and 405 at least until the operational parameter is set to the desired value.

In FIG. 37B, the ions flow from one electrode to the other, and the ac emf signal is applied along the x-axis. In other embodiments, it may be desirable to apply multiple emf signals in multiple directions for various reasons. As an example, FIG. 37C depicts such an embodiment. Specifically, FIG. 37C shows a block diagram for electrochemical process system 260 with electrodes 419 and 420 that apply an emf signal along another axis, referred to herein as the z-axis, which is perpendicular to the x-axis. Thus, the emf signal applied along the x-axis is orthogonal to the emf signal applied along the z-axis in that the emf signal applied along the x-axis travels between electrodes 404 and 405, whereas the emf signal applied along the z-axis travels between electrodes 419 and 420. The block diagram is further simplified from FIG. 37B for clarity but operates essentially the same as system 80 except for the addition of electrode 419, electrode 420, power amplifier 421, control element 422, and power source 423. No scale is intended on the size of the electrodes in or between FIG. 37B and FIG. 37C. Electrodes 419 and 420 extend in a direction parallel to the y-axis (which is perpendicular to both the x-axis and y-axis), such that a voltage potential between the electrodes 419 and 420 induces ions to flow between the electrodes 419 and 420. In the instant embodiment, application of ac emf signals by the electrodes 419 and 420 helps to reduce the losses associated with gas bubbles clinging to the surface of electrode 404. System 260 could be applied, as an example, to the chlor-alkali process shown in FIG. 33A. Electrodes 419 and 420 provide a mass-transport perturbation in the dz direction applied along the surface of electrode 404. The ac emf signals applied to the x- and z-axes could match the example given in FIG. 13F. That is, such emf signals could have the same frequency, amplitude, duty cycle, and damping factor, though it is possible for the emf signals to have different characteristics in other embodiments. Power amplifier 421 could also be fabricated as a power transconductance amplifier (PTA). Whereas power amplifier 31 applies a net positive dx current to drive the electrochemical reaction, power amplifier 421 applies a net zero ac emf dz to electronically agitate the gas bubbles clinging to the surface of electrode 404. Electrodes 419 and possibly 420 would typically be fabricated from a wire mesh or other configuration to avoid trapping the gas. System 260 is similar to electrophoresis system 200 in FIG. 10 except system 200 applies the second axis along the y-axis typically with the emf matching the example waveforms in FIG. 13E. System 260 could also be applied to an electroplating process for expensive metals or co-deposition of metals where greater mass-transport perturbation in the dy or dz direction would be beneficial. The waveform signal shown in FIG. 35B could be applied in the dy or dz direction for an intense mass-transport perturbation as needed. There are many possible configurations as highlighted. In other embodiments, an additional power amplifier, control element, and power source may be arranged to apply ac emf signals along the y-axis such that a three-dimensional system is implemented that independently controls the application of a respective ac emf signal along each axes.

It should be noted that the control elements 3 and 422 may be implemented in hardware, software, firmware, or any combination thereof. As an example, control elements 3 and 422 may be implemented in hardware and can comprise analog circuits and/or digital logic for performing the functionality described herein for the control element 3 and control element 422. In addition, at least a portion of the control element 3 or 422 may be implemented in software and stored in memory. In such embodiment, the control element may comprise an instruction execution apparatus, such as a digital signal processor (DSP) or central processing unit (CPU), for executing instructions of the software.

As described above, new methods, including a new equivalent electrical model, are presented providing a deeper understanding of electrochemical systems overcoming decades of flawed concepts and misunderstandings. These new methods enable accurate engineering of the driving emf to achieve the best balance between throughput; energy efficiency; product quality; reduction of environmental and health issues; and reduction in the complexity of processes or facilities.

Whereas in U.S. Pat. No. 5,872,443, it was understood the damped-sinusoidal emf disrupted the EDL structure thus reducing the activation barrier and provided an electronic mass-transport perturbation, there were a number of flaws in the concept based on the prevailing flawed understanding of electrochemical systems.

New and improved methods and systems enable precise control of critical electrochemical operational characteristics. Specifically, these methods and systems enable precise control of the Nernst diffusion layer thickness and the limiting current density that directly give precise control of many other critical operational characteristics.

FIG. 3A illustrates a simplified block diagram for a system 80 having a power amplifier for a single axis. System 80 is simpler than prior art and overcomes a significant limitation in the handling of the DC emf. System 80 and system 100 enable simpler interfacing to the electrochemical system thus eliminating much of the intense engineering effort and high degree of trial and error of prior art.

FIG. 4A, system 100, highlights one possible configuration of system 80. FIG. 36 illustrates a simplified block diagram for a system 90 having a parallel power amplifiers for a single axis to achieve greater power handling along a single-axis.

System 50, FIG. 1, allows multiple isolated power amplifiers to be applied independently to different X-, Y-, Z-axes. New and improved power amplifiers enable precise control of a single-axis to match the complexity of a given electrochemical system. These different power amplifiers configurations allow optimizing a given electrochemical system. One of the new power amplifiers, system 120 in FIG. 6, highlights a power transconductance amplifier (PTA) embodiment suitable for development of complex and varying emf waveforms.

System 50, system 80, system 90, system 100, system 110, system 140, system 150, system 160, system 200, system 220, system 240 and system 260 highlight a few of the possible configurations. These embodiments allow the application of independent, isolated 3-dimensional (XYZ) emf sources providing unparalleled control of complex electrochemical systems.

FIG. 4B, system 110, gives control of galvanic processes. Electrolytic systems consume electrical energy to drive the chemical process. Galvanic systems consume chemicals to produce electrical energy to drive an electrical load. System 110 operates essentially the same as system 80 and system 100 except it enhances the operation of the galvanic system overcoming known limitations thus increasing the deliverable power density and reduced dependence on expensive catalysts. With prior art the applied the ac emf had to be superimposed directly onto the DC emf driving the electric load, system 110 allows application directly to the galvanic system.

The new methods and systems enable precise control of the Nernst diffusion layer thickness and the limiting current density. The implications of this precise control are global in scope offering significant process improvements, such as, elimination of trial and error methods; reducing or eliminating the use of hazardous geometric leveling agents and additives; reducing or eliminating the need for expensive catalysts in many processes; significant reduction in the misunderstood 'IR' losses; improved power density in galvanic systems; significant reduction in the quantities of metal needed to achieve superior morphology in electrodeposition; significant reductions in activation polarization and concentration polarization; effective control and reduction of parasitic reactions; significant energy savings; cost savings via simpler equipment and facilities; and significant throughput improvements. These new and improved systems and methods will enable many new applications and uses.

The invention claimed is:

1. A system for controlling an electrochemical process, comprising:
   a power source;
   a first power amplifier coupled to the power source, said first power amplifier configured to provide an alternating current (AC) electromotive force (emf) signal;
   an electrochemical solution;
   a plurality of electrodes positioned within the electrochemical solution for applying the AC emf signal to the electrochemical solution, wherein a voltage potential across the electrodes causes ions to flow in the electrochemical solution, and wherein the electrochemical solution forms a Nernst diffusion layer along a boundary while the ions are flowing in the electrochemical solution; and
   a control element configured to control the first power amplifier such that the AC emf signal comprising a damped sinusoidal wave superimposed on a direct current (DC) is repetitively applied to the electrochemical solution via the electrodes with a predetermined frequency, amplitude, and duty cycle to match a thickness of the Nernst diffusion layer to the electrochemical solution
   wherein the first power amplifier is electrically isolated from a DC emf generated by the power source.

2. The system of claim 1, wherein the control element is further configured to adjust at least one of the predetermined frequency, amplitude, and duty cycle based on a changing condition of the electrochemical process.

3. The system of claim 1, wherein the electrochemical process is an electrolytic electrochemical process.

4. The system of claim 1, wherein the electrochemical process is a galvanic electrochemical process.

5. The system of claim 1, wherein the electrochemical process is a biological process.

6. The system of claim 1, wherein the system is configured to apply the AC emf signal in a first direction, and wherein the system further comprises:
   a second a power amplifier configured to provide a second AC emf signal;
   a plurality of second electrodes for applying the second AC emf signal to the electrochemical solution in a second direction that is perpendicular to the first direction,
   wherein a voltage potential between the second electrodes causes second ions to flow in the electrochemical solution, and wherein the electrochemical solution forms a second Nernst diffusion layer along a boundary while the second ions are flowing in the electrochemical solution; and
   a second control element configured to control the second power amplifier such that the second AC emf signal exhibits a predetermined frequency, amplitude, and duty cycle.

7. The system of claim 1, wherein the AC emf signal comprises an alternate positive and negative damped AC emf with a DC offset.

8. The system of claim 1, wherein the AC emf signal is applied discontinuously.

9. The system of claim 1, further comprising a capacitor electrically isolating the first power amplifier from a DC emf generated by the power source.

* * * * *